(12) United States Patent
VanSickler et al.

(10) Patent No.: US 12,498,387 B2
(45) Date of Patent: Dec. 16, 2025

(54) AUTOMATED SAMPLE DIAGNOSTIC ANALYZER AND METHOD FOR ITS OPERATION

(71) Applicant: BECTON, DICKINSON AND COMPANY, Franklin Lakes, NJ (US)

(72) Inventors: Michael T. VanSickler, Catonsville, MD (US); Brian Austin Self, Monkton, MD (US); Alyssa Shedlosky, Reisterstown, MD (US); Joel Daniel Krayer, Franklin Lakes, NJ (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/734,196

(22) Filed: May 2, 2022

(65) Prior Publication Data
US 2022/0365107 A1   Nov. 17, 2022

Related U.S. Application Data

(62) Division of application No. 16/088,531, filed as application No. PCT/US2017/018346 on Feb. 17, 2017, now Pat. No. 11,353,472.
(Continued)

(51) Int. Cl.
G01N 35/00 (2006.01)
B01L 9/00 (2006.01)
(Continued)

(52) U.S. Cl.
CPC ............ *G01N 35/0099* (2013.01); *B01L 9/52* (2013.01); *B01L 9/54* (2013.01);
(Continued)

(58) Field of Classification Search
None
See application file for complete search history.

(56) References Cited

U.S. PATENT DOCUMENTS 4,250,257 A   2/1981   Lee et al.
5,262,049 A   11/1993  Ferkany
(Continued)

FOREIGN PATENT DOCUMENTS

CN   1223721 A    7/1999
CN   102141572 A  8/2011
(Continued)

OTHER PUBLICATIONS

Office Action for corresponding CN Application No. 201780011630.0 dated Aug. 3, 2022, (11 pages).
(Continued)

*Primary Examiner* — P. Kathryn Wright
(74) *Attorney, Agent, or Firm* — Botos Churchill IP Law LLP

(57) ABSTRACT

Automated analyzer (2000) comprising a housing (2010, 3010), a robotic arm comprising an end effector (2360), the end effector (2360) comprising a body (2320) rotatably connected to an articulating arm and first (2363*a*) and second fingers (2363*b*) coupled to the body (2362) and being moveable relative to each other in a first direction, each of the fingers (2363*a, b*) having an engagement feature (2361) projecting inwardly from each of the first and second fingers (2363*a, b*) and toward the other of the first and second fingers (2363*a, b*). The automated analyzer (2000) further comprises a shuttle platform (2030) for receiving a shuttle (2030) carrying sample containers (03), the containers carrying sample (03) to be evaluated by the analyzer (2000) and the shuttle platform (2030) comprising a jaw assembly that
(Continued)

engages the bottom portion of the sample containers when the jaw assembly is in the closed position.

21 Claims, 28 Drawing Sheets

Related U.S. Application Data

(60) Provisional application No. 62/326,259, filed on Apr. 22, 2016.

(51) Int. Cl.
*G01N 35/02* (2006.01)
*G01N 35/04* (2006.01)
*G01N 35/10* (2006.01)

(52) U.S. Cl.
CPC ..... *G01N 35/00732* (2013.01); *G01N 35/028* (2013.01); *G01N 35/04* (2013.01); *G01N 35/1065* (2013.01); *B01L 2200/025* (2013.01); *B01L 2200/028* (2013.01); *B01L 2200/18* (2013.01); *B01L 2300/021* (2013.01); *G01N 2035/0425* (2013.01); *G01N 2035/103* (2013.01)

(56) References Cited

U.S. PATENT DOCUMENTS

| | | | |
|---|---|---|---|
| 5,772,962 A | 6/1998 | Hiroyasu et al. | |
| 5,876,668 A | 3/1999 | Kawashima et al. | |
| 5,985,215 A | 11/1999 | Sakazume et al. | |
| 6,027,691 A | 2/2000 | Watts et al. | |
| 6,138,521 A | 10/2000 | Basch et al. | |
| 6,146,592 A | 11/2000 | Kawashima et al. | |
| 6,162,399 A | 12/2000 | Martinell | |
| 6,253,807 B1 | 7/2001 | Jones | |
| 6,261,521 B1 | 7/2001 | Mimura et al. | |
| 6,267,927 B1 | 7/2001 | Longedo et al. | |
| 6,290,907 B1 | 9/2001 | Takahashi et al. | |
| 6,293,750 B1 | 9/2001 | Cohen et al. | |
| 6,335,166 B1 | 1/2002 | Ammann et al. | |
| 6,521,183 B1 | 2/2003 | Burri et al. | |
| 6,551,833 B1 | 4/2003 | Lehtinen et al. | |
| 6,588,625 B2 | 7/2003 | Luoma, II et al. | |
| 6,592,324 B2 * | 7/2003 | Downs | B25J 17/0208 414/730 |
| 6,599,749 B1 | 7/2003 | Kodama | |
| 6,635,488 B1 | 10/2003 | Saito | |
| 6,723,288 B2 | 4/2004 | Devlin, Sr. et al. | |
| 6,730,517 B1 | 5/2004 | Köster et al. | |
| 6,752,960 B1 | 6/2004 | Matsubara et al. | |
| 6,776,961 B2 | 8/2004 | Lindsey | |
| 6,793,887 B2 | 9/2004 | Itoh | |
| 6,849,236 B2 | 2/2005 | Spitz | |
| 6,919,044 B1 | 7/2005 | Shibata et al. | |
| 6,982,063 B2 | 1/2006 | Hamel et al. | |
| 7,015,042 B2 | 3/2006 | Devlin, Sr. | |
| 7,033,543 B1 | 4/2006 | Panzer et al. | |
| 7,185,288 B2 | 2/2007 | McKeever | |
| 7,206,667 B2 | 4/2007 | Kleinschmitt | |
| 7,220,385 B2 | 5/2007 | Blecka | |
| 7,288,228 B2 | 10/2007 | Lefebvre | |
| 7,326,386 B2 | 2/2008 | Sasaki et al. | |
| 7,354,510 B2 | 4/2008 | Fujimoto et al. | |
| 7,368,084 B2 | 5/2008 | Sklar et al. | |
| 7,384,601 B2 | 6/2008 | Matsubara et al. | |
| 7,390,458 B2 | 6/2008 | Burow et al. | |
| 7,402,282 B2 | 7/2008 | Lacourt et al. | |
| 7,462,328 B2 | 12/2008 | Fritz et al. | |
| 7,501,094 B2 | 3/2009 | Bysouth | |
| 7,572,638 B2 | 8/2009 | Pressman et al. | |
| 7,579,190 B2 | 8/2009 | Ostgaard et al. | |
| 7,585,678 B2 | 9/2009 | Sigrist | |
| 7,666,355 B2 | 2/2010 | Alavie | |
| 7,687,033 B2 | 3/2010 | Itoh | |
| 7,700,042 B2 | 4/2010 | Matsumoto et al. | |
| 7,727,469 B2 | 6/2010 | Takahashi et al. | |
| 7,807,446 B2 | 10/2010 | Macisaac et al. | |
| 7,814,788 B2 | 10/2010 | Halaka et al. | |
| 7,854,892 B2 | 12/2010 | Veiner et al. | |
| 7,858,041 B2 | 12/2010 | Muraishi et al. | |
| 7,867,768 B2 | 1/2011 | Ryan et al. | |
| 7,879,292 B2 | 2/2011 | Nagai et al. | |
| 7,885,077 B2 | 2/2011 | Sass | |
| 7,939,020 B2 | 5/2011 | Nogawa et al. | |
| 7,972,579 B2 | 7/2011 | Brunner | |
| 7,985,375 B2 | 7/2011 | Edens et al. | |
| 7,998,409 B2 | 8/2011 | Veiner et al. | |
| 8,034,293 B2 | 10/2011 | Kumar et al. | |
| 8,100,266 B2 | 1/2012 | Lackner et al. | |
| 8,133,671 B2 | 3/2012 | Williams et al. | |
| 8,142,719 B2 | 3/2012 | Matthias et al. | |
| 8,148,163 B2 | 4/2012 | Hofstadler | |
| 8,158,060 B2 | 4/2012 | Nagai | |
| 8,178,043 B2 | 5/2012 | Burkhardt | |
| 8,206,663 B2 | 6/2012 | Nagai | |
| 8,211,701 B2 | 7/2012 | Spence et al. | |
| 8,226,889 B2 | 7/2012 | Nakaya | |
| 8,252,232 B2 | 8/2012 | Neeper et al. | |
| 8,257,650 B2 | 9/2012 | Chow et al. | |
| 8,277,729 B2 | 10/2012 | Matsuo et al. | |
| 8,278,108 B2 | 10/2012 | Wada et al. | |
| 8,282,895 B2 | 10/2012 | Miller et al. | |
| 8,329,103 B2 | 12/2012 | Wakamiya et al. | |
| 8,337,755 B2 | 12/2012 | Bendele et al. | |
| 8,357,538 B2 | 1/2013 | Self et al. | |
| 8,383,411 B2 | 2/2013 | Kawamura | |
| 8,386,195 B2 | 2/2013 | Feingold et al. | |
| 8,431,079 B2 | 4/2013 | Rosenberg et al. | |
| 8,431,404 B2 | 4/2013 | Spence | |
| 8,455,256 B2 | 6/2013 | Yamoto et al. | |
| 8,480,977 B2 | 7/2013 | Gunji | |
| 8,496,877 B2 | 7/2013 | Yamazaki et al. | |
| 8,529,836 B2 | 9/2013 | Winther et al. | |
| 8,535,607 B2 | 9/2013 | Wakamiya et al. | |
| 8,545,760 B2 | 10/2013 | Yamamoto et al. | |
| 8,551,404 B2 | 10/2013 | Nagai et al. | |
| 8,557,599 B2 | 10/2013 | Koyata et al. | |
| 8,616,072 B2 | 12/2013 | Boeke et al. | |
| 8,632,725 B2 | 1/2014 | Yamazaki et al. | |
| 8,652,832 B2 | 2/2014 | Kondo | |
| 8,658,417 B2 | 2/2014 | Godsey et al. | |
| 8,679,421 B2 | 3/2014 | Sano et al. | |
| 8,703,492 B2 | 4/2014 | Self et al. | |
| 8,731,712 B2 | 5/2014 | Hagen et al. | |
| 8,747,745 B2 | 6/2014 | Kitaoka | |
| 8,747,746 B2 | 6/2014 | Lefebvre | |
| 8,758,685 B2 | 6/2014 | Komatsu et al. | |
| 8,778,268 B2 | 7/2014 | Takehara et al. | |
| 8,778,281 B2 | 7/2014 | Holenstein et al. | |
| 8,778,696 B2 | 7/2014 | Gutmann et al. | |
| 8,784,735 B2 | 7/2014 | Winther et al. | |
| 8,784,750 B2 | 7/2014 | Gunji | |
| 8,883,078 B2 | 11/2014 | Humada et al. | |
| 8,894,930 B2 | 11/2014 | Mizumoto | |
| 8,926,902 B2 | 1/2015 | Pedrazzini | |
| 8,945,470 B2 | 2/2015 | Kuwano et al. | |
| 8,951,805 B2 | 2/2015 | Fritchie et al. | |
| 8,956,569 B2 | 2/2015 | Hamada et al. | |
| 8,965,558 B2 | 2/2015 | Haas et al. | |
| 9,028,756 B2 | 5/2015 | Yamamoto et al. | |
| 9,034,257 B2 | 5/2015 | Covey et al. | |
| 9,057,672 B2 | 6/2015 | Mckeen et al. | |
| 9,063,103 B2 | 6/2015 | Pedrazzini | |
| 9,103,806 B2 | 8/2015 | Massaro | |
| 9,114,399 B2 | 8/2015 | Knight et al. | |
| 9,117,192 B2 | 8/2015 | Clark et al. | |
| 9,134,332 B2 | 9/2015 | Frey et al. | |
| 9,134,334 B2 | 9/2015 | Gunji | |
| 9,140,632 B2 | 9/2015 | Furrer | |
| 9,164,019 B2 | 10/2015 | Geach | |
| 9,164,115 B2 | 10/2015 | Davis et al. | |

(56) References Cited

U.S. PATENT DOCUMENTS

| | | | |
|---|---|---|---|
| 9,180,447 | B2 | 11/2015 | Schlegel et al. |
| 9,248,422 | B2 | 2/2016 | Ching et al. |
| 9,335,338 | B2 | 5/2016 | Ochranek et al. |
| 9,506,943 | B2 | 11/2016 | Müller et al. |
| 10,101,349 | B2 | 10/2018 | Antoni et al. |
| 2002/0072112 | A1 | 6/2002 | Atwood et al. |
| 2003/0000597 | A1 | 1/2003 | Ganz et al. |
| 2004/0142486 | A1 | 7/2004 | Weselak et al. |
| 2004/0184959 | A1 | 9/2004 | Itoh |
| 2005/0047963 | A1 | 3/2005 | Safar et al. |
| 2005/0158212 | A1 | 7/2005 | Yavilevich |
| 2006/0093530 | A1 | 5/2006 | Ueda |
| 2006/0178776 | A1 | 8/2006 | Feingold et al. |
| 2006/0204997 | A1 | 9/2006 | Macioszek et al. |
| 2006/0210435 | A1 | 9/2006 | Alavie et al. |
| 2006/0266719 | A1 | 11/2006 | Knight et al. |
| 2007/0098597 | A1 | 5/2007 | Brunner |
| 2007/0134131 | A1 | 6/2007 | Watson et al. |
| 2007/0290004 | A1 | 12/2007 | Lee et al. |
| 2008/0254545 | A1 | 10/2008 | Kitaoka |
| 2009/0047179 | A1* | 2/2009 | Ping ............... G01N 35/0099 422/400 |
| 2009/0221059 | A1 | 9/2009 | Williams et al. |
| 2010/0028203 | A1 | 2/2010 | Frey et al. |
| 2010/0069265 | A1* | 3/2010 | Shirazi ............ G01N 35/0099 506/39 |
| 2010/0126286 | A1 | 5/2010 | Self et al. |
| 2010/0233035 | A1 | 9/2010 | Denawa et al. |
| 2011/0091364 | A1 | 4/2011 | Voit |
| 2011/0263461 | A1 | 10/2011 | Kastury et al. |
| 2011/0306051 | A1 | 12/2011 | Belz et al. |
| 2011/0306053 | A1 | 12/2011 | Ochsenbein et al. |
| 2012/0318076 | A1 | 12/2012 | Kappelhoff et al. |
| 2013/0065797 | A1 | 3/2013 | Silbert et al. |
| 2013/0116102 | A1 | 5/2013 | Hansen |
| 2013/0164853 | A1 | 6/2013 | Belz et al. |
| 2013/0230860 | A1 | 9/2013 | Park et al. |
| 2014/0050637 | A1 | 2/2014 | Giovanoli et al. |
| 2014/0102239 | A1* | 4/2014 | Umeno ............ B25J 9/0087 294/213 |
| 2014/0112843 | A1 | 4/2014 | Thomas et al. |
| 2014/0170023 | A1 | 6/2014 | Saito et al. |
| 2014/0174837 | A1 | 6/2014 | Kneubuehl et al. |
| 2014/0241946 | A1 | 8/2014 | Self et al. |
| 2014/0305227 | A1 | 10/2014 | Johns |
| 2015/0273468 | A1 | 10/2015 | Croquette et al. |
| 2015/0343439 | A1 | 12/2015 | Burroughs et al. |
| 2015/0376562 | A1 | 12/2015 | Baum et al. |
| 2017/0067922 | A1 | 3/2017 | Antoni et al. |
| 2017/0248626 | A1 | 8/2017 | Procyshyn et al. |

FOREIGN PATENT DOCUMENTS

| | | | |
|---|---|---|---|
| CN | 203178289 U | 9/2013 | |
| CN | 103364255 A | 10/2013 | |
| CN | 103538076 A | 1/2014 | |
| CN | 103869089 A | 6/2014 | |
| CN | 103975244 A | 8/2014 | |
| CN | 104138772 A | 11/2014 | |
| CN | 203981612 U | 12/2014 | |
| CN | 204198728 U | 3/2015 | |
| CN | 204911556 U | 12/2015 | |
| CN | 205077063 U | 3/2016 | |
| CN | 207067156 U | 3/2018 | |
| CN | 207164073 U | 3/2018 | |
| EP | 0745855 B1 | 12/1996 | |
| EP | 0895088 B1 | 2/1999 | |
| EP | 2333559 A1 | 6/2011 | |
| EP | 3078972 A1 | 10/2016 | |
| JP | 5781557 U | 5/1982 | |
| JP | S58184878 U | 12/1983 | |
| JP | H02167473 A | 6/1990 | |
| JP | H0618531 A | 1/1994 | |
| JP | H07229904 A | 8/1995 | |
| JP | H08304408 A | 11/1996 | |
| JP | H1096734 | 4/1998 | |
| JP | 2001504229 A | 3/2001 | |
| JP | 2001505648 A | 4/2001 | |
| JP | 2002340912 A | 11/2002 | |
| JP | 2007003350 A | 1/2007 | |
| JP | 2008532048 A | 8/2008 | |
| JP | 2008537147 A | 9/2008 | |
| JP | 2008261735 A | 10/2008 | |
| JP | 2010536332 A | 12/2010 | |
| JP | 2011123066 A | 6/2011 | |
| JP | 2011128123 A | 6/2011 | |
| JP | 2012141287 A | 7/2012 | |
| JP | 2013156254 A | 8/2013 | |
| JP | 2015075343 A | 4/2015 | |
| JP | 2015511313 A | 4/2015 | |
| JP | 2015131260 A | 7/2015 | |
| JP | 2017517000 A | 6/2017 | |
| WO | 9108491 A1 | 6/1991 | |
| WO | 9503548 A1 | 2/1995 | |
| WO | WO-0160519 A1 * | 8/2001 | ............ B01L 3/5085 |
| WO | 02084270 A1 | 10/2002 | |
| WO | WO 2009/024560 A1 | 2/2009 | |
| WO | WO 2011/101467 A1 | 8/2011 | |
| WO | 2013168559 A1 | 11/2013 | |
| WO | 2014143044 A1 | 9/2014 | |
| WO | 2015108164 A1 | 7/2015 | |

OTHER PUBLICATIONS

Office Action from corresponding European Patent Application No. 21166097.2 dated Mar. 16, 2023 (11 pp.).

Chinese Office Action received in Chinese Patent Application No. 2017800245867, dated Dec. 3, 2021, pp. 47.

Decision of Rejection issued in corresponding JP Patent Application No. 2018-543609 dated Nov. 9, 2021, 4 pp.

Extended European Search Report for corresponding European Patent Application No. 21166097.2 dated Jun. 22, 2021, 9 pp.

First Examination Report issued by Australian Patent Office for corresponding AU Patent Application No. 2017252156, dated Jul. 2, 2021, 4 pp.

First Office Action issued in corresponding Chinese Patent Application No. 2017800116300 dated Oct. 8, 2021, 21 pp.

Full Examination Report for corresponding Australian Application No. 2017220028 dated May 14, 2021 (3 pages).

Full Examination Report received in corresponding Australian Patent Application No. 2017254365, dated Jul. 8, 2021, 5 pp.

International Search Report and Written Opinion from corresponding International Application No. PCT/US2017/018346 dated May 11, 2017.

International Search Report and Written Opinion from corresponding International application No. PCT/US2017/018298 dated Jul. 12, 2018.

International Search Report and Written Opinion from corresponding International application No. PCT/US2017/018358 dated Nov. 7, 2017.

Japanese Notice of Refusal issued Jan. 27, 2021 in JP application No. 2018-555453.

Notice of Reasons for Refusal issued in corresponding JP Patent Application No. 2018-555526 on Feb. 2, 2021, 13 pp.

Office Action issued in corresponding Australian Patent Application No. 2017254365, dated Jan. 20, 2022, 4 pp.

Office Action issued in corresponding Chinese Patent Application No. 2017800116300 dated Apr. 26, 2022, (8 pp.).

Office Action issued in corresponding Chinese Patent Application No. 2017800245867 dated May 11, 2022, (14 pp.).

Office Action issued in corresponding CN Patent Application No. 201780024920.9 on Feb. 21, 2022, (27 pages).

Office Action issued in corresponding Japanese Patent Application No. 2018-543609 dated Feb. 25, 2021, 10 pp.

Held, P. G., et al., "Automated Procedures for the Quantitation of Protein", Biotechniques Rapid Dispatches, Informa Healthcare, US, vol. 17, No. 5, XP000474857, (Nov. 1, 1994), pp. 988-991.

(56) References Cited

OTHER PUBLICATIONS

Simport, "PCR—The assurance of highly accurate and contaminant-free proceduresLean-Driven Innovation11", URL:http://www.simport.com/documents/PCR2014Web.pdf/, (Mar. 30, 2016).
Thermofischer, "How to Use MicroAmp (TM) Reaction Plates, Tube Strips, and Tubes for use with: Applied Biosystems (TM) thermal cyclers and real-time PCR systems Publication No. 100033471 Revision A—How to use MicroAmp (TM) plates How to use MicroAmp", XP055487397, Retrieved from the Internet: URL:https://assets.fishersci.com/TFS-Asset s/LSG/manuals/100033471_MicroAmpReactionPlates_TubeStrips_Tubes_UB.pdf [retrieved on Jun. 25, 2018] Aug. 25, 2015, (Aug. 25, 2015), pp. 1-8.
Office Action issued in corresponding European Patent Application No. 17708112.2 dated Aug. 30, 2022, (10 pp.).
Office Action issued in corresponding Canadian Patent Application No. 3,019,765 dated Mar. 6, 2023 (5 pp.).
Office Action issued in corresponding Canadian Patent Application No. 3,019,789 dated Mar. 3, 2023 (3 pp.).
Office Action issued in Australian Patent Application No. 2022256123 dated Sep. 7, 2023 (4 pp.).
"EESR", Coummunication under Rule 62 EPC for European search report Application No. 23178903.3 Mailed Feb. 19, 2024.
Office Action issued in Canadian Patent Application No. 3,019,789 dated Dec. 7, 2023 (5 pp.).
Partial European Search Report issued in European Patent Application No. 23178903.3 issued on Nov. 29, 2023 (17 pp.).
Canadian Office Action issued in corresponding CA application No. 3,019,765 on Jan. 17, 2024, p. 3.
Examination Report issued in corresponding Australian application No. 2022202311 on Dec. 21, 2023, p. 4.
Norbert Majerus: Lean Driven Innovation; XP055487580, Portland; ISBN: 978-1-4822-5968-1 Retrieved from the Internet: URL:http://www.simport.com/documents/PCR2014Web.pdf, Mar. 30, 2016.
Extended European Search Report issued in EP application No. 24152818.1 on Feb. 20, 2025, pp. 29.
European Search Report for Application No. EP24152818.1 dated Oct. 7, 2024, 26 pgs.
First Office Action issued in Chinese application No. 2022114518824 on Jul. 17, 2025, pp. 21.
Japanese Office Action issued in JP application No. 2024-063476 on Mar. 3, 2025., pp. 6.

\* cited by examiner

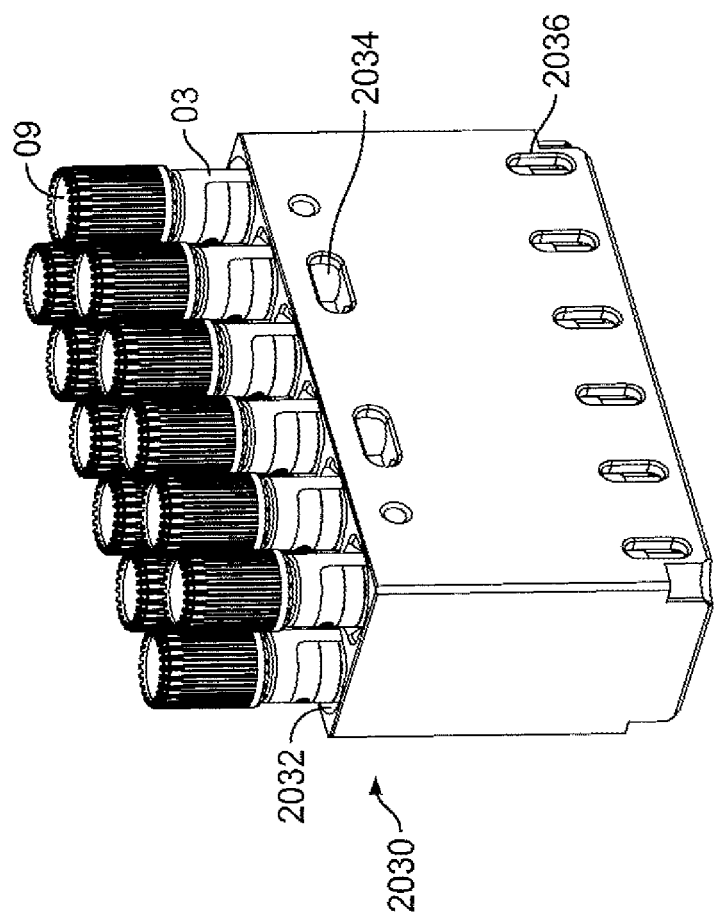
FIG. 5
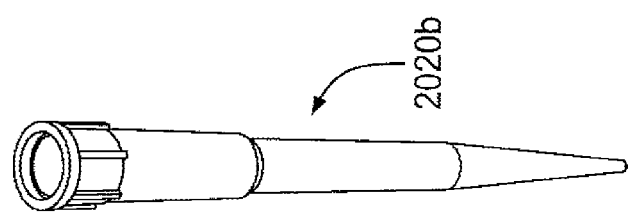
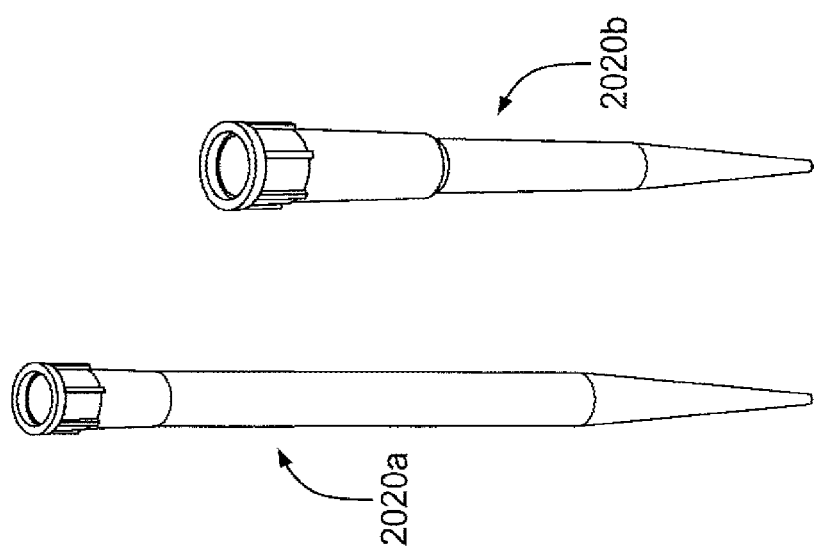
FIG. 4A  FIG. 4B

AUTOMATED SAMPLE DIAGNOSTIC ANALYZER AND METHOD FOR ITS OPERATION

CROSS-REFERENCE TO RELATED APPLICATION

This application is a divisional of U.S. application Ser. No. 16/088,531, filed on Sep. 26, 2018, now U.S. Pat. No. 11,353,472, issued on Jun. 7, 2022, which application is a national phase entry under 35 U.S.C. § 371 of International Application No. PCT/US2017/018346, filed Feb. 17, 2017, published in English, which application claims the benefit of the filing date of U.S. Provisional Application No. 62/326,259, filed Apr. 22, 2016, the disclosures of which are hereby incorporated herein by reference.

BACKGROUND OF THE INVENTION

Diagnostic testing of biological samples is instrumental in the health care industry's efforts to quickly and effectively diagnose and treat disease. Clinical laboratories that perform such diagnostic testing already receive hundreds or thousands of samples on a daily basis with an ever increasing demand. The challenge of managing such large quantities of samples has been assisted by the automation of sample analysis. Automated sample analysis is typically performed by automated analyzers that are commonly self-contained systems which perform multistep processes on the biological samples to obtain diagnostic results.

Several current automated clinical analyzers offer a user an array of automated tests or assays that can be performed on a provided sample. Additionally, when samples arrive at the laboratory, they are often not ready for analysis. In order to prepare a sample for testing with an automated analyzer, a lab technician typically transfers an aliquot of the sample from a primary container, as received by the laboratory, to a secondary container which is amenable to the analyzer. In addition, the technician typically must know what tests are to be performed on the sample so that the technician can select a test specific reagent or diluent to be paired with the sample. This can be time consuming and can lead to operator error and exposure to communicable diseases.

Pre-analytical systems meant to help prepare a sample for analysis and further remove the operator from the workflow between the laboratory's receipt of a sample and the analyzer's test results also exist. However, many of these systems still require significant technician involvement, such as: prior to loading samples in the pre-analytical system; after the samples have been prepared by the pre-analytical system; and after the analyzers have completed analysis.

For example, some pre-analytical systems may automatically transfer an aliquot of sample from a first container to a second container. However, such systems often require a technician to manually match identification codes of the first and second containers prior to loading them into the system, which can be time consuming and is prone to error.

In addition, many of these systems are not capable of being integrated with one or more analyzers, and, conversely, the analyzers are not capable of being integrated with such systems. In this regard, a technician must be present to manually transfer the samples from the pre-analytical system to an analyzer and from the analyzer to a storage location once analysis is complete. This requires skilled labor to perform menial tasks and can create distractions in that the technician must be ever mindful of the progress of the samples within the pre-analytical system and analyzer so that the technician is prepared to transfer samples when ready in order to minimize downtime.

Moreover, current pre-analytical systems generally prepare samples at different rates than the analyzers evaluate such samples and this further complicates the integration between pre-analytical systems and analyzers. In this regard, a technician may be required to continuously keep track of samples prepared by the pre-analytical system until a full batch of samples is accumulated for manual transfer to an analyzer. Alternatively, technicians may transfer partial batches to an analyzer, which can reduce the analyzer's productivity.

Thus, while current automated pre-analytical systems and analyzers are beneficial to the clinical laboratory, there is room for better integration and automation of various systems.

BRIEF SUMMARY OF THE INVENTION

The present disclosure describes devices, systems, and methods for sample processing and analysis. In particular, an analyzer that is included in a high-throughput system is described. In one embodiment, the high-throughput system may also include a second analyzer and a pre-analytical system integrated with both first and second analyzers. These components (i.e., analyzers and pre-analytical system) are modular and are capable of being integrated in several different configurations to conform to a particular laboratory's diagnostic needs.

The particular analyzer described herein generally has multiple decks or levels in a vertical arrangement. One deck may store consumables for various assays and may house consumable waste which includes liquid waste. In one embodiment, enough consumables can be stored in the analyzer to allow it to operate 24 hours straight without reloading the system. This deck may also include detectors for detecting an analyte, such as a DNA target.

Another deck may include multiple processing modules arranged side-by-side. Each one of these processing modules may be similarly configured in terms of their structure and functions. In one embodiment, each processing module is capable of performing a wide array of assays so that each processing module can run a different assay concurrently with assays being run on other processing modules. In this regard, each processing module can be automatically designated and redesignated to perform any number of assays depending on the processing needs at a particular point in time. For example, each processing module may be capable of performing any of a first, second or third assay, but a first processing module may be designated to perform the first assay, a second processing module the second assay, and a third processing module the third assay where each assay is different. However, when those assays are completed, any one of the processing modules can be automatically redesignated to perform a different assay, so that each of the first, second, and third processing module are running the same assay simultaneously, for example. As such, the analyzer is flexible to accommodate real-time needs provided sufficient consumables for a particular assay are inventoried within its housing.

Each processing module may have a multichannel pipettor with multiple pipette channels associated with it. In addition, the analyzer may have an inventory robot that periodically performs an inventory inspection to determine if sufficient consumables are available, moves consumables back and forth between the inventor to the processing deck, and moves sample containers back and forth between the pre-analytical system and the analyzer. More particularly, the inventory robot includes an electronic or optoelectronic inventory scanner and an end-effector that is configured to handle a variety of consumables including a sample container shuttle, an amplification cartridge, a liquid reagent plate, a dry reagent plate, and a sample processing plate.

BRIEF DESCRIPTION OF THE DRAWINGS

The features, aspects, and advantages of the present invention will become better understood with regard to the following description, appended claims, and accompanying drawings in which:

FIG. 4A is a perspective view of a first pipette tip according to one embodiment of the present disclosure.

FIG. 4B is a perspective view of a second pipette tip according to one embodiment of the present disclosure.

FIG. 5 is perspective view of a sample container shuttle according to one embodiment of the present disclosure.

DETAILED DESCRIPTION

As used herein, the terms "about," "generally," and "substantially" are intended to mean that slight deviations from absolute are included within the scope of the term so modified. Also when referring to specific directions, such as left, right, front, back, up and down, in the following discussion, it should be understood that such directions are described with regard to the perspective of a user facing the below described system during exemplary operation.

Figure 1:
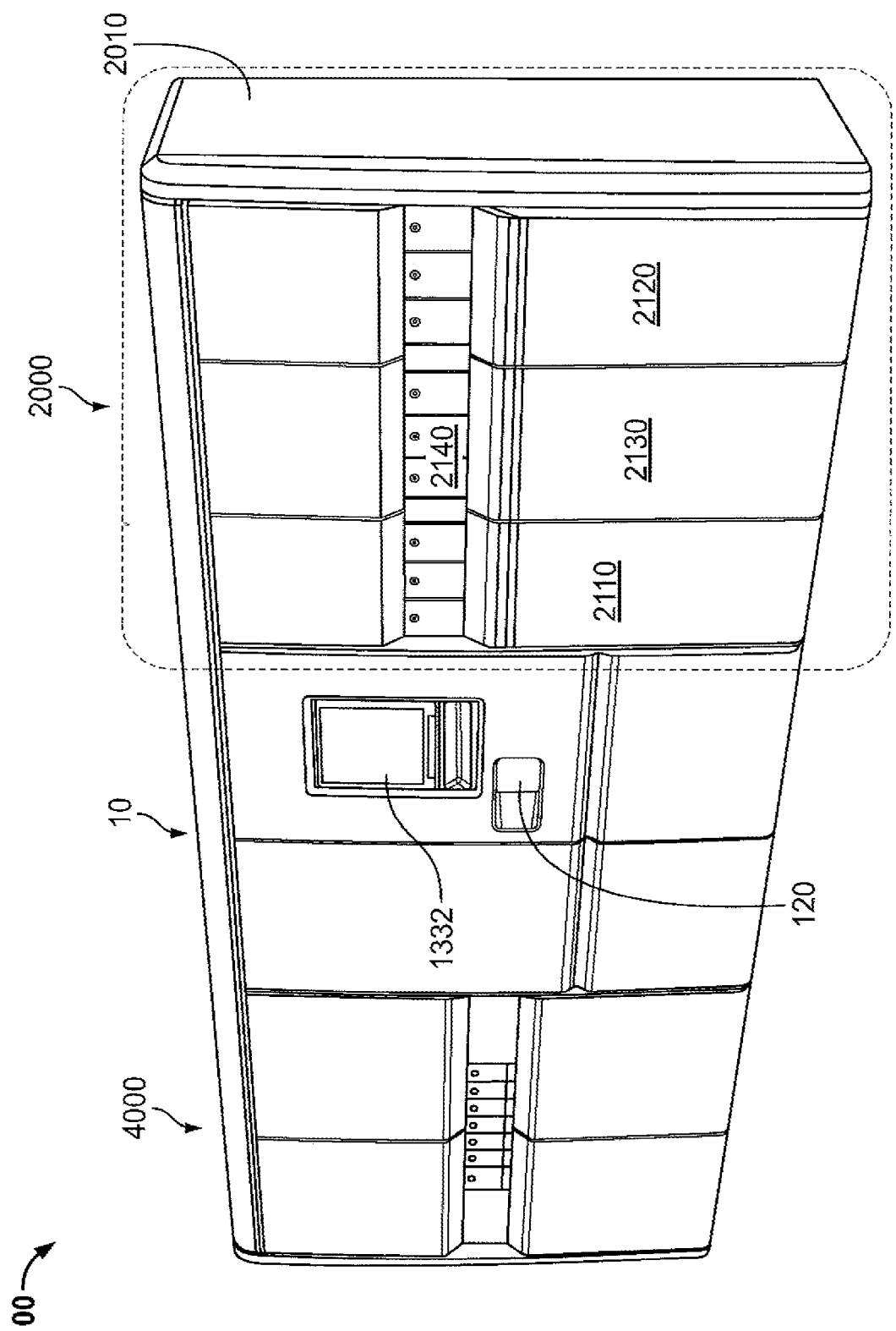
FIG. 1 is a front perspective view of a high-throughput diagnostic system according to one embodiment of the present disclosure.

FIG. 1 depicts a high-throughput system 00 which includes a first analyzer 2000, a second analyzer 4000 and a pre-analytical system 10, such as the pre-analytical system described in U.S. Provisional Application 62/296,349 ("the '349 Application"), the disclosure of which is hereby incorporated by reference herein in its entirety. The analyzers 2000, 4000 and pre-analytical system 10 are modular such that they can be physically connected and disconnected from one another and also electronically connected and disconnected from one another. Although first analyzer 2000 is different from second analyzer 4000 in terms of the operations and assays they perform, it should be understood that second analyzer 4000 can be a duplicate of first analyzer 2000 so that pre-analytical system 10 couples to at least two of the same analyzers. It should also be understood that the modularity of pre-analytical system 10 allows it to couple to any analyzer so configured. As shown, first and second analyzers 2000, 4000 are disposed at opposite sides of pre-analytical system 10 in a linear arrangement. Although, pre-analytical system 10 and analyzers 2000, 4000 are configured for this physical arrangement it is contemplated that pre-analytical system 10 can be configured to accommodate more than two analyzers and that pre-analytical system 10 and analyzers 2000, 4000 can be configured so that they can be placed in other physical arrangements such as in an L-shape, for example.

Analyzer in Relation to Pre-Analytic System

Figure 2:
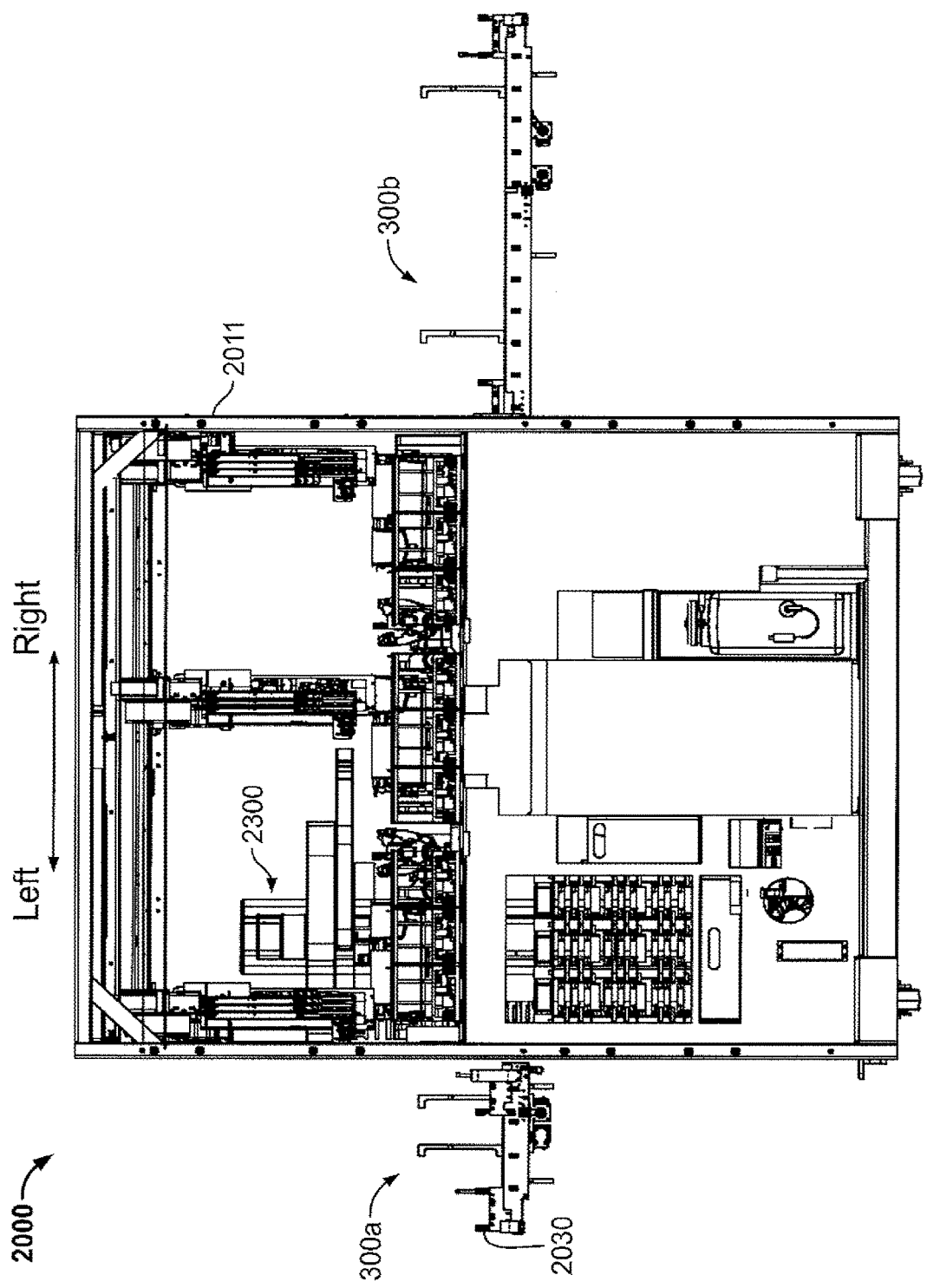
FIG. 2 is a front partially transparent view of a first analyzer of the system of FIG. 1 according to one embodiment of the present disclosure and absent its external housing and certain components therein.

As depicted in FIG. 2, the first analyzer can be coupled to either side of pre-analytical system 10. In this regard, a sample container shuttle transport assembly 300a of pre-analytical system 10 extends toward a left side of analyzer 2000 where analyzer 2000 is located to the right of system 10, or a sample container shuttle transport assembly 300b of pre-analytical system 10 extends toward a right side of analyzer 2000 where analyzer 2000 is located to the left of system 10. Such assemblies 300a-b may terminate adjacent to the analyzer's threshold as is shown. However, in some embodiments such assemblies 300a-b may extend across the analyzer's threshold and into analyzer 2000. An inventory robot 2300, described further below, can retrieve a sample container shuttle 2030 from such assemblies 300a-b regardless of which side of analyzer 2000 a sample container shuttle 2030 is delivered.

Structural Frame

Figure 3:
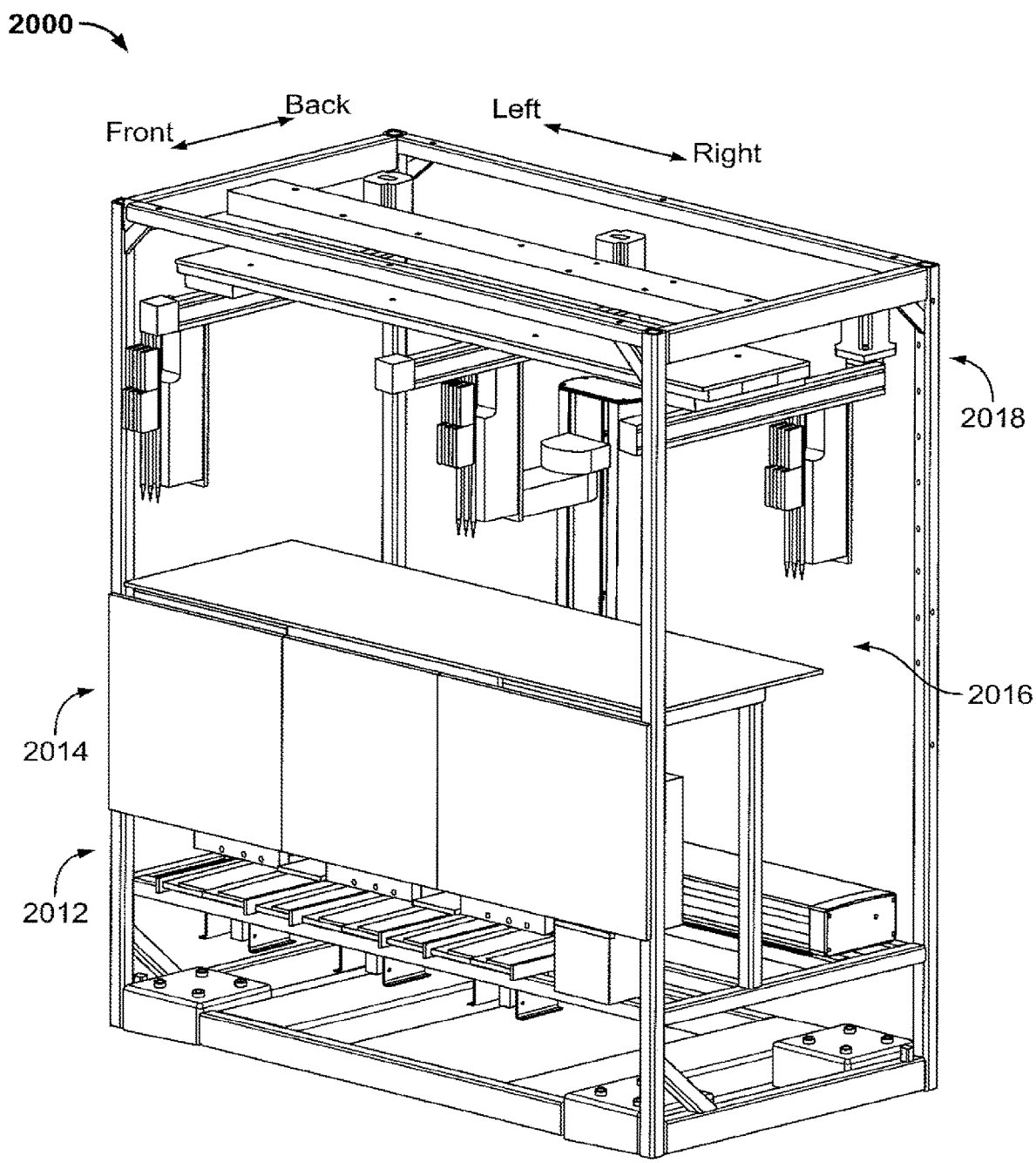
FIG. 3 front perspective view of the analyzer of FIG. 2.
Figure 6:
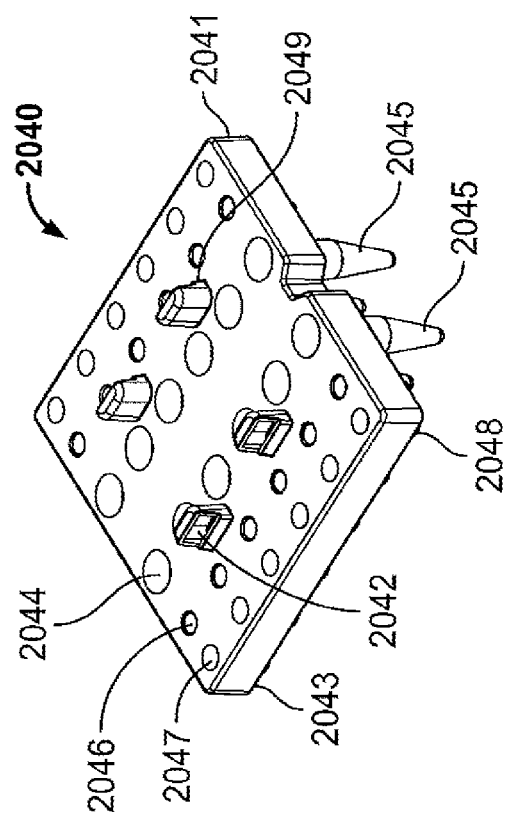
FIG. 6 is a perspective view of processing plate according to one embodiment of the present disclosure.
Figure 7:
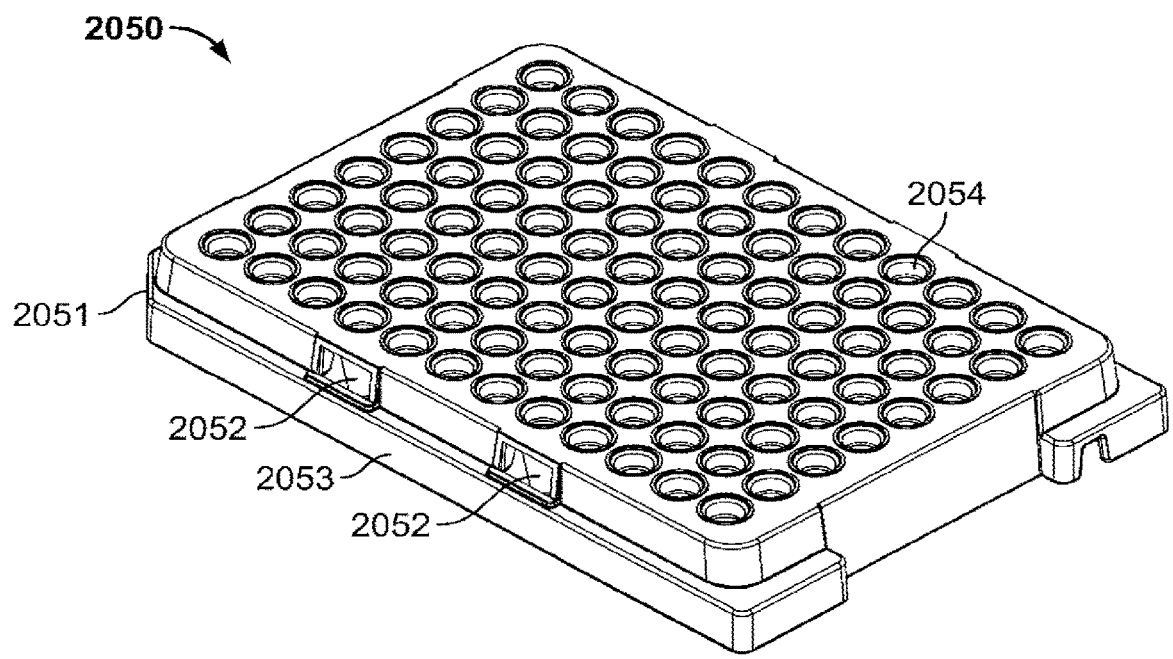
FIG. 7 is a perspective view of a dry reagent plate according to one embodiment of the present disclosure.
Figure 8:
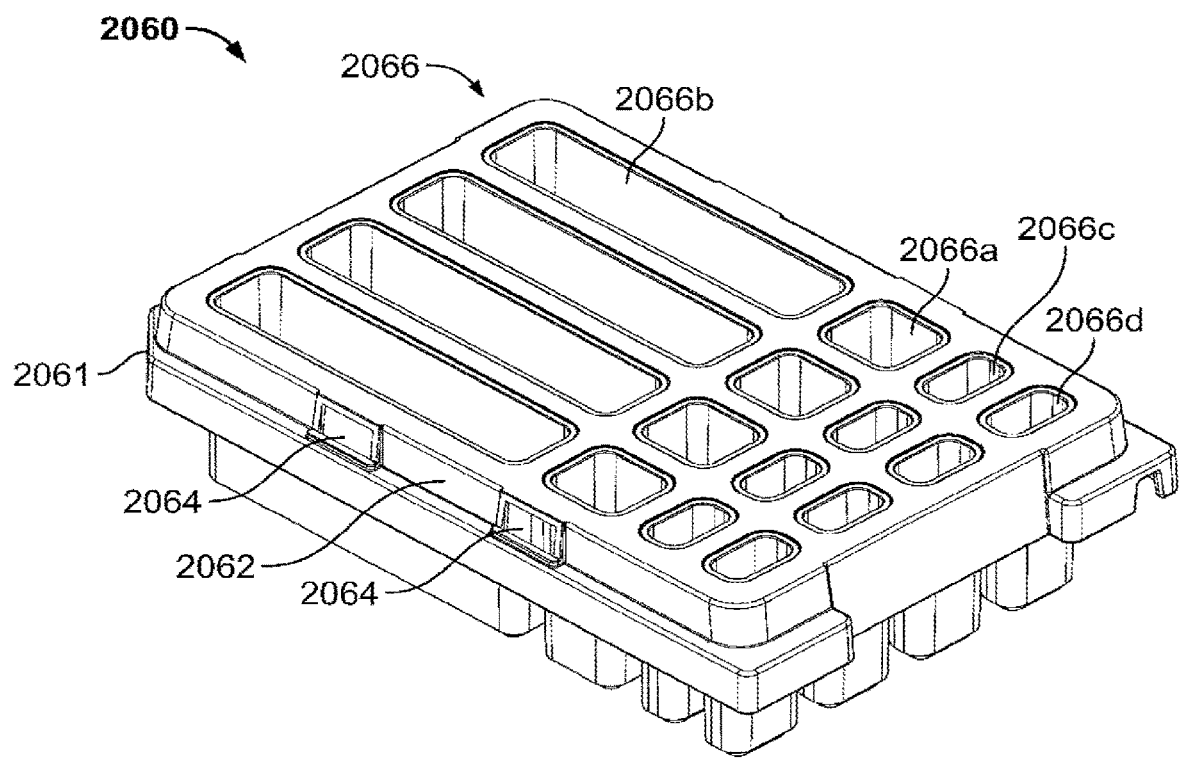
FIG. 8 is a perspective view of a liquid reagent plate according to one embodiment of the present disclosure.

As further shown in FIGS. 2 and 3, analyzer 2000 includes a structural frame 2011 comprised of several support components, such as segments of metal tubing, which are configured to support and define various decks or levels for sample processing and analysis. Such decks may include a detection/analysis deck 2012, an inventory deck 2014, a processing deck 2016, and a liquid robot handling deck 2018. However, more or less decks may be implemented to reduce horizontal length or vertical height of analyzer 2000. Analyzer 2000 also includes a housing or shell 2010 that surrounds its internal components, as shown in FIG. 1.

Deck Relationships

Detection/analysis deck 2012 is disposed near the bottom of analyzer 2000 and is located beneath inventory deck 2014. Inventory deck 2014 is disposed between processing deck 2016 and detection/analysis deck 2012. Processing deck 2016 is disposed between inventory deck 2016 and liquid handling robot deck 2018. Liquid handling robot deck 2018 is disposed near the top of analyzer 2000. Detection/analysis, inventory and processing decks 2012, 2014, 2016 are each located at the front of analyzer 2000 and terminate before reaching the back of analyzer so as to provide a space that spans the length of analyzer 2000 in a right-left direction and also extends along the height of analyzer 2000 so as to intersect the detection/analysis, inventory, and processing decks 2012, 2014, 2016. An inventory robot 2300 is disposed within the space so provided that allows it to access each one of those three aforementioned decks.

Consumables

FIGS. 4A-8 depict various consumables that can be automatically handled and utilized for performing a broad menu of assays on several categories of samples including blood, mucus, sputum, urine, feces, liquid based cytological samples and the like. Such menu includes assays involving the detection of *Chlamydia trachomatis, Neisseria gonorrhoeae, Trichomonas vaginalis*, group B *streptococcus*, enteric bacteria (e.g., *Campylobacter, Salmonella, Shigella, Escherichia coli, Shigella dysenteriae*), and enteric parasites (e.g., *Giardia lamblia, Cryptosporidium, Entamoeba histolytica*) and also assays involving the determination of blood viral loads (e.g., HIV, HCV, and HBV). The ability to perform such a broad menu of assays is partially supported by the consumable design. Such consumables includes pipette tips, sample containers, sample container shuttles, processing plates, dry reagent plates, liquid reagent plates, and amplification cartridges.

Pipette Tips

Pipette tips 2020 include a first pipette tip 2020a (FIG. 4A) and a second pipette tip 2020b (FIG. 4B). First pipette tip 2020a is larger than second pipette tip 2020b. For example, first pipette tip 2020a may be 1 mL tip while second pipette tip 2020b may be a 175 uL tip. However, analyzer 2000 is capable of accommodating any size pipette tip as needed.

Sample Shuttle and Sample Container

Sample container shuttle 2030 (FIG. 5) is similar to shuttle 284 of the '349 Application and includes receptacles 2032 each configured to receive a sample container 03. The particular shuttle 2030 depicted includes two rows of six receptacles 2032 for a total of twelve receptacles. However, any number of receptacles 2032 can be provided. For example, shuttle 2030 may include two rows of twelve receptacles 2032 for a total number of 24 receptacles. In the particular analyzer 2000 depicted, a batch of samples may include 24 total samples which would equate to 24 total sample containers. However, analyzer 2000 may perform dual-lane assays, or other multiple lane assays, where a single sample is processed and analyzed twice or more in one run. Thus, some batches of 24 total samples may only need 12 total sample containers to get that total sample count. As such, having each shuttle 2030 accommodative of half of a full sample batch provides analyzer with flexibility to efficiently accommodate dual-lane assays or other multiple lane assays.

Shuttle 2030 also includes first transverse openings 2034 for engagement with inventory robot 2300 and second transverse openings 2036 which intersect corresponding receptacles 2032 to allow a sample container retention assembly (described below) to access containers 03 disposed therein. Sample containers 03 are the same as the third-type container 03 of the '349 Application. In this regard, sample containers 03 include caps with a penetrable seal 09.

Processing Plate

Processing plate 2040 (FIG. 6) includes a plate body 2041. Engagement members 2049 extend from an upper surface of plate body 2041. Such engagement members 2049 include engagement notches 2042. Thus, notches 2042 are positioned above plate body 2041 and inboard relative to sides of plate body 2041. This allows an end effector, such as end effector 2360 described further below, to grip processing plate 2040 from above plate body 2041. However, in some embodiments of plate 2040, notches 2042 may extend into side surfaces of body 2041 which allows inventory robot 2300 to engage processing plate 2400 from a periphery of body 2041.

Plate body 2041 at least partially defines a plurality of extraction tubes 2044, mixing wells 2046 and pipette tip holding stations 2047. Each extraction tube 2044 has a corresponding mixing well 2046 and pipette tip holding station 2047 aligned with it. Extraction tubes 2044 are located closer to a midline of body 2041 than mixing wells 2046, and mixing wells 2046 are located closer to the midline of body 2041 than pipette tip holding stations 2047. Extraction tubes 2044 have openings defined by body 2041 and have a tube body 2045 extending from a bottom surface 2043 of body 2041. Tube body 2045 defines an outer surface of revolution, such as conical surface of revolution. Pipette tip holding stations 2047 also have openings defined by body 2041 and a sleeve 2048 that extends from bottom surface 2043. Such sleeve 2048 keeps a pipette tip 2020 stable when disposed therein even if the processing plate is moved. Two rows of extraction tubes 2044, mixing wells 2046, and pipette tip holders 2047 are provided and are arranged parallel to each other. In the particular embodiment depicted, processing plate 2040 includes two rows of six extraction tubes 2044, mixing wells 2046 and pipette tip holding stations 2047, which allows twelve samples to be processed therein. However, more or less is contemplated.

For example, processing plate 2040 can include two rows of twelve extraction tubes 2044, mixing wells 2046 and pipette tip holding stations 2047 or even a single row of such. Processing plate 2040 includes an identifier, such as a barcode, on a side surface or other surface thereof which helps analyzer 2000 identify the plate.

Dry Reagent Plates

Dry reagent plate 2050 (FIG. 7) includes a plate body 2051. Engagement notches 2052 extend into the side surfaces 2053 of body 2051 which allows inventory robot 2300 to engage dry reagent plate 2050 from any two opposing sides thereof. Plate body 2051 defines a plurality of dry reagent compartments 2054. A penetrable membrane (not shown) is placed over each of these compartments 2054 and is sealed to plate body 2051 so that if the membrane is penetrated to obtain access to one compartment, the remaining compartments remain sealed. This allows plate 2050 to be stored until needed for another batch of samples. As depicted, there are 96 total reagent compartments 2054 which allow reagent plate 2050 to be utilized for four separate runs of 24 sample batches. However, this total number can vary. Dry reagent plate 2050 also includes an identifier, such as a barcode, on a side surface 2053 or other surface thereof which helps analyzer 2000 identify the plate.

Figure 10A:
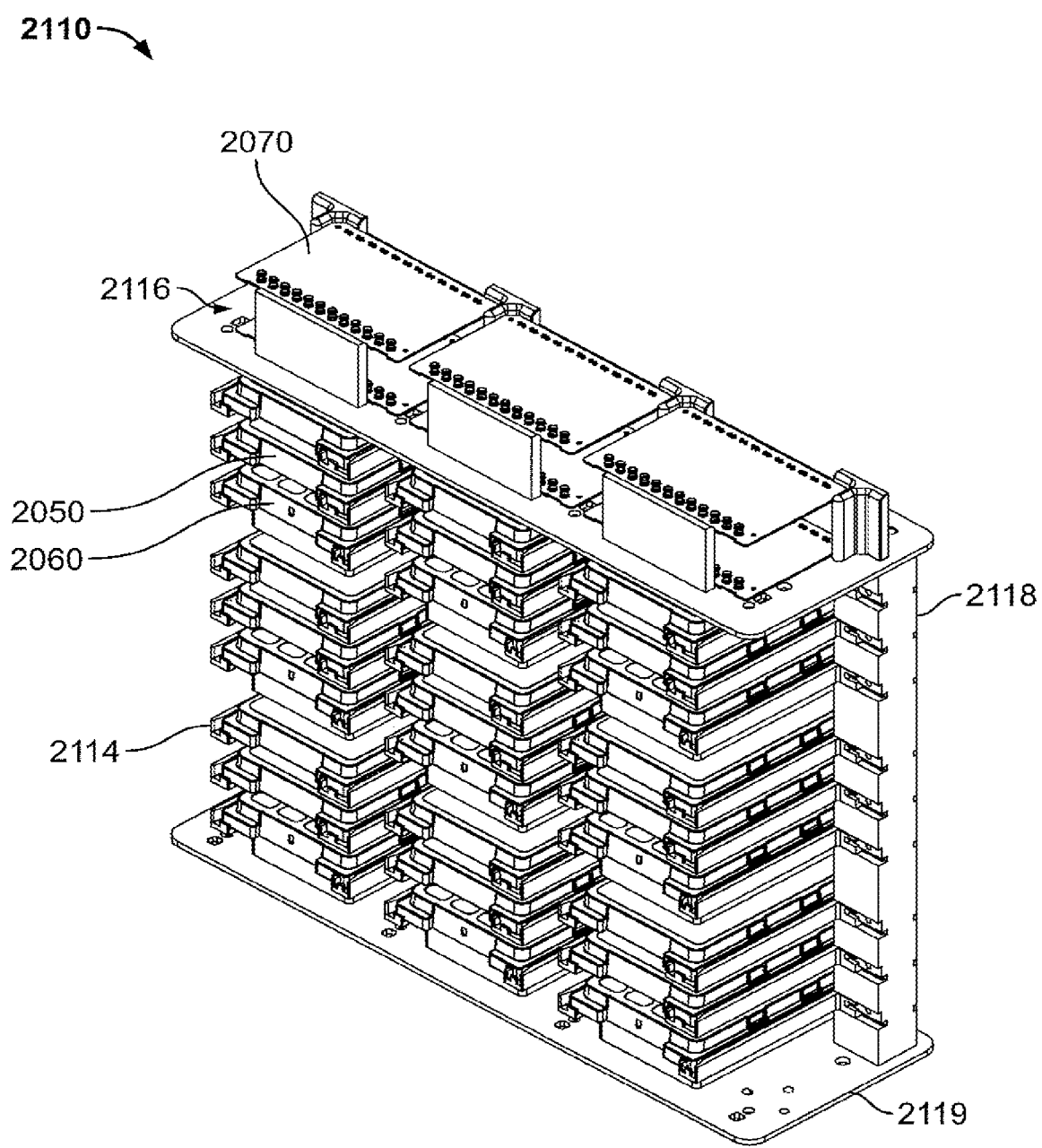
FIG. 10A is a rear perspective view of a consumable repository according to one embodiment of the present disclosure.
Figure 10B:
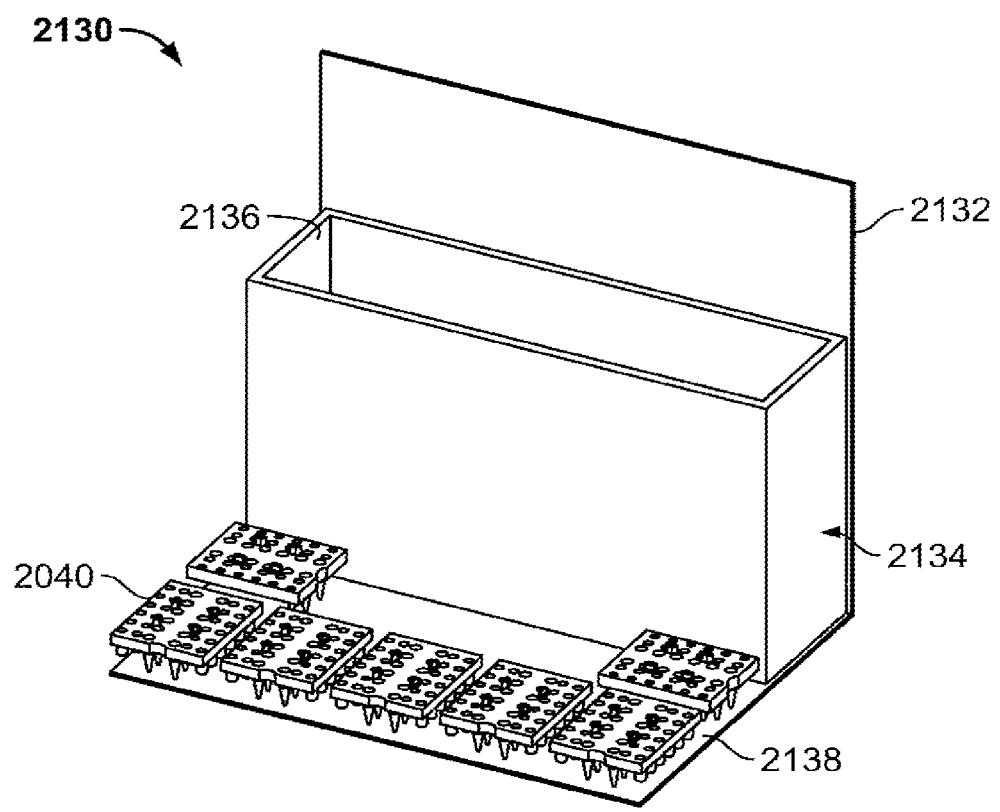
FIG. 10B is a rear perspective view of a waste repository according to one embodiment of the present disclosure.
Figure 10C:
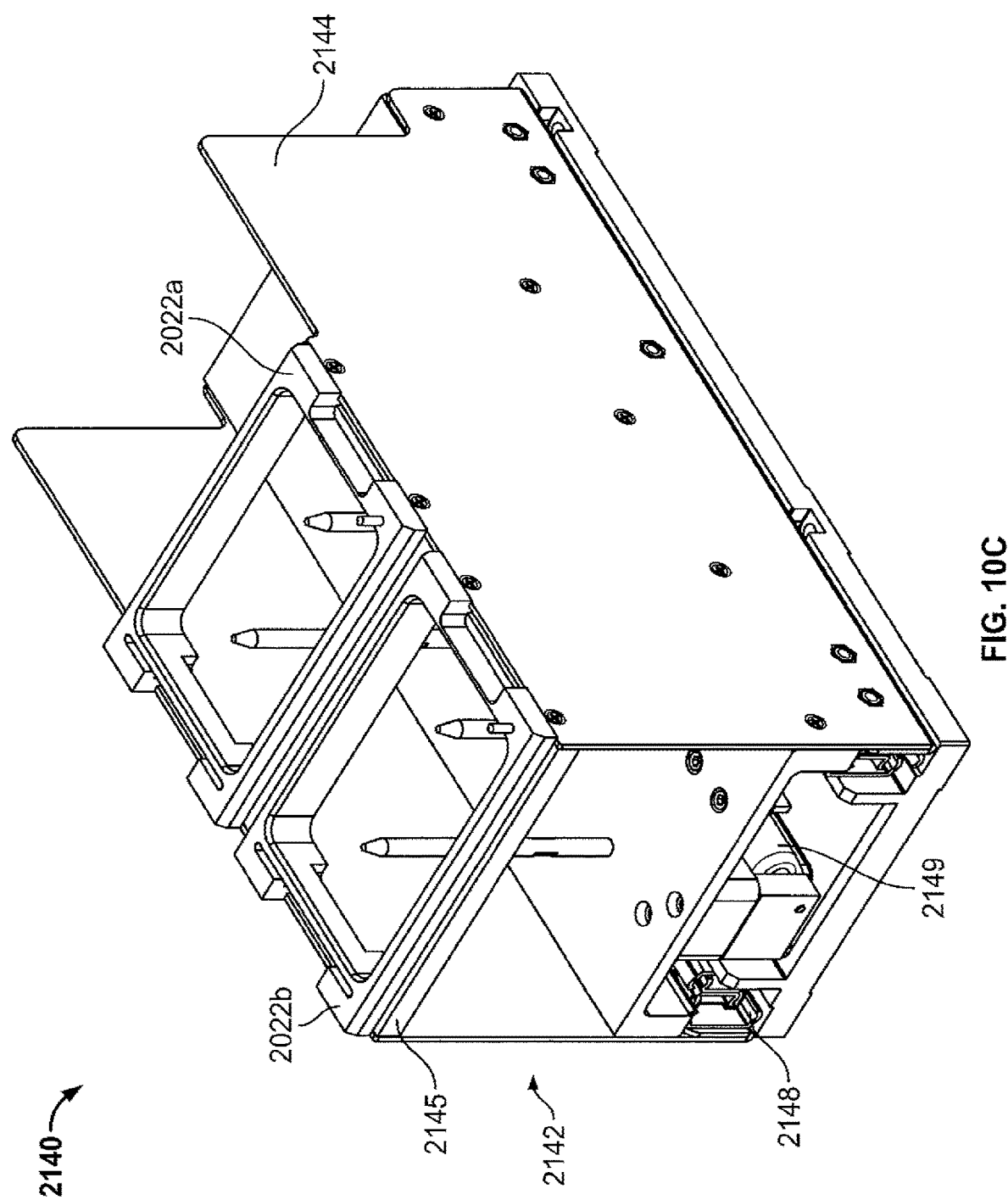
FIG. 10C is a front perspective view of a pipette tip drawer according to one embodiment of the present disclosure.

In one embodiment two dry reagent plates 2050 are utilized for each assay: a first dry reagent plate or extraction reagent plate 2050a and a second dry reagent plate or amplification reagent plate 2050b (see FIG. 10C). In this regard, extraction reagent plate 2050a is loaded with a lysis buffer and extraction beads, and amplification reagent plate 2050b is loaded with a master mix reagent.

Each reagent compartment 2054 within the same plate 2050 is loaded with the same reagent so that the reagent plate is assay specific. Thus, where more than one assay is performed by analyzer 2000, separate reagent plates each with reagents specific to that assay are utilized. Thus, for one assay performed by analyzer 2000, at least two dry-reagent plates 2050 are utilized (e.g., one extraction reagent plate 2050a and one amplification reagent plate 2050b). Similarly, where two different assays are performed by analyzer 2000, at least four dry-reagent plates 2050 are utilized (e.g., two extraction reagent plates 2050a and two amplification reagent plates 2050b). Although, the extraction and amplification dry reagent plates 2050a-b are described as being separate, it is contemplated that they may be combined into a single reagent plate.

Liquid Reagent Plate

The liquid reagent plate 2060 (FIG. 8) includes a plate body 2061 defined by upper and lower surfaces and side surfaces 2062 extending therebetween. Engagement notches 2064 extend into the side surfaces 2062 of body 2061 which allows the inventory robot 2300 to engage liquid reagent plate 2060 from any two opposing sides thereof. Liquid reagent plate 2060 includes a plurality of reagent compartments 2066 organized in four processing rows 2066. Each one of these rows 2066 includes four compartments 2066a-d where each compartment holds a reagent for a sample processing step. For example, each processing row 2066 includes a first compartment 2066a for a reconstitution buffer, a second compartment 2066b for a wash buffer, a third compartment 2066c for an elution buffer, and a fourth compartment 2066d for a neutralization buffer. These compartments 2066a-d are arranged in the order in which they are used. However, they could be in other arrangements. In addition, each compartment 2066 holds enough reagent to process a full batch of samples, for example a batch of 24 total samples. A penetrable membrane (not shown) is placed over each of these compartments 2066 and is sealed to the plate body 2061 so that if the membrane is penetrated to obtain access to one compartment, the remaining compartments remain sealed. This allows liquid reagent plate 2060 to be stored until needed for another batch of samples. Liquid reagent plate 2060 also includes an identifier, such as a barcode, on a side surface 2062 or other surface thereof which helps analyzer 2000 identify the plate.

Amplification Cartridge

Figure 9:
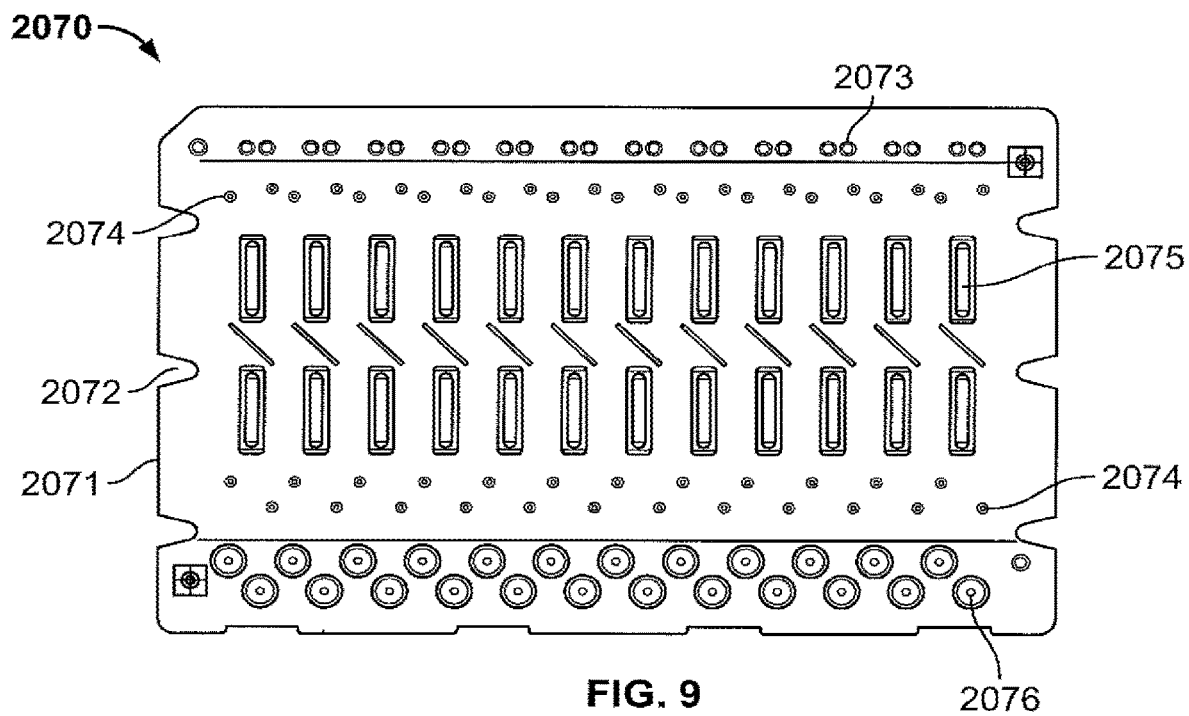
FIG. 9 is a top view of an amplification cartridge according to one embodiment of the present disclosure.

The amplification cartridge 2070 (FIG. 9) is similar to the BD MAX™ PCR cartridges associated with the BD MAX™ system (Becton Dickinson, Franklin Lakes, NJ) and is described in U.S. Pat. Nos. 7,332,130; 7,998,708; 8,105,783; 8,440,149; 8,709,787; 8,765,076, the disclosures of which is hereby incorporated herein by reference in their entirety. Amplification cartridge 2070 includes inlet ports 2073, microfluidic channels (not shown), wax valves 2074, amplification chambers 2075, and venting holes 2076. A processed sample is inserted into cartridge 2070 via inlet ports 2073 which travels down the microfluidic channels into amplification chambers 2075. Venting holes 2076 allow air to escape as the sample travels down the channels. Wax valves 2074, when melted, seal chambers 2075 so that amplification of the sample can occur therein. Transparent or translucent windows partially defining chambers 2075 allows a detector to detect the presence of an analyte or target therein.

Figure 13A:
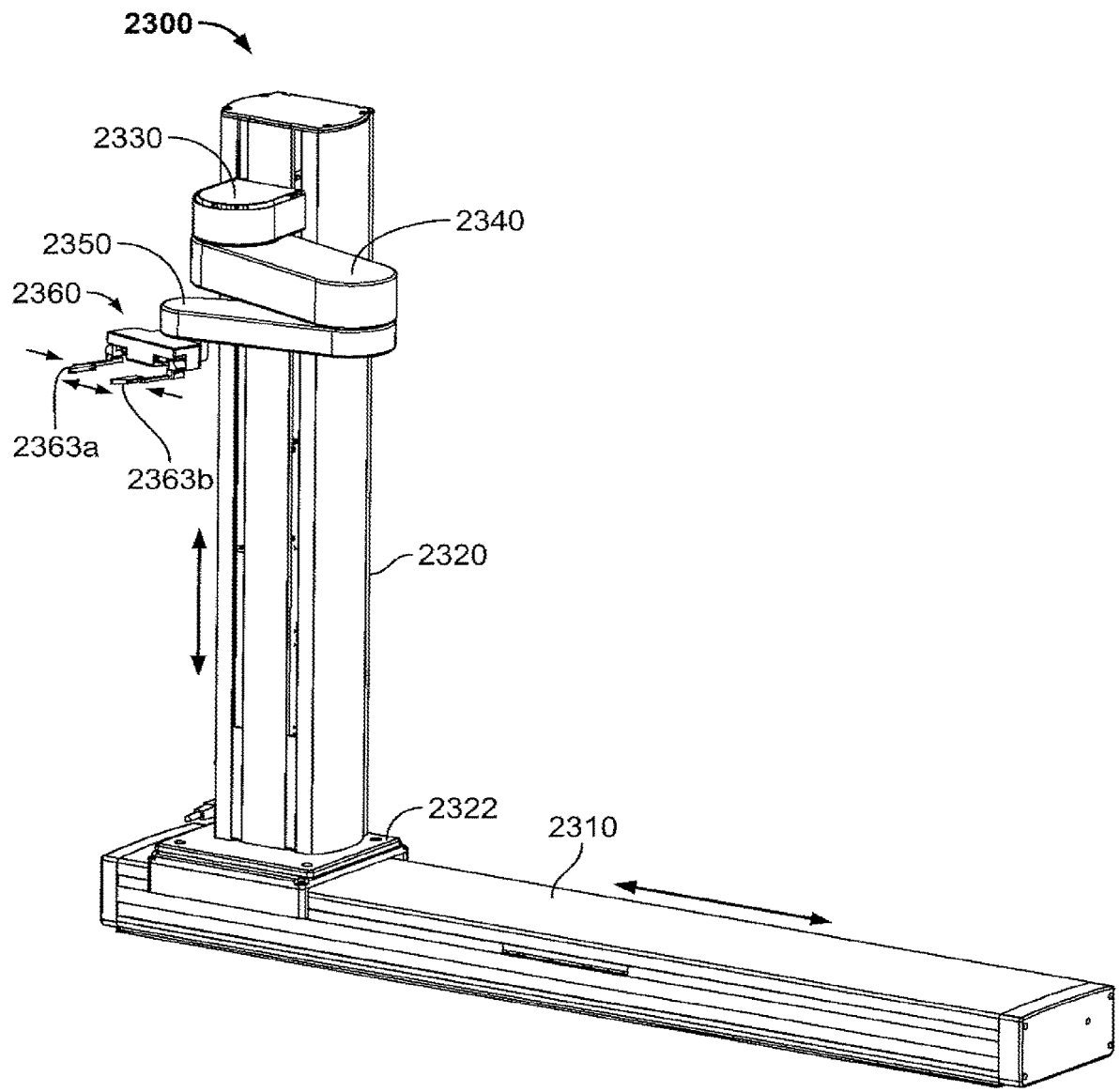
FIG. 13A is a front perspective view of an inventory robot according to an embodiment of the present disclosure.

Amplification cartridge 2070 also includes engagement notches 2072 extending into side surfaces of cartridge 2070. These notches 2072 extend into cartridge 2070 at opposite sides thereof and taper inwardly toward a midline of the cartridge. In addition, notches 2072 are located at sides adjacent to the sides of the cartridge that include inlet ports 2073 and vents 2076. This prevents notches 2072 from interfering with these structures. Notches 2072 allow inventory robot 2300 to engage amplification cartridge 2070 so that cartridge 2070 can be carried by robot 2300. Although, in some embodiments, amplification cartridge 2070 may not have such notches 2072 and may employ other features for engagement with a robotic gripper. A lower surface 2079 of cartridge 2070 where it intersects notch 2072 is beveled or otherwise contoured to match the contour of an engagement post 2365 of the robot as is described further below and as illustrated in FIG. 13D, which a forms recess or indentation 2077 in lower surface 2079 about notch 2072 that further assists robot engagement. Amplification cartridge also includes an identifier, such as a barcode, on a top or bottom surface 2078, 2079 thereof which helps analyzer 2000 identify the cartridge.

Consumable Staging

FIGS. 10A-10C depict various aspects of consumable staging within the inventory deck 2014 and processing deck 2016. Inventory deck 2014 includes at least one consumable repository, such as consumable repository 2110 (FIG. 10A). Inventory deck 2014 also includes at least one waste repository, such as waste repository 2130 (FIG. 10B). Processing deck 2016 also includes a plurality of pipette tip drawer assemblies 2140 (FIG. 10C). Consumable repository 2110, waste repository 2130, and pipette tip drawers 2140 are each accessible by a user from the front of analyzer 2000 so that the user can load and unload various consumables utilized by analyzer 2000.

Consumable Repository

As shown in FIG. 10A, consumable repository 2110 includes support structures or beams 2114 that extend horizontally from columns 2118 that extend vertically from a base 2119. The support structures 2114 define compartments for individual consumable items so that the consumable items may be loaded into the compartments from a first side of the columns 2118 and offloaded from a second side of the columns 2118. For example, support structures 2114 may slidingly receive and support a dry reagent plate 2050 or a liquid reagent plate 2060 as shown in FIG. 10A. Such plates 2050 and 2060 may be slid into their respective compartments from a front side of columns 2118 by a user so that an identifier, such as a bar code, is facing toward an interior of system 2000. An inventory robot 2300, described further below, may scan the identifier to identify the particular plate and remove the appropriate plate 2050, 2060 from a back side of columns 2118 as needed. In this regard, consumable items, such as plates 2050 and 2060, may be loaded by a user in any order as system 2000, with assistance from robot 2300, can conduct an inventory and automatically determine the order in which the consumables were loaded by the user. In addition, support structures 2114 hold plates 2050, 2060 at a lower end thereof so that openings 2052, 2064 thereof are exposed thereby allowing robot 2300 to engage a selected plate for removal from their respective compartments. Also as shown, amplification cartridges 2070 may be stacked within respective cartridge storage compartments 2116 at a top end of consumable repository 2110. Cartridges 2070 can be stacked by a user in storage compartment 2116 from the front side of system 2000 and removed therefrom by robot 2300.

In one embodiment, consumable repository 2110 may be attached to a set of tracks that allows repository 2110 to be pulled out like a drawer for restocking. A pneumatic piston (not shown) may assist in opening repository 2110 and may also provide damping to prevent repository 2110 from closing too quickly and jostling the consumables out of position. In other embodiment, repository 2110 can be hinged so that door 2112 can swing open toward the user revealing the repository for restocking.

Waste Repository

Waste repository 2130 (FIG. 10B) includes a door 2132 that is accessed by the user at the front of analyzer 2000. A waste compartment 2134, which has an opening 2136 parallel to door 2132, is attached to a backside of door 2132. Repository 2130 also includes a shelf 2138 extending from waste compartment 2134. This shelf 2138 allows used processing plates 2040 to be stacked by inventory robot 2300 thereon as depicted. Repository 2130 may also contain a liquid container within opening 2136 that may communicate with one or more liquid waste receptacles 2260 (see FIG. 11B) located on processing deck 2016. Waste repository 2130 may be attached to a set of tracks that allows repository 2130 to be pulled out like a drawer for emptying. A pneumatic piston (not shown) may assist in opening repository 2130 and may also provide damping to prevent repository 2130 from opening too quickly and jostling processing plates 2040. Alternatively, repository 2130 can be hinged so as to swing open toward the user for emptying.

Pipette Tip Drawers

Pipette tip drawer assembly 2140 (FIG. 10C) includes a tip drawer 2142 that is generally a box-like structure that includes sidewalls 2144 and transverse walls 2145 that includes one or more openings for receipt of a pipette tip rack carrying a plurality of pipette tips. In the embodiment depicted, there are two openings in transverse wall 2145 of tip drawer 2142 for receipt of two pipette tip racks (not shown). A first rack may include first pipette tips and a second rack may include second pipette tips. Pipette tip drawer 2142 is attached to one or more tracks 2148 that allows drawer 2142 to be partially pulled out of analyzer 2000 for removal of empty tip racks and restocking with fresh tip racks. A door (not shown) may be attached to one end of drawer 2142 so that when drawer 2142 is closed, the door forms a portion of the analyzer's outer shell. A pneumatic piston 2149 may assist in opening drawer 2142 and may also provide damping to prevent drawer 2142 from opening or closing too quickly.

Processing Modules

Processing Modules/Lanes

Figure 11A:
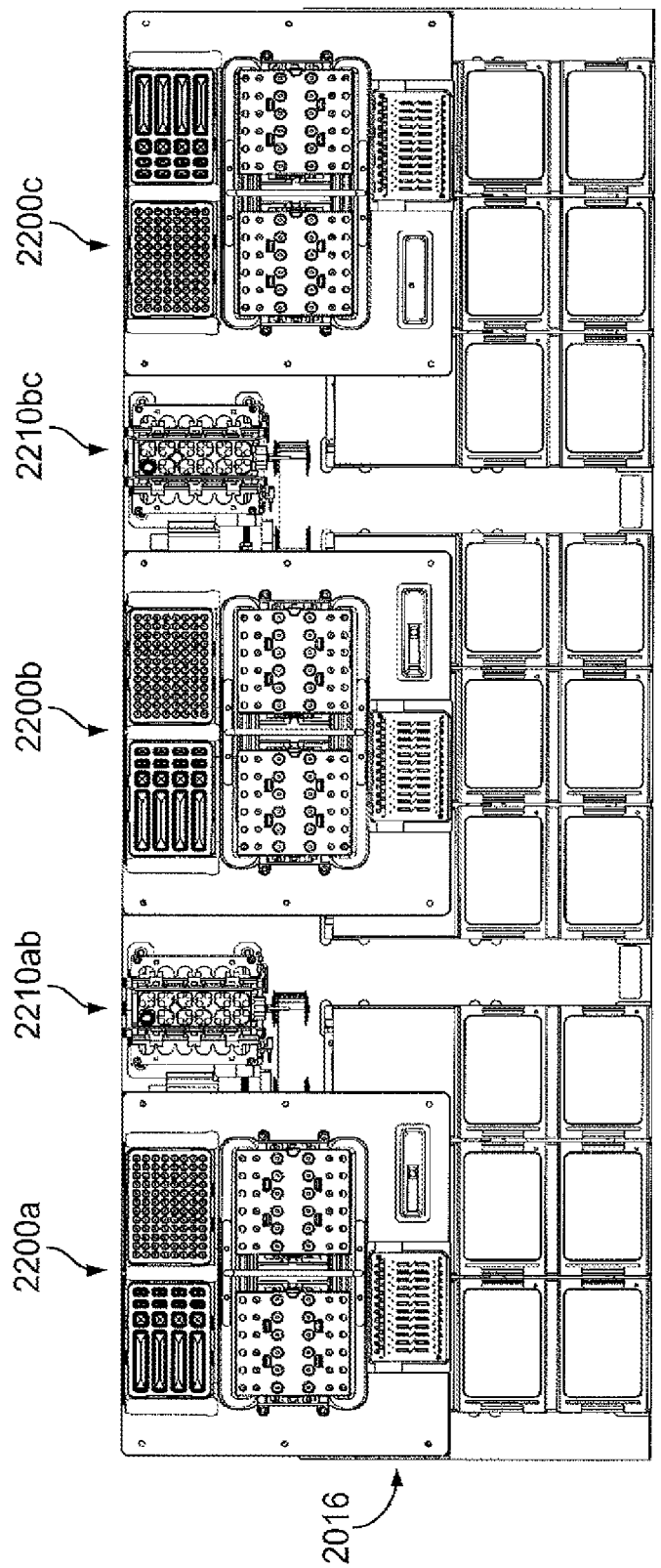
FIG. 11A is a top view of a processing deck according to one embodiment of the present disclosure.

FIG. 11A depicts processing deck 2016 which includes a plurality of processing modules 2200 arranged side-by-side. As shown, processing deck 2016 includes three processing modules: a first processing module 2200a, as second processing module 2200b, and a third processing module 2200c. However, analyzer 2000 can include more or less processing modules 2200 to accommodate the throughput needs and space requirements of a particular laboratory. Processing modules 2200a-c are similarly configured in terms of their physical arrangement with the difference among them being their location relative to a shuttle platform having a jaw assembly that functions as a sample container retention assembly 2210 which may be shared by adjacent modules. For example, first and second processing modules 2200a-b may both utilize a first sample container retention assembly 2210ab to retain sample containers 03 therefor, and second and third processing modules 2200b-c may both utilize a second sample container retention assembly 2210bc to retain sample containers 03 therefor.

Although each processing module 2200 is similarly configured, each processing module 2200 is capable of performing a wide array of assays so that each processing module 2200 can run an assay that is different from an assay being performed concurrently in another processing module. In this regard, each processing module 2200 can be automatically designated and redesignated to perform any number of assays types depending on the processing needs at a particular point in time. For example, first processing module 2200a may be designated to perform a first assay, second processing module 2200b a second assay, and third processing module 2200c a third assay where each assay is different. However, when those assays are completed, any one of the processing modules 2200a-c can be automatically redesignated to perform a different assay, so that each of the first, second, and third processing modules 2200a-c run the same assay, for example. As such, the analyzer 2200 is flexible to accommodate real-time needs provided sufficient consumables for a particular assay are inventoried within its housing 2010.

Example of Processing Module

Figure 11B:
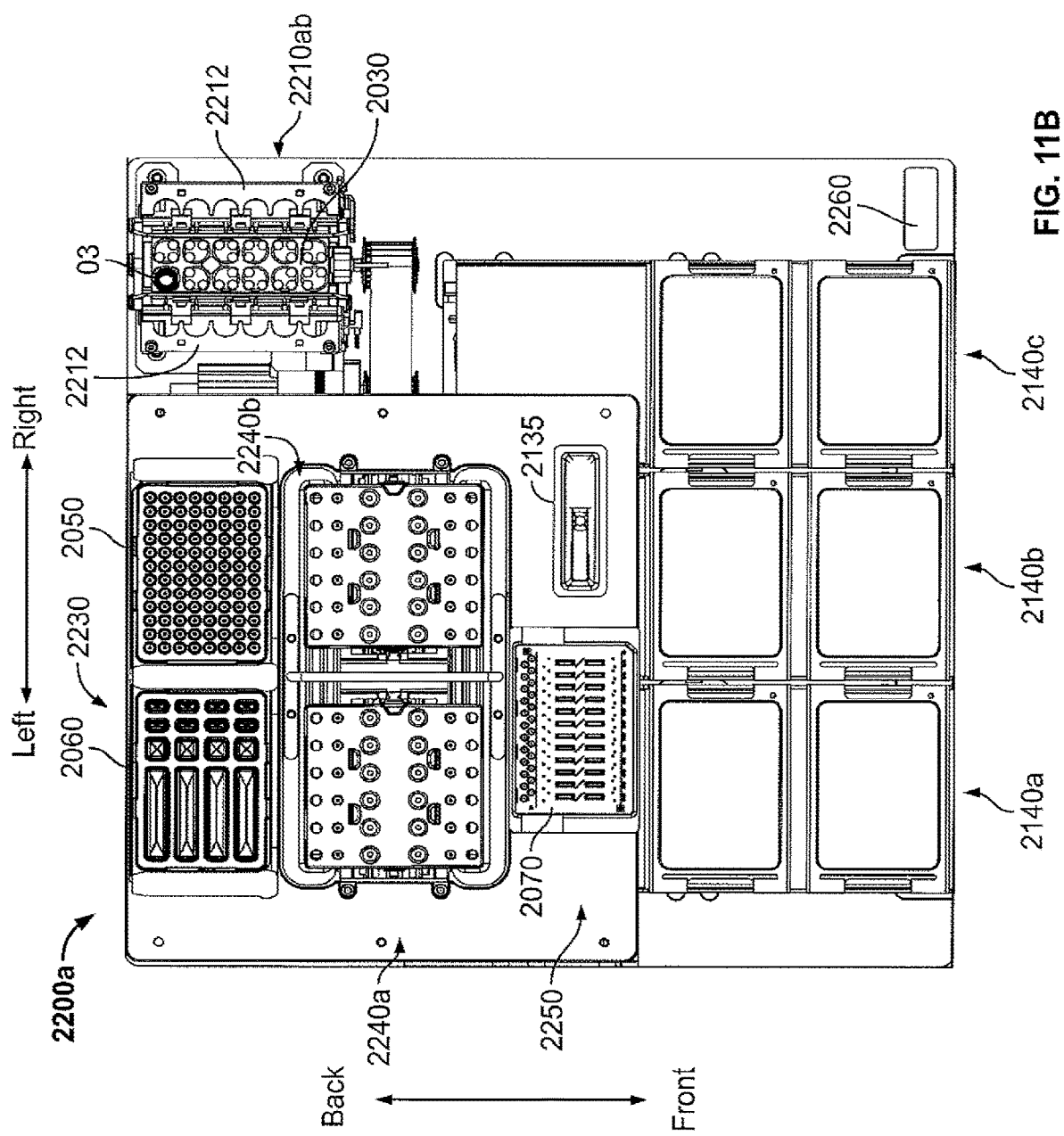
FIG. 11B is a top view of a first processing module of the processing deck of FIG. 11A according to one embodiment of the present disclosure.

FIG. 11B depicts first processing module 2200a and is exemplary of the other processing modules. First processing module 2200a generally includes the first sample container retention assembly 2210ab (which is shared by second processing module 2200b), a dry-reagent station 2220, a liquid reagent station 2230, extractors 2240, an amplification cartridge station 2250, pipette drawers 2140, and a waste receptacle 2260. These components can be arranged in any configuration. However, in the embodiment depicted, dry-reagent station 2220 and liquid reagent station 2230 are located at a backend of processing deck 2016 and disposed adjacent to each other. A first and second extractor 2240a-b are located adjacent reagent stations 2220 and 2230 and are positioned between amplification cartridge station 2250 and reagent stations 2220, 2230. This allows for the efficient transfer of liquid therebetween. Pipette tip drawers 2140 are located at the front of processing deck 2016 allowing a user to have easy access thereto. Processing module 2200a preferably includes three pipette tip drawers 2140 each holding a first pipette tip rack 2022a carrying first pipette tips 2020a and a second pipette tip rack 2022b carrying second pipette tips 2020b. This amount of pipette tips 2020 allows processing module 2200a to perform about twelve assay runs without restocking. Sample container retention assembly 2210ab is disposed to the side of extractors 2240a-b and reagent plate stations 2220, 2230 and between first and second processing modules 2200a-b. Also between first and second processing modules 2200a-b is a waste receptacle 2260. Waste receptacle allows used pipette tips to be discarded into waste repository 2130 from above processing deck 2016. Waste receptacle 2260 may also include a liquid waste inlet (not shown) that allows liquid waste to be disposed into a bottle or some other container within the waste repository 2130.

Sample Container Retention Assembly

Figure 11C:
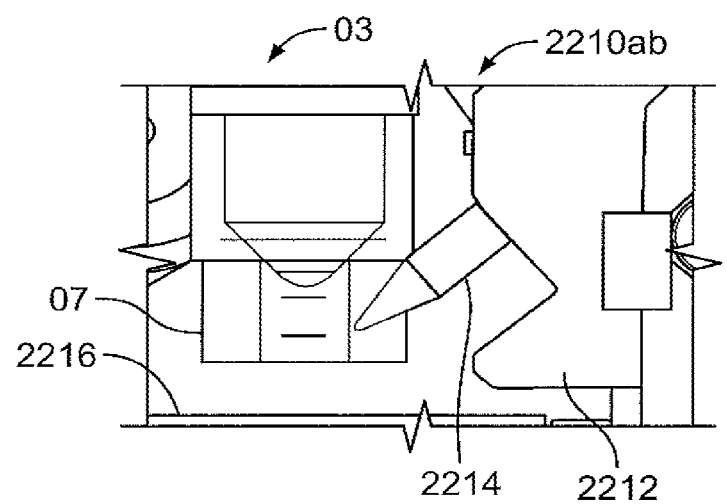
FIG. 11C is a schematic view of a sample container being engaged by a sample container retention assembly of the processing deck of FIG. 11A.

Sample container retention assembly 2210ab is similar to sample container retention assembly 1100 of the '349 Application in that it includes a clamping assembly 2212 that closes toward a shuttle 2030 disposed within the clamping assembly to retain shuttle 2030 and containers 03 within the shuttle 2030 while aliquots are aspirated from containers 03. In this regard, clamping assembly 2212 includes engagement members 2214 which are configured to project through second transverse openings 2036 in shuttle 2030 when clamping assembly 2212 is closed to engage a skirt 07 at a bottom end of sample containers 03, as best seen in FIG. 11C. These engagement members 2214 penetrate/bite into skirts 07 of respective containers 03 to prevent containers 03 from being inadvertently removed from shuttle 2030 during aspiration. However, unlike retention assembly 1100, retention assembly 2210ab has a stationary platform 2216 upon which shuttle 2030 rests, whereas retention assembly 1100 utilizes a moving conveyor 1116. Thus, instead of a conveyor to transport a shuttle 2030 into position within clamping assembly 2210ab, inventory robot 2300 places shuttle 2030 into position within clamping assembly 2212.

Reagent Plate Stations

Dry reagent plate station 2220 and liquid reagent plate station 2230 may each include a receptacle defined by a support structure (not shown), such as a pair of rails, extending from a surface of deck 2016. Such receptacles may receive a corresponding reagent plate to help ensure each plate is placed in a precise location. As shown, processing module 2200a includes one dry reagent plate station 2220 and one liquid reagent plate station 2230. Since analyzer 2000 typically utilizes two dry reagent plates 2050a-b for each assay performed, dry reagent plates 2050a-b are exchanged during operation. However, it is contemplated that an additional dry reagent plate station may be incorporated into processing module 2200a to allow each of reagent plates 2050a-b to be located on processing deck 2016 at one time. Processing module 2200a may also include a recessed support structure that allows an amplification cartridge 2070 to be precisely placed by inventory robot 2300.

Extractor

Figure 12A:
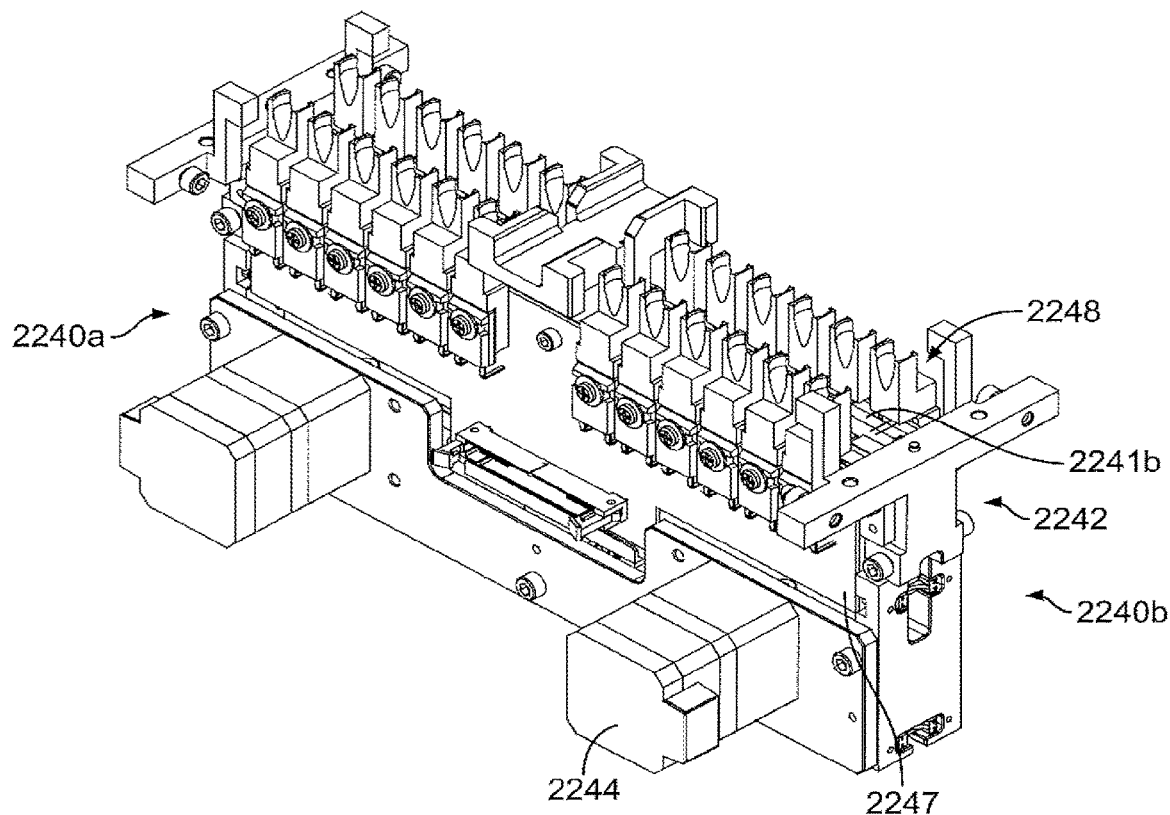
FIG. 12A is a front perspective view of an extractor of the processing module of FIG. 11B according to one embodiment of the present disclosure.
Figure 12B:
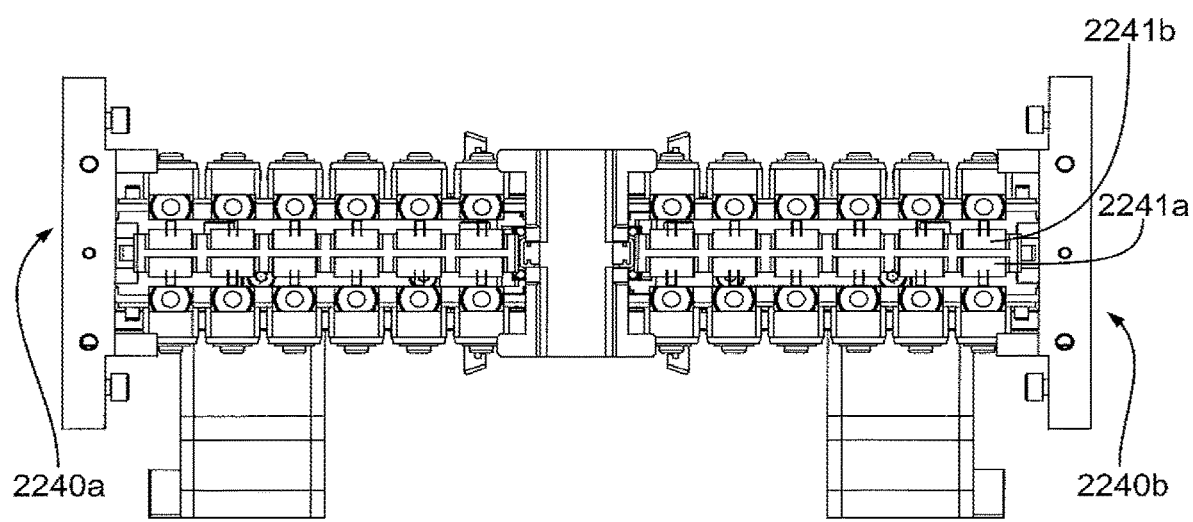
FIG. 12B is a top view of the extractor of FIG. 12A.

An extractor assembly, as depicted in FIGS. 12A and 12B, includes two extractors: a first extractor 2240a and a second extractor 2240b. Each extractor 2240a-b includes a housing 2242, printed circuit boards 2247 ("PCB"), a motor 2244, a drive mechanism 2246, permanent magnets 2241 and heating elements 2248. Other exemplary extractor assemblies include the extractor of the BD MAX™ system (Becton Dickinson, Franklin Lakes, NJ) and is described in U.S. Pat. No. 8,133,671, the disclosure of which is hereby incorporated herein by reference in its entirety. Permanent magnets 2241 are mounted to drive mechanism 2246 and are disposed within housing 2242. Permanent magnets 2241 are arranged in two rows of six magnets so as to form six pairs of adjacent magnets 2241a-b. This side-by-side pairing of magnets 2241a-b has been found to enhance the magnetic attraction of magnetic beads within a processing plate 2040 over that of a single magnet. The rows of magnets 2241 are moveably connected to drive mechanism 2246 and are moveable into and out of housing 2242 through an opening at the top of housing 2242 via drive mechanism 2246 which is operated by motor 2244.

PCBs 2247 and heating elements 2248 are connected to opposing sides of housing 2242. Heating elements 2248 are arranged in two rows of six and extend above housing 2242. Each heating element 2242 defines a recess 2249 that forms a cup-like structure that has a geometry conforming to the outer surface of revolution of a processing plate's extraction tube 2045. This allows heating elements 2248 to directly contact such surface of revolution to transfer heat into extraction tubes 2045 and also allows processing plates 2040 to be supported by an extractor 2240 in a stable manner. In addition, the width of extractors 2240a-b are such that when a processing plate is retained thereby, pipette tips 2020 can be placed into pipette tip holding stations and extend through processing plate 2040 without any interference by extractor 2240. When motor 2244 is operated, the rows of permanent magnets 2241 may be moved up into a space 2243 between heating elements 2248 and adjacent extraction wells 2045 to attract magnetic beads that may be disposed therein.

Figure 12C:
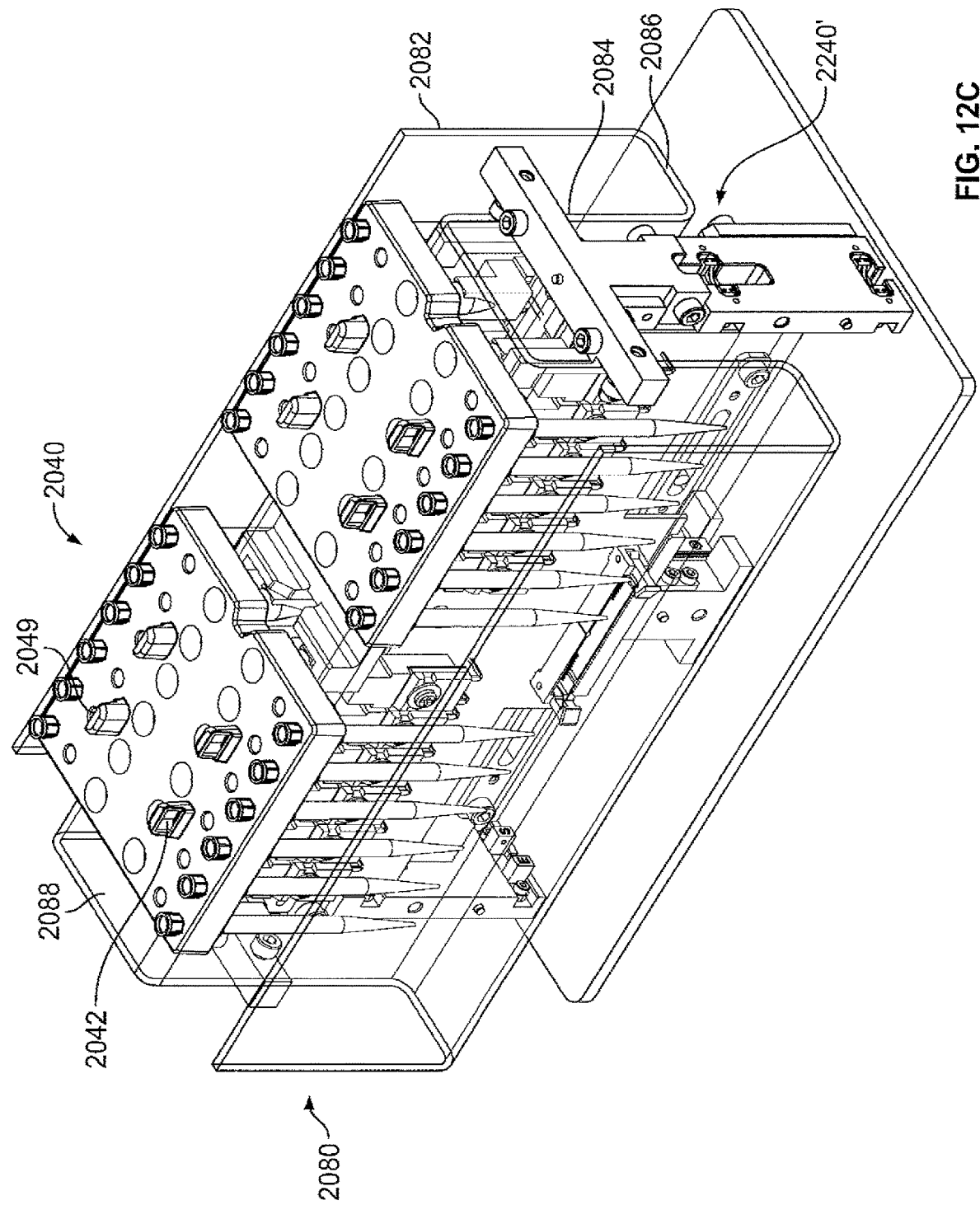
FIG. 12C is a perspective view of alternative embodiments of an extractor and processing plate.
Figure 12D:
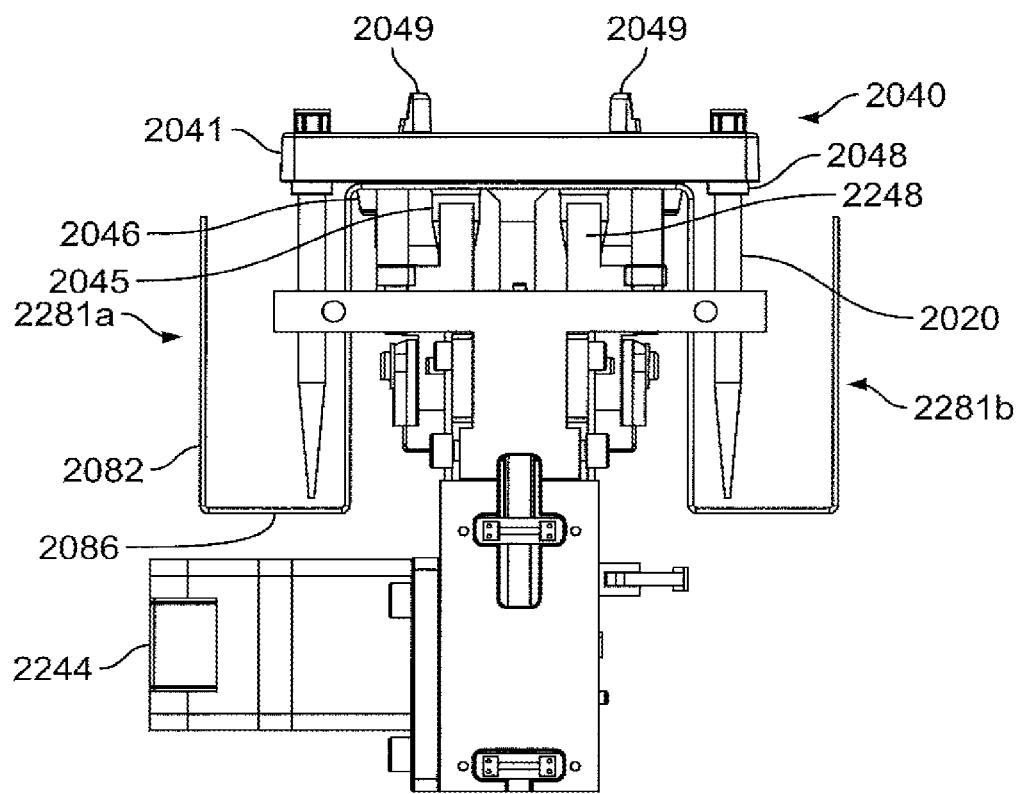
FIG. 12D is a side view of the extractor and processing plate of FIG. 12C.

FIGS. 12C and 12D depict an extractor 2240' and processing plate 2040 according to further embodiments of the present disclosure. As previously described, processing plate can include engagement notches 2042 in opposing sides of plate body 2041. However, instead of engagement notches 2042 being located on sides of plate body 2041, processing plate 2040 preferably includes engagement members 2049 which extend from an upper surface of plate body 2041. Such engagement members 2049 include engagement notches 2042. Thus, processing plate 2040 locates notches 2042 above plate body 2041 and inboard relative to the sides of plate body 2041. This allows end effector 2360 to grip processing plate 2040 from above plate body 2041 rather than at sides thereof which allows end-effector 2360 to operate in spaces with little clearance, as is described in more detail below.

Extractor 2240' is similar to extractor 2240 with the difference being that extractor 2240' includes a drip tray 2280. Drip tray 2280, as shown, includes trough members 2281a-b connected by an intermediate member 2088. Intermediate member 2088 extends between opposing sides of extractor 2240' and includes an opening for extraction tubes 2045 and mixing wells 2046 to extend therethrough so that extraction tubes 2045 can engage heating elements 2248 of extractor 2240', as best shown in FIG. 12D. In addition, intermediate member 2088 helps support processing plate 2040 as it generally has a flat upper surface which allows processing plate body 2041 to rest thereon. Each trough member 2281a-b includes an outer shield 2082, inner shield 2084, and lower shield 2086. Inner shield 2084 is connected to intermediate member 2088 and extends downwardly therefrom so that, when the processing plate 2040 is mounted to extractor 2240', inner shield 2084 is located between the heating elements 2248 and a row of pipette sleeves 2048, as best shown in FIG. 12D. Lower shield 2086 connects to and extends between the outer and inner shields 2082, 2084. Outer shield 2082 extends upwardly from lower shield 2082. This configuration forms a trough that is sized to receive a row of pipette tips 2020 when such pipette tips 2020 are disposed in respective ones of pipette sleeves 2048. In this regard, trough members 2281a-b form a barrier within system 2000 that helps prevent contamination from pipette tips 2020 which may be stored in pipette sleeves 2048 for reuse.

Figure 12E:
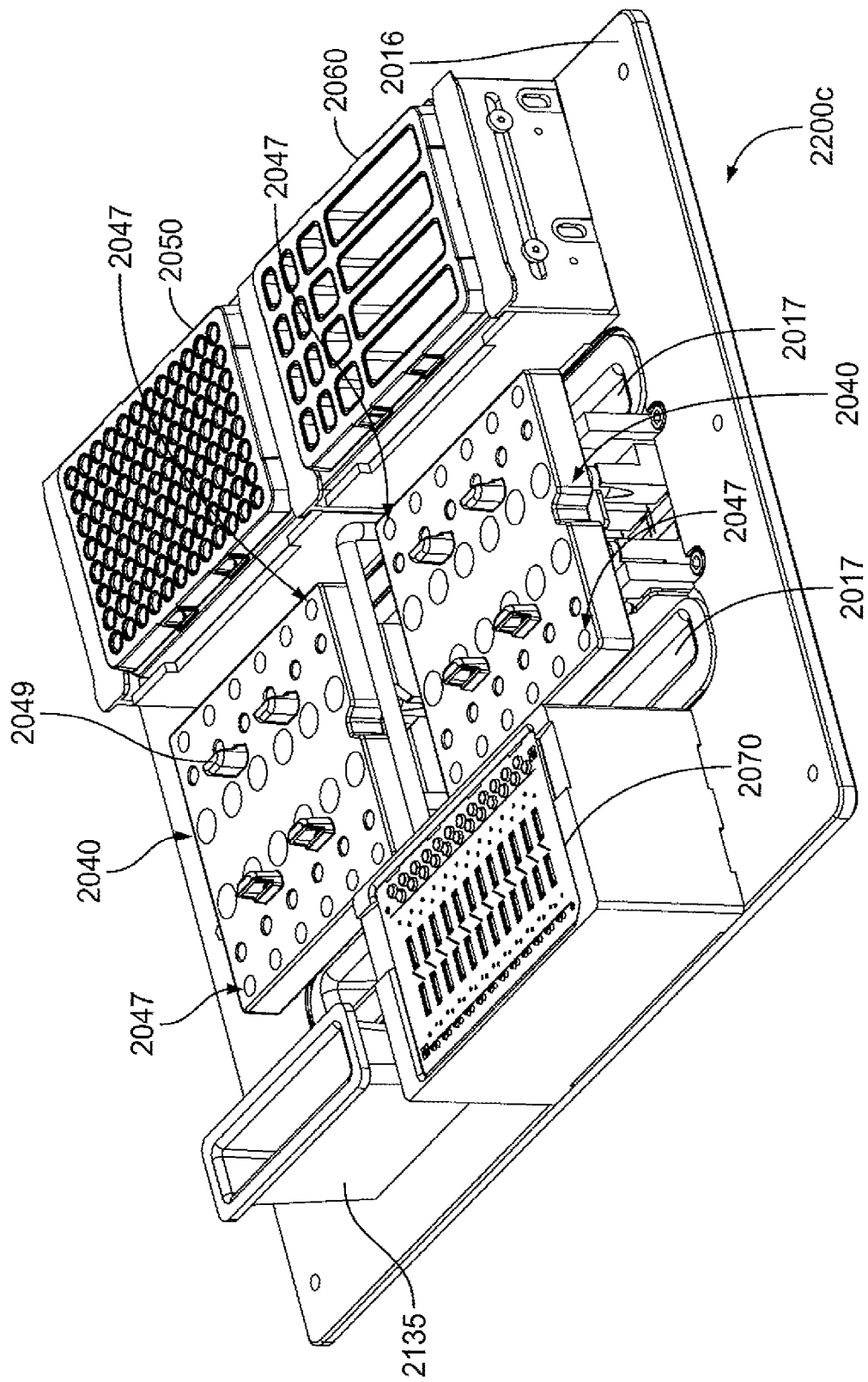
FIG. 12E is a partial perspective view of a processing deck of the system of FIG. 1 including the extractor and processing plate of FIG. 12C.

FIG. 12E depicts third processing module 2210c which includes extractors 2240'. Processing plates 2040 are mounted to said extractors 2240'. Extractors 2240' and processing plates 2040 are disposed between dry and liquid reagent plates 2050, 2060 and a pipette tip chute 2135 and amplification card station 2070. However, as shown, processing plates 2040 generally sit lower on processing deck 2016 than these surrounding components. However, to help conserve the overall size of system 2000, the side-to-side clearance between these components and processing plates 2040 is minimal. Thus, it may be difficult for end effector 2360 to have enough clearance to place processing plates 2040 onto and pick-up processing plates 2040 from extractors 2240'. In this regard, processing plates 2040 provide engagement members 2049 which provide sufficient clearance for end effector 2360 to pick and place processing plate 2040. Also, as shown, elongate openings 2017 extend through processing deck surface 2016 which allows reusable pipette tips 2020 mounted to processing plate 2040 to extend therethrough. Trough members 2281a-b of drip tray are aligned with such openings 2017 which shield system 2000 from being contaminated by drippings from such pipette tips 2020.

Detector

Each processing module 2200a-c has an associated detector 2270, which in the embodiment depicted in FIG. 10A, are each located in detection/analysis deck 2012 at the bottom of analyzer 2000. For example, first processing module 2200a is associated with a first detector 2270a, second processing module 2200b is associated with a second detector 2270b, and third processing module 2200c is associated with a third detector 2270c. The location of detectors 2270a-c beneath processing deck 2016 helps isolate detectors 2270a-c from possible contaminants. An exemplary detector is the detector of the BD MAX™ system (Becton Dickinson, Franklin Lakes, NJ) and is described in U.S. Pat. No. 8,133,671, the disclosure of which is hereby incorporated herein by reference in its entirety. Each of the detectors 2270a-c includes a reader head 2271 and a thermocycler 2275. Reader head 2271 includes an optical emitter and a detector (not shown) that is configured detect the presence of fluorescent probes within a chamber 2075 of amplification cartridge 2070. Thermocycler 2275 includes a moveable platform 2276 that has a recess 2277 configured to receive an amplification cartridge 2070. Thermocycler 2275 has heating elements (not shown) that periodically heat the contents of amplification cartridge 2070, such as purified DNA, to predetermined temperatures to assist in the amplification of such contents. Reader head 2271 is suspended from the structure of analyzer 2000 such that the reader thereof points in a downward direction. Thermocycler 2275 is disposed beneath reader head 2271 and includes a motor 2278 and drive screw that moves platform 2276 in a vertical direction to press an amplification cartridge 2070 against reader head 2271. The space that exists between thermocycler 2275 and reader head 2271 is sufficiently wide to allow inventory robot 2300 to place amplification cartridge 2070 onto thermocycler 2275.

Consumable Handling

FIGS. 13A-13D depict the inventory robot 2300 according to one embodiment of the present disclosure. Inventory robot 2300 helps inventory all consumables within analyzer 2000 and also handles all consumables within analyzer 2000. In addition, inventory robot 2300 can reach out of analyzer 2000 into pre-analytical system 10 so as to move a shuttle 2030 with sample containers 03 back and forth between analyzer 2000 and pre-analytical system 10. In this regard, housing of analyzer 2000 may include a side opening at the left or right sides thereof that are sized to allow robot 2300 to reach therethrough. Inventory robot 2300 includes a track member 2310, a body/post 2320, a shoulder 2330, a first arm member 2340, a second arm member 2350, and an end effector or hand 2360.

Robot Arm

Track member 2310 extends from one side of analyzer 2000 to the other in a right-left direction and is located nearer the backend of analyzer 2000 than the aforementioned front located decks 2012, 2014, and 2016. Body 2320 is slidably attached to track member 2310 and orthogonally extends therefrom. Body 2320 is coupled to track member 2310 via a carriage 2322. Carriage 2322 and track member 2310 form a linear motor that allows body 2320 to be translated along a single axis in the left-right direction. An example of a linear motor that can be implemented in analyzer 2000 is the Festo Linear Motor Actuator ("FLMA") (Festo AG & Co. KG Esslingen am Neckar, Germany). However, other drive mechanisms, such as a belt and pulley mechanism are contemplated to drive body 2320 along track member 2310.

Shoulder 2330 is slidably attached to body 2320 so that shoulder 2330 can be driven along a vertical axis of body 2320 which may also be achieved by a linear motor or some other drive mechanism. Shoulder 2330 is attached to first arm member 2340 at one end of first arm member 2340 so that the first arm member 2340 is rotatable about a vertical axis shared by both shoulder 2330 and first arm member 2340. Second arm member 2350 is connected to the other end of first arm member 2340 so that second arm member 2350 can rotate about a vertical axis shared by both arm members 2340 and 2350. End effector 2360 is connected to an end of second arm member 2350 remote from first arm member 2340 and is rotatable about a vertical axis shared by end effector 2360 and second arm member 2350.

End Effector

End effector 2360 includes a body 2362 and a pair of moveable fingers 2363a-b coupled to body 2362. Moveable fingers 2363a-b are operable so that they move closer together or farther apart in order to grasp or release an item, as is illustrated in FIG. 13A. In this regard, moveable fingers 2363a-b generally remain parallel during operation. Body 2360 includes one or more identifier reader 2366, such as a barcode scanner, in a surface of body 2362 that generally faces a direction away from fingers 2363a-b. Body 2362 is capable of rotating about 180 degrees relative to second arm member 2350 which allows such identifier reader 2366 to face toward the front of analyzer 2000 and scan consumables located in inventory deck 2014 or elsewhere. Body 2362 may also include a identifier reader in a bottom surface thereof so that such reader can read upward facing identifiers, such as those that may be located on amplification cartridge 2070.

Fingers 2363a-b are particularly configured to engage various different consumables. In this regard, fingers 2363a-b include first engagement features 2361 and second engagement features 2364. First engagement features 2361, as shown, are tabs or projections that extend inboard from one finger 2363 toward the other finger 2363. First engagement features 2361 are sized to fit within engagement notches 2042, 2052, 2062 of plates 2040, 2050, 2060, respectively, and first transverse openings 2034 of shuttle 2030. In operation, as fingers 2363a-b are closed onto a consumable item, first engagement features 2361 extend into the notches or openings of the corresponding consumable item preventing the consumable item from falling while fingers 2363a-b themselves clamp to side surfaces of the consumable item to further control and retain such item. As shown, each finger 2363a-b preferably includes two engagement features 2361 which helps prevent inadvertent rotation of the consumable item within the fingers' grasp.

Second engagement features 2364 are generally located at opposite sides of fingers 2363a-b than first engagement features 2361 and include a downwardly extending post or dovetail 2365. Post 2365 extends from a generally planar bottom surface 2366 of engagement feature 2364 and tapers outwardly therefrom to form a frustoconical surface of revolution, as best shown in FIG. 13C. These posts 2365 engage a corresponding notch 2072 in an amplification cartridge 2070. As discussed above, amplification cartridge 2070 includes a beveled or contoured surface about each notch 2072 which forms an indentation 2077. In operation, as posts 2365 slide into a respective notch 2072, the post 2365 eventually reaches this indentation 2077. When it reaches indentation 2077, post 2365 is received within indentation 2077 in a conforming manner, as is illustrated in FIG. 13D. This helps provide a stable platform for cartridge 2070 to be moved around analyzer 2000 as indention 2077 conforms to the post's surface of revolution. In addition, the flare or taper of post 2365 helps prevent cartridge 2070 from falling.

Figure 13B:
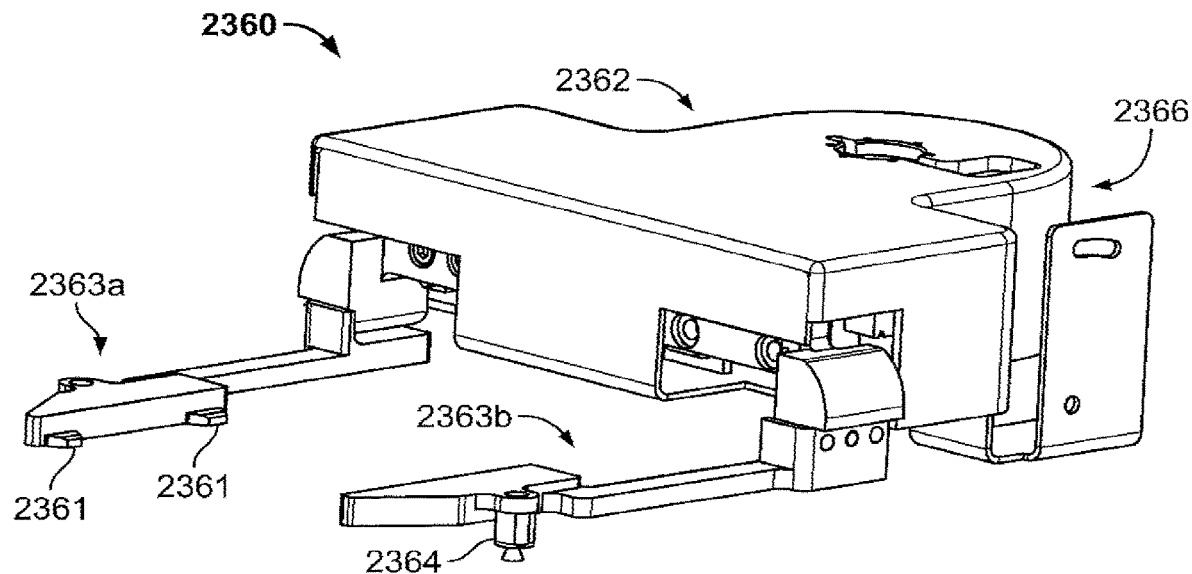
FIG. 13B is an end-effector of the robot of FIG. 13A according to one embodiment of the present disclosure.
Figure 13C:
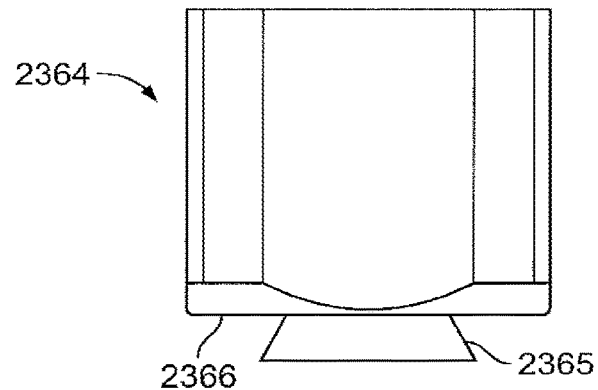
FIG. 13C is an amplification cartridge engagement member of the end effector of FIG. 13B.
Figure 13D:
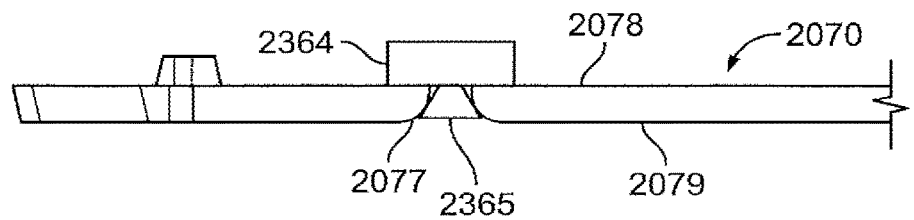
FIG. 13D is a side view of the engagement member of FIG. 13C engaging an amplification cartridge.

As shown in FIG. 13B, each finger 2363a-b includes three engagement features 2364. However, while more or less engagement features 2364 are contemplated, it is preferable that each finger 2363a-b include a single second engagement feature 2364. This allows fingers 2363 to sufficiently engage an amplification cartridge 2070 that may be inadvertently rotated about a vertical axis so that its sides are not parallel with fingers 2363a. This may be a significantly more difficult task for fingers 2363a-b with more than a single engagement feature 2364 as at least some of features 2364 may not be able to properly align with corresponding notches 2072 of amplification cartridge 2070 in the event such cartridge 2070 is inadvertently rotated.

Also each finger 2363a-b may be flexible so as to be able to bend downwardly or upwardly about a horizontal axis while being resilient enough so as to not yield too readily to contact. Such flexibility can be imparted on each finger 2363a-b along a length near a terminal end thereof that includes second engagement feature 2364. This allows fingers 2363a-b to automatically adjust to engage an amplification cartridge 2070 that may be tilted about a horizontal axis so that cartridge 2070 is not parallel to fingers 2363a-b.

Liquid Handling

Figure 14A:
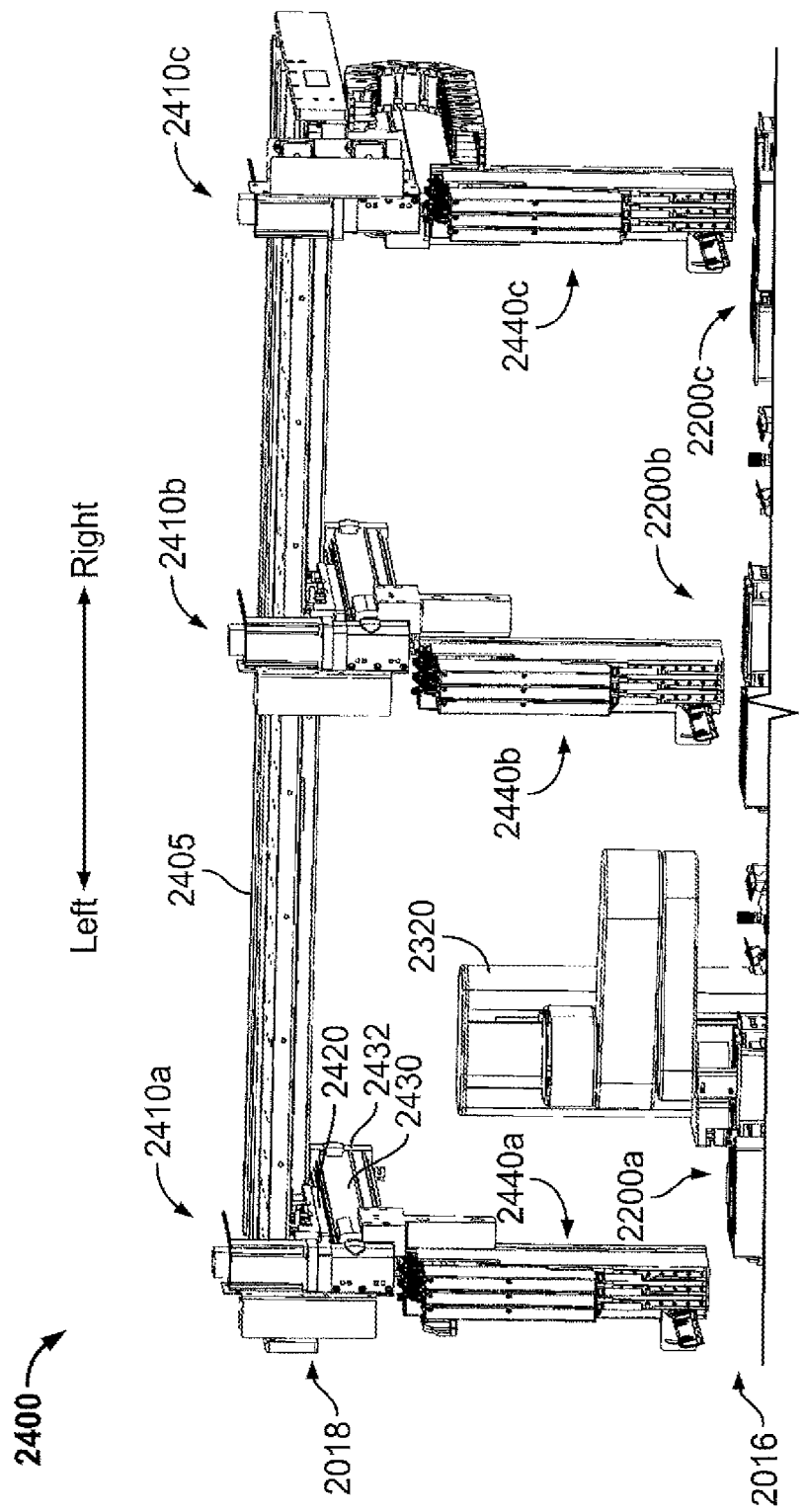
FIG. 14A is a front view of a liquid handling assembly according to an embodiment of the present disclosure.
Figure 14B:
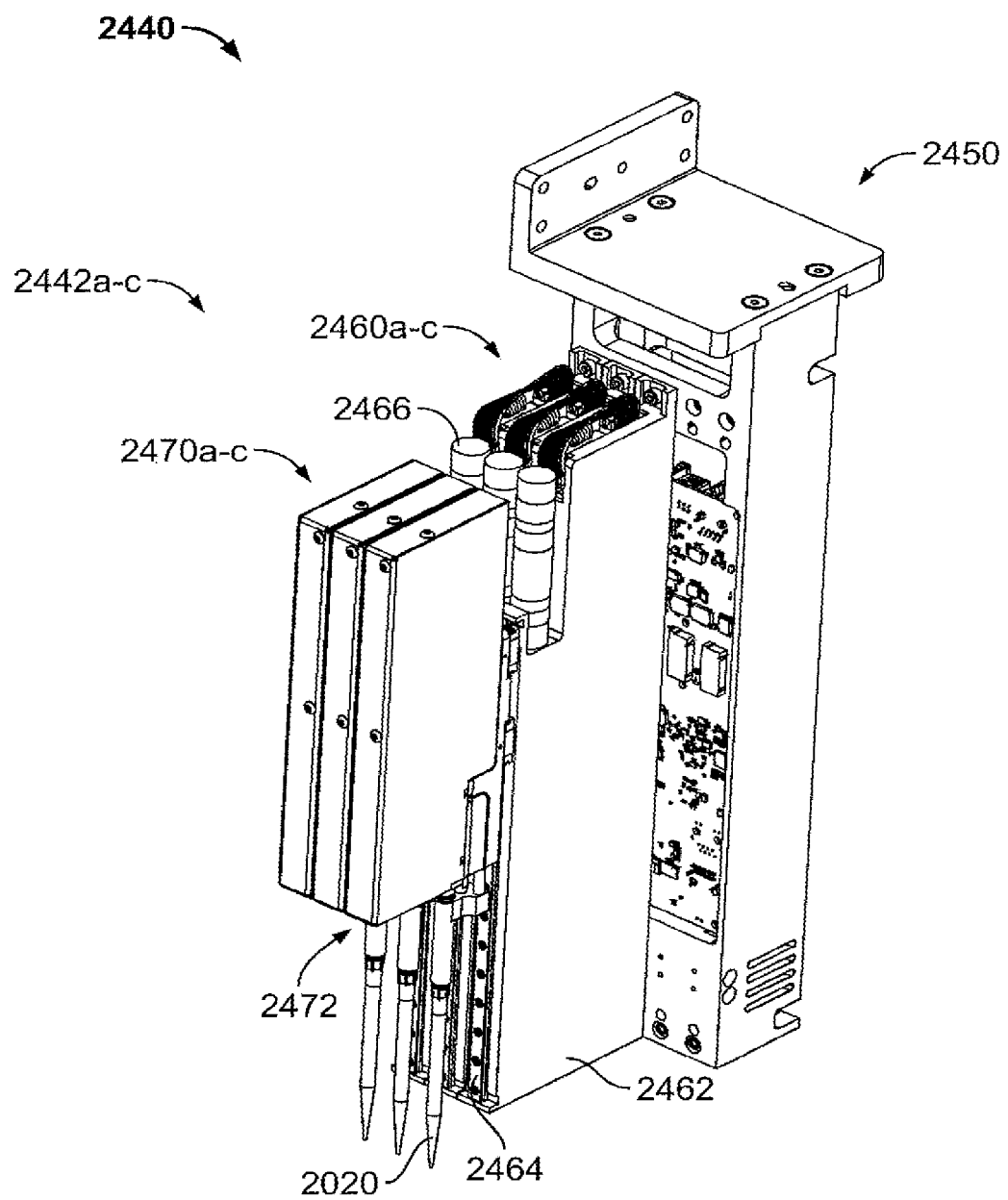
FIG. 14B is a front perspective view of a multichannel pipettor of the liquid handling assembly of FIG. 14A.

FIGS. 14A and 14B depict a liquid handling robot 2400 according to one embodiment of the present disclosure. Liquid handling robot 2400 is suspended at liquid handling robot deck 2018 and above processing deck 2016. Liquid handling robot 2400 includes a track member 2405 that extends from one side of analyzer 2000 to another in a right-left direction. A plurality of multichannel pipettors 2440 is connected to track member 2405 via carriages 2420 and transverse arms 2430. Arms 2430 are connected to carriages 2420 and carriages 2420 are slidably connected to track member 2405 so that arms 2430 extend in a direction transverse relative to the track member 2405. Carriages 2420 and track member 2405 form a linear motor that allows multichannel pipettors 2440 and arms 2430 to be driven along track member 2405 in the left-right direction. An example of such a linear motor is the Festo Linear Motor Actuator ("FLMA") (Festo AG & Co. KG Esslingen am Neckar, Germany). As shown, there is one multichannel pipettor 2440 for every processing module 2200. Thus, in this particular embodiment, there are three pipette assemblies: a first multichannel pipettor 2440a, a second multichannel pipettor 2440b, and a third multichannel pipettor 2440b. First multichannel pipettor 2440a corresponds to first processing module 2200a, second multichannel pipettor 2440b corresponds to second processing module 2200b, and third multichannel pipettor 2440c corresponds to third processing module 2200c. However, more or less multichannel pipettors 2440 are possible and are based on the number of processing modules 2200.

Multichannel Pipettor

FIG. 14B depicts multichannel pipettor 2442 according to an embodiment of the present disclosure which is exemplary of multichannel pipettors 2440a-c. Multichannel pipettor 2442 includes a backplane connector 2450 and a plurality of liquid handling assemblies 2442 connected to backplane connector 2450. In the embodiment depicted, there are three liquid handling assemblies 2442: a first liquid handling assembly 2442a, a second liquid handling assembly 2442b, and third liquid handling assembly 2442c. However, more or less is contemplated. Each liquid handling assembly 2442 includes a main board assembly 2460 and a pipette assembly 2470. Liquid handling assemblies 2442a-c are connected to backplane connector 2450 adjacent to one another in close proximity.

Each main board assembly 2460 helps provide data, power and positive/negative air pressure to a corresponding pipette assembly 2470. In the embodiment depicted, there are three pipette assemblies 2460: a first pipette assembly 2460a, second pipette assembly 2460b, and a third pipette assembly 2460c. These assemblies 2460a-c correspond to a respective liquid handling assembly 2442a-c. Each main board assembly 2460 is similar to the main board assembly 1401 described and shown in FIGS. 27A and 27B of the '349 Application. In this regard, each main board assembly 2460 includes a housing 2462 with various components disposed therein, such as a PCB, positive and negative pressure inputs, a valve, and a liquid/gas conduit in communication with the inputs and valve. Main board assemblies 2460a-c also includes a z-drive mechanism that includes a vertical rail 2464 on one side of housing 2462 and a motor 2466 and drive shaft (not shown). The drive shaft is disposed within housing 2462.

Each pipette assembly 2470 is similar to the pipette assembly 502 of FIGS. 17A-17D and pipette assembly 1402 of FIGS. 27A and 27B of the '349 Application with the exception that each pipette assemblies 2470 is not hingedly connected to its respective main board assembly 2460 and does not rotate into multiple hinge positions. Each pipette assembly 2470 is constrained from rotation and moves in a vertical z-direction along vertical rail 2464 via motor 2466. Thus, the first, second, and third pipette assemblies 2470a-c are capable of moving independently in a vertical or z-direction. Otherwise pipette assembly 2470 is constructed similarly to pipette assemblies 502 and 1402 particularly with regard to its pipette channel assembly (not shown) and pipette tip ejector assembly 2472.

Backplane connector 2450 is similar to the backplane connector 1600 of FIGS. 29A and 29B of the '249 Application with the exception that backplane connector 2450 is configured to have multiple liquid handling assemblies 2442 mounted thereto, such as the first, second, and third assemblies 2442*a-c* illustrated. In this regard, backplane connector 2450 connects to main board assemblies 2470*a-c* of each liquid handling assembly 2442 and includes several connectors (not shown), such as Ethernet, multipin, positive pressure input, and negative pressure input connectors for supplying the liquid handling assemblies 2442*a-c* with the requisite power, pressure, and data signals. This helps reduce or eliminate external cabling that could snag and can be difficult to manage with multiple liquid handling assemblies 2442 being connected in such close proximity.

Automation

Figure 15:
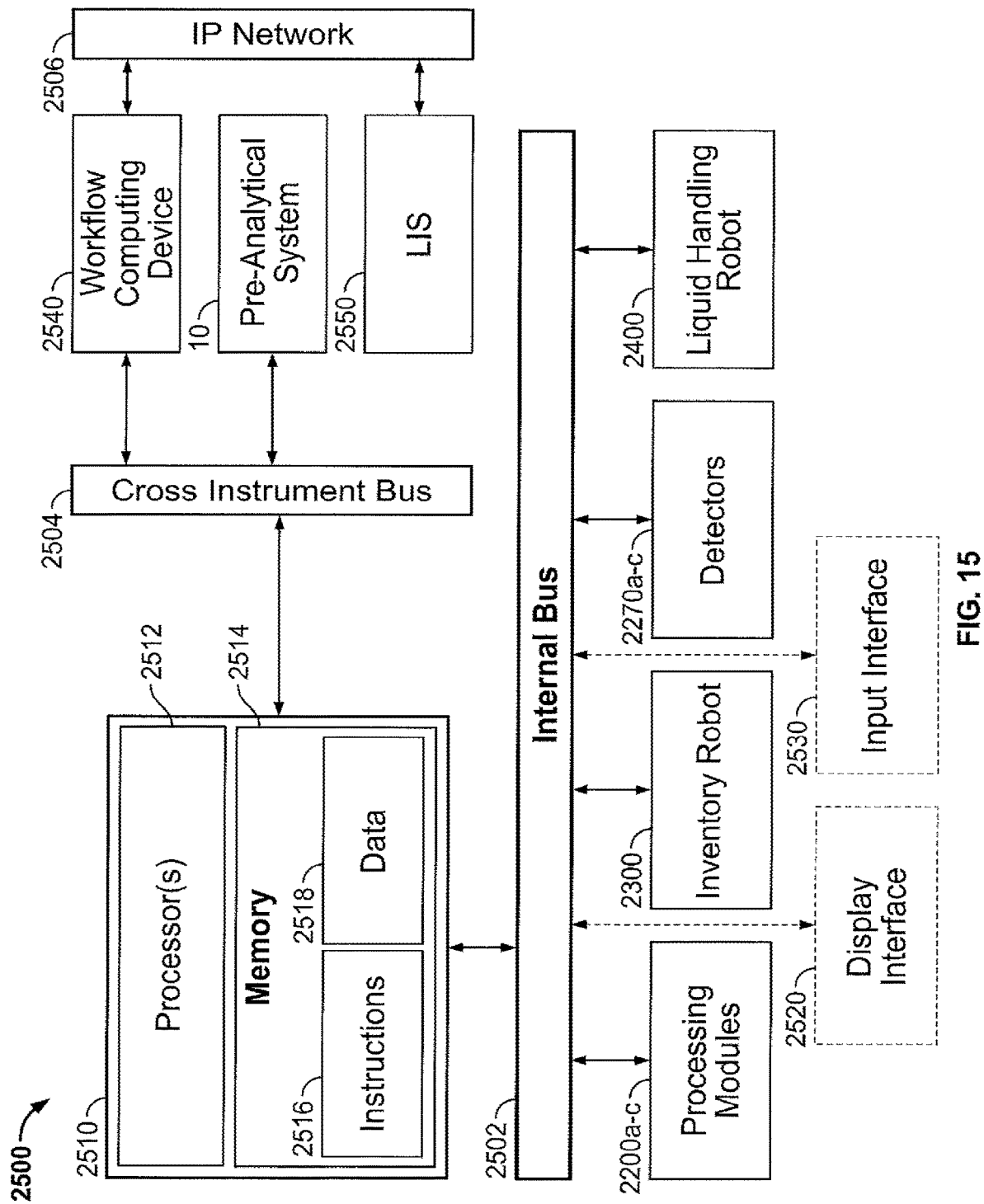
FIG. 15 is a block diagram of an exemplary architecture of a computing system involving the analyzer of FIG. 2 including example components suitable for implementing methodologies of the present disclosure.

FIG. 15 depicts a general architecture of a computing system of analyzer 2000. Computing system 2510 may be a subsystem within system 1300 of FIG. 26 of the '249 Application which depicts a computing system diagram of the high-throughput system 00. In this regard, cross instrument bus 2504 and work flow computing device 2540 are the same as bus 1320 and computing device 1330 depicted in FIG. 26 of the '249 Application. In addition, computing device 2510 is similar to computing device 1360 and is described in more detail herein along with its inputs and outputs within analyzer 2000.

Computer control device 2510 may be any general purpose computer and may contain a processor 2512, memory 2514 and other components typically present in general purpose computer control devices. Although computer control device 2510 can include specialized hardware components to perform specific computing processes. Processor 2512 may be any conventional processor, such as a commercially available CPU. Alternatively, processor 2512 may be a dedicated component such as an application specific integrated circuit ("ASIC") or other hardware-based processor.

Memory 2514 may store information accessible by processor 2512, including instructions 2516 that can be executed by processor 2512. Memory 2514 can also include data 2518 that can be retrieved, manipulated or stored by processor 2512. Memory 2514 can be of any non-transitory type capable of storing information accessible by processor 2512, such as a hard-drive, memory card, ROM, RAM, DVD, CD-ROM, write-capable, and read-only memories.

Instructions 2516 can be any set of instructions to be executed directly, such as machine code, or indirectly, such as scripts, by processor 2512. In that regard, the terms "instructions," "application," "steps," and "programs" can be used interchangeably herein. Instructions 2516 can be stored in object code format for direct processing by processor 2512, or in any other computing device language including scripts or collections of independent source code modules that are interpreted on demand or compiled in advance.

In one embodiment of analyzer 2000, computing system 2510 may include several sets of instructions. For example, each assay to be performed may have several sets of instructions associated with it which may include instructions that operate inventory robot 2300 to perform an inventory check and to retrieve the appropriate reagents and other consumables for that assay. In another example, a set of instructions may determine the sequence of operations performed by a particular multichannel pipettor 2440 to assist in processing a sample for analysis.

Data 2518 can be entered and viewed through a graphical user interface ("GUI") which may be displayed on display interface 2500 which is specifically associated with analyzer 2000, or display interface 1332 of FIG. 1 and FIG. 26 of the '349 Application which is associated with the entire high-throughput system 00. Data 2518 can also be entered from scanners, such as scanner 2366 on end effector 2360 of inventory robot 2300 or scanners within pre-analytical system 10. Data can also be obtained by sensors, such as optical sensors, temperature sensors and the like, to obtain information regarding certain conditions and activities occurring within analyzer, such as the location of particular consumables and air quality, for example.

This data 2518 can be digitally tagged to particular identification codes (e.g., barcode serial numbers) in a field implemented or relational database, which may also be stored in memory 2514. This helps analyzer 2000 keep track of various consumables within analyzer 3000 and helps provide certain information to processor 2512 during the execution of processor instructions 2516 without the need for user input. For example, a liquid reagent plate 2060 may have an identification code which may be associated with a bar code located on an outer surface thereof which may be tagged in the database with certain stored data such as the type of reagents stored therein and which reagents have already been utilized. This allows analyzer to check its inventory to determine when reagents and other consumables are running low or are insufficient to perform additional assays. In another example, a shuttle 2030 may have an identification code which may be tagged in the database with certain stored data such as data involving each of the sample containers 03 carried by shuttle 2030 such as patient name, assay to be performed, processing parameters and the like. In a further example, when analysis is completed, the result of the assay can be associated with the particular sample within the database so that a user can easily retrieve the results via access to the workflow computing device 2540 as such results may be communicated thereto by device 2510.

Although FIG. 20 functionally illustrates processor 2512, memory 2514, and other elements of computer control device 2510 as being within the same block, computer control device 2510, processor 2512, and/or memory 2514 can be comprised of multiple processors, computer control devices, and memories, respectively, which may or may not be stored within the same physical housing. For example, memory 2514 can be a hard drive or other storage media located in housings different from that of computer control devices 2510. Accordingly, references to processor 2512, computer control device 2510, and memory 2514 should be understood to include references to a collection of processors, computer control devices, and memories that may or may not operate in parallel.

Display Interface

Display interface 2520 may be associated specifically with analyzer 2000 and may only display information regarding analyzer 2000 and may also be integrated into the structure of analyzer 2000. However, display interface 2520 is optional (indicated by dashed lines in FIG. 15) and, in the embodiment depicted in FIG. 1, is not included as the overall system display interface 1332 is utilized instead. However, where display interface 2520 is included, interface 2520 may be a monitor, LCD panel, or the like coupled to a front panel of housing 2010 or located remote from analyzer 2000. Display interface can display a GUI, user prompts, user instructions and other information that may be relevant to a user.

Input Interface

User control/input interface 2530 allows a user to navigate the GUI, and again, may be optionally provided as a separate component from the overall system input interface which is provided by display interface 1332 of FIG. 1. However, where user control/input interface 2530 is provided, such interface can be a touch panel, keyboard, or mouse, for example. In addition, input interface 2530 can be integrated into display interface 2520 such that the same device that displays prompts and the like is the same device that allows a user to respond to said prompts.

As depicted in FIG. 15, computer control device 2510 may be connected to workflow computing device 2540 which is utilized to integrate all of the components of high-throughput system 00 such as the second analyzer 4000 and pre-analytical system 10 and to integrate with a particularly laboratory's laboratory information system ("LIS"). Thus information relevant to analyzer 2000 originating within pre-analytical system 10 can be communicated to analyzer 2000 via workflow computing device 2540. Similarly, information relevant to pre-analytical system 10 that originates from analyzer 2000 may be communicated via computer control device 2500 to workflow computing device 2540 which communicates that information to pre-analytical system 10. Such information can also be supplemented with information obtained from the LIS by workflow computing device 2540, such as patient information and the like.

Computer control device is also connected to multiple components within analyzer 3000 to share information back and forth such as instructions and data. Some of the components that are connected with computer control device via internal bus includes each of the processing modules 2200a-c, inventory robot 2300, detectors 2270a-c, and liquid handling robot 2400. Such connections with computer control device 2510 allows computer control device 2510 to provide instructions to such components and receive information therefrom. For example, inventory robot 2300 may receive instructions from computer control device 2510 to retrieve certain consumables and place them at a particular location and may communicate inventory information to computer control device 2510. Thus operations performed by the internal components of analyzer 2000 are generally as a result of instructions provided by processor 2512 as analyzer 2000 is fully automated.

Method

Step 1: Receive Order

Figure 16:
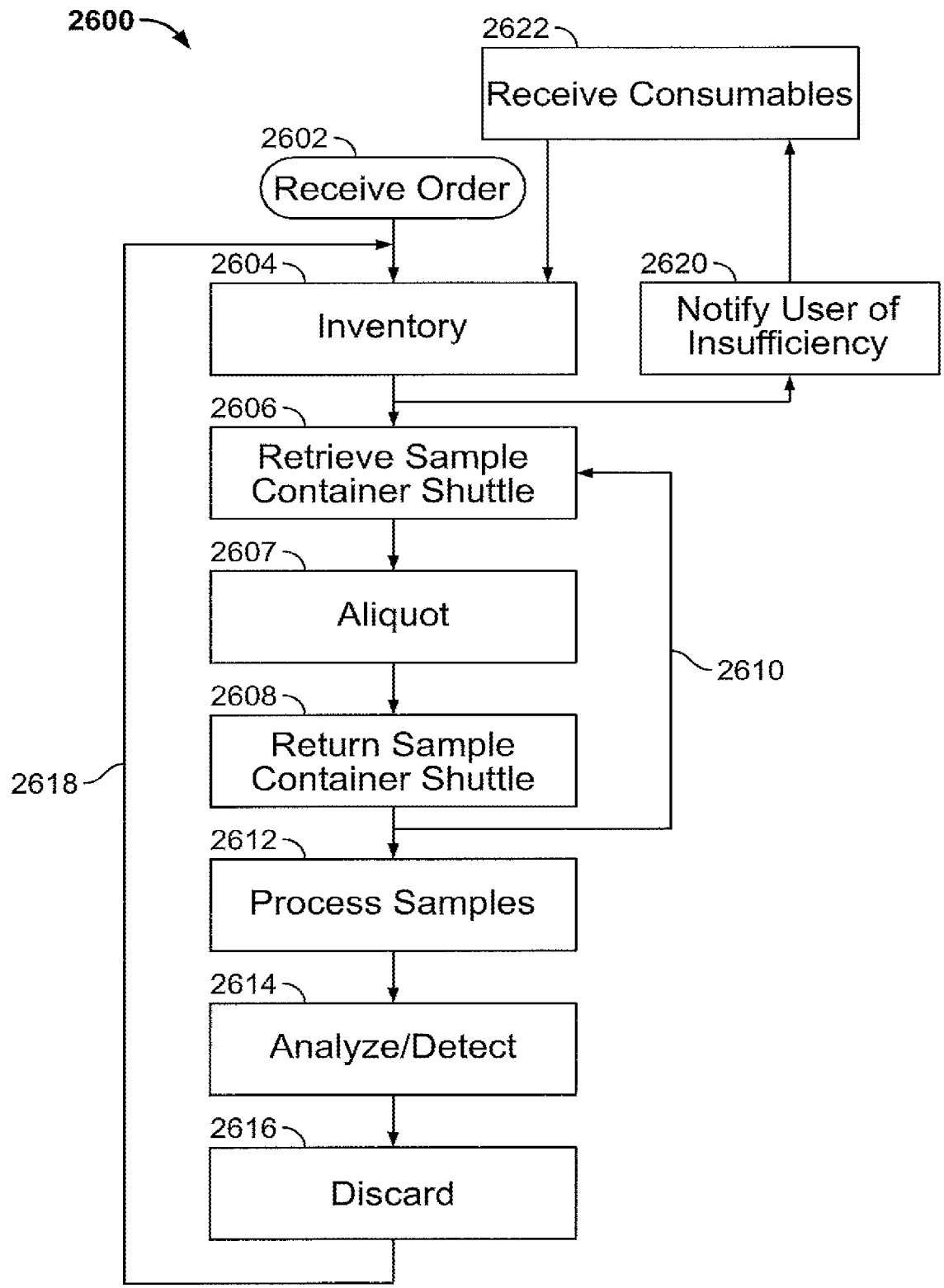
FIG. 16 is a flow diagram of a method of using the analyzer of FIG. 2 according to one embodiment of the present disclosure.

In a method of operation of analyzer 2000 (FIG. 16), an order for an assay may be received 2602 by analyzer 2000 from workflow computing device 2540. Such order may be first communicated from pre-analytical system 10 to workflow computing device 2540 when a batch of samples is preprocessed thereby and ready to be analyzed. In this regard, pre-analytical system 10 may load shuttles 2030 with a complete batch, which in this embodiment includes two shuttles 2030 of twelve sample containers 03 per shuttle 2030. Such shuttles 2030 are parked at a docking station 260 of FIG. 12A of the '349 Application.

Step 2: Inventory

Once the order is received by analyzer 2000, inventory robot 2300 inventories 2604 the consumables to determine if there is a sufficient amount of consumables to perform the ordered assay. Such inventory may be performed by inventory robot 2300. In this regard, when an order is received, inventory robot 2300 moves end effector 2360 toward inventory deck 2014 beneath processing deck 2016. End effector 2360 is rotated about 180 degrees so that identifier reader 2366 faces toward inventory deck 2014. Inventory robot 2300 then proceeds to scan the consumables located therein to determine which consumables are loaded within analyzer 2000. Analyzer 2000 then determines whether or not there are sufficient consumables to perform the ordered assay. Other automated apparatus for monitoring consumable inventory are contemplated. Such other automated methods for tracking the consumable inventory are well known to those skilled in the art and not discussed in detail herein.

Inventory robot 2300 may not need to scan consumables every time an order is received. Instead, analyzer 2000 keeps track of consumables input into analyzer 2000 via a user. For example, when a user loads the consumables, inventory robot 2300 scans the consumables and logs them into a database within memory 2514. Analyzer 2000 keeps track of when consumables are used. Thus, analyzer 2000 can inventory the consumables in response to an order by scanning, via processor 2512, a database within its memory 2514 to determine which consumables have been used and not used to obtain a complete tally.

In one example, an assay order to identify the presence of a particular assay target, such as *Chlamydia*, for example, is received by analyzer 2000. Analyzer 2000 knows which reagents must be present within analyzer 2000 to perform the assay. In addition, analyzer 2000 knows what other consumables must be used, such as pipette tips 2020, a processing plate 2040 and amplification cartridge 2070. Such information may be preprogramed in its memory 2514. Analyzer 2000 scans a database in its memory 2514 or utilizes inventory robot 2300 to verify that the requisite consumables are available for use.

If the consumables available are insufficient to perform the ordered assay, a user is notified 2620, which may be in the form of an alert displayed on display 1332 or 2520, a push notification to a mobile device, or an email. If other samples that require a different assay are ready for processing by analyzer 2000 and there are sufficient consumables to perform the assay, analyzer 2000 may accept those containers 03 instead so as to avoid downtime until user loads analyzer 2000 with the requisite consumables.

When the user does load the consumables and such consumables are received 2622 by analyzer 2000, such as at the beginning of a work shift or in response to an alert that there are insufficient consumables, user loads the consumables through the front of analyzer 2000. Thus, user may load pipette tips 2020 into pipette drawers 2142, reagent plates 2050 and 2060, amplification cartridges 2070 and/or processing plates 2040 into consumable repository 2110. Enough consumables can be loaded to allow analyzer 2000 to run continuously for 24 hours straight.

When such consumables are loaded by the user, analyzer 2000 recognizes that inventory deck 2014 had been accessed, such as via door sensors. Inventory robot 2300 may then automatically perform an inventory scan to identify any new consumables loaded into the analyzer 2000. Identifiers located on the consumables, such as the reagent plates 2050, 2060, processing plates 2040, tip racks 2022, and amplification cartridges 2070, are used to determine what the consumable are and what they contain, such as reagents in the case of the reagent plates 2050 and 2060.

Step 3: Retrieve Sample Container

Once analyzer 2000 determines there are sufficient consumables to perform the assay and that one of the processing modules 2200 is available for use, analyzer 2000 communicates its readiness to workflow computing device 2540. Workflow computing device 2540 then notifies pre-analytical system 10 which, in response, loads a shuttle 2030 containing sample containers 03 onto a shuttle transport assembly 300 and sends it toward analyzer 2000. Shuttle 2030 may stop just before it reaches the threshold of analyzer 2000. Although in some embodiments shuttle 2030 may be conveyed directly into analyzer 2000.

Inventory robot 2300 then moves toward pre-analytical system 10 and reaches 2606 into pre-analytical system 10. End effector 2360 grips shuttle 2030 so that first engagement features 2361 are received in second transverse openings 2036. Shuttle 2030 is then transported into analyzer 2000 and to a shuttle retention assembly 2210 adjacent the designated processing module 2200 and places shuttle 2030 down onto stationary platform 2216. Clamping assembly 2212 then closes so that engagement members 2214 extend through second transverse openings 2034 and penetrate into skirts 07 of respective containers 03 thereby retaining containers 03 in position for aspiration by a multichannel pipettor 2440.

Step 4: Stage Consumables and Aliquot

With sample containers 03 sufficiently retained, processing module 2200 is staged with appropriate consumables. In this regard, inventory robot 2300 retrieves two processing plates 2040 and places one plate onto each extractor 2240a-b so that extraction tubes 2044 of each plate 2040 are received by heater elements 2248 of the respective extractor 2240a-b. Inventory robot 2300 also retrieves a first dry reagent plate 2050a and liquid reagent plate 2060 and places them at dry reagent station 2220 and liquid reagent station 2230, respectively. Typically, the liquid and dry reagent plates 2050, 2060 provide reagents for more than the number of samples carried by a shuttle 2030. So the analyzer 2000 may not stage reagent plates each time a shuttle 2030 is placed into the analyzer. Additionally, inventory robot 2300 retrieves an amplification cartridge 2070 from inventory deck 2014 by engaging notches 2072 via second engagement features 2364. Amplification cartridge 2070 is placed at amplification cartridge station 2250 so that inlet openings 2073 are positioned adjacent extractor 2240a.

Thereafter, multichannel pipettor 2440 retrieves a first pipette tip 2020a, one tip for each of the three pipette assemblies 2470a-c. An aliquot is retrieved 2607 from each of the sample containers 03 by piercing the samples containers' penetrable seals 09 with the pipette tips 2020 and aspirating the sample therein. The aliquots are aspirated into respective extraction tubes 2044 of processing plate 2040. After each mixing tube 2044 is inoculated with the aliquot, multichannel pipettor 2440 inserts pipette tip 2020a into an adjacent tip holding station 2047 for later use. This is performed until an aliquot is extracted from each container 03. In the event there is a malfunction such that an aliquot could not be retrieved, such as due to the seal not piercing, analyzer 2000 retains that information in its memory 2514 so it can be communicated to pre-analytical system 10 which will appropriately organize the defective samples as is discussed in the '349 Application.

Step 5: Return Sample Container Shuttle & Retrieve Another

Once an aliquot is retrieved from each sample container 03 in shuttle 2030, analyzer 2000 communicates to workflow computing device 2540 that it is going to return 2608 shuttle 2030 to pre-analytical system 10. Workflow computing device 2540 relays this communication to pre-analytical system 10 which moves another shuttle 2030 containing the other half of the batch to shuttle transport assembly 300. Within analyzer 2000, clamping assembly 2212 releases shuttle 2030 and inventory robot 2300 returns shuttle 2030 containing used containers 03 back to pre-analytical system 10 by placing shuttle 2030 into a return lane of shuttle transport assembly 300. Inventory robot 2300 then engages and moves 2610 the second shuttle 2030 of the batch and transports it to shuttle retention assembly 2210 where it is retained and the remaining aliquots of the batch are aspirated. Once aliquots are transferred to the remaining extraction tubes 2044 of processing plates 2040, shuttle 2030 is once again returned to pre-analytical system 10 via inventory robot 2300.

In some embodiments a dual lane assay may be performed by analyzer 2000 in which an aliquot from each sample container 03 is aspirated into two extraction tubes 2044 rather than one. In such embodiment, a single shuttle 2030 of twelve sample containers 03 would fill two processing plates 2040 each having 12 extraction tubes 2044. Thus, in this embodiment, inventory robot 2300 only retrieves one shuttle 2030 for the assay and does not retrieve any further shuttles 2030.

Step 6: Process Samples

With processing plates 2040 inoculated with aliquots of sample, analyzer 2000 processes 2612 the samples. The procedure is generally the same regardless of the assay. The differences are not so much in method but in the reagents utilized. Thus, processing modules 2200 are capable of performing a wide array of assays. Processing generally includes extraction, isolation and amplification of an analyte, such as a DNA target.

Extraction involves reconstituting a dried lysis agent which may contain magnetic beads configured to bind to DNA. In this regard, multichannel pipettor 2440 picks up the previously used pipette tip 2020a from the pipette tip holding station 2047 in processing plate 2040. Although multichannel pipettor 2440 generally includes multiple pipette assemblies 2470a-c, a single pipette assembly 2470 can be driven along a corresponding z-rail 2464 independently from the other pipette assemblies 2470 in order to retrieve the previously used pipette tip 2020a from processing plate 2040. Once the tip 2020a is retrieved, pipette assembly 2470 pierces the seal of a reconstitution buffer in liquid reagent plate 2060, retrieves an aliquot of the buffer, and transfers it to dry reagent plate 2050a where it pierces the seal over one of compartments 2044 and inoculates the compartment 2054 with the buffer to rehydrate the lysis agent. The reconstituted lysis agent is then aspirated and transferred to extraction tube 2044. This is repeated until all extraction tubes 2044 are inoculated with a lysis agent and magnetic beads.

Extractors 2240a-c then heat the extraction tubes 2044 and the contents therein via heating elements 2248 in contact with extraction tubes 2044. While the mixture incubates, inventory robot 2300 removes first dry reagent plate 2050 from processing module 2200 and retrieves the second dry reagent plate 2050b from inventory deck 2014 and places it at dry reagent plate station 2220.

When incubation is complete, the motors 2244 of extractors 2240a-b move permanent magnets 2241 out of their respective housing 2242 and places them adjacent extraction tubes 2044 where the magnetic beads with extracted DNA attached thereto are drawn to the side of tube 2044. Multichannel pipettor 2440 then retrieves an aliquot of wash buffer from reagent plate 2060 and rinses the tube mixtures.

Magnets 2241 are moved back into their housing 2242 and the supernatant is removed from the mixing tubes and discarded via liquid waste inlet which communicates with a liquid waste bottle within inventory deck 2014. A neutralization buffer is transferred from liquid reagent plate 2060 to a mixing well 2046 in processing plate 2040 adjacent extraction tubes 2044. Pipettor 2440 then retrieves an elution buffer from liquid reagent plate 2040 and dispenses the elution buffer into extraction tubes 2044 to separate the magnetic beads from the isolated DNA. Magnets 2241 are moved back into place and the eluate is aspirated and transferred to mixing well 2046 where it is mixed with the neutralization buffer. The neutralized sample is then used to reconstitute the master mix within second dry reagent plate 2050b. The mixture is then loaded into amplification cartridge 2070 via multichannel pipettor 2440 and second pipette tips 2020b which inoculate cartridge 2070 by aspirating the mixture into inlet openings 2073 of cartridge 2070. Amplification cartridge 2070 can receive the entire batch.

Step 7: Amplify/Analyze/Detect

Thereafter, end effector 2360 of inventory robot 2300 engages cartridge 2070 and carries it to a detector 2270 associated with the processing module 2200. Inventory robot 2300 places cartridge 2070 onto platform 2276 of thermocycler 2275 without significantly tipping cartridge 2070. This is possible at least because cartridge 2070 hangs from or is carried so that it is positioned lower than fingers 2363a-b of end effector 2360. If fingers 2363a-b were positioned lower than cartridge 2070, cartridge 2070 may have to be dropped from end effector 2360. Motor 2278 then raises thermocycler 2275 to press cartridge 2070 against reader 2271. Cartridge 2070 is then subjected to thermocycling so as to amplify the assay target. Reader 2271 detects 2614 for the presence of the assay target within the chambers 2075 of cartridge 2070.

Step 8: Discard & Repeat

Once detection is completed, the results are communicated to workflow computing device 2540. The used amplification cartridge 2070 is moved 2616 via inventory robot 2300 to an amplification cartridge waste which may be in waste repository 2130 or elsewhere in analyzer 2000. Inventory robot 2300 also discards the used processing plates 2040 by stacking plates 2040 onto shelf 2138 of waste repository 2130. Dry and liquid reagent plates 2050, 2060 are placed back into their respective compartments within consumable repository 2110 for use in another assay. Dry and liquid reagent plates 2050, 2060 can generally be used in four assay runs. Computing device 2510 keeps track of how many times a plate 2050 or 2060 has been used and analyzer 2000 automatically discards these plates after their final run by placing the plates 2050, 2060 in waste repository 2130. Once the consumables are discarded, the processing module 2200 can perform 2618 another assay.

Multiple Assays at Once

Each of processing modules 2200 can perform any assay on an assay menu at any given time provided appropriate consumables are inventoried within its housing 2010. This allows analyzer 2000 to respond with flexibility to optimize throughput. For example, first processing module 2200a may have been performing a first assay for several runs. However, if there is a backlog of samples within pre-analytical system 10 that require a second assay that is different from the first assay, first processing module 2200a can be used to assist in processing and analyzing such samples by performing the second assay. This may be done automatically by analyzer 2000 without assistance from a user as analyzer 2000 is in constant communication with pre-analytical system 10.

Figure 17A:
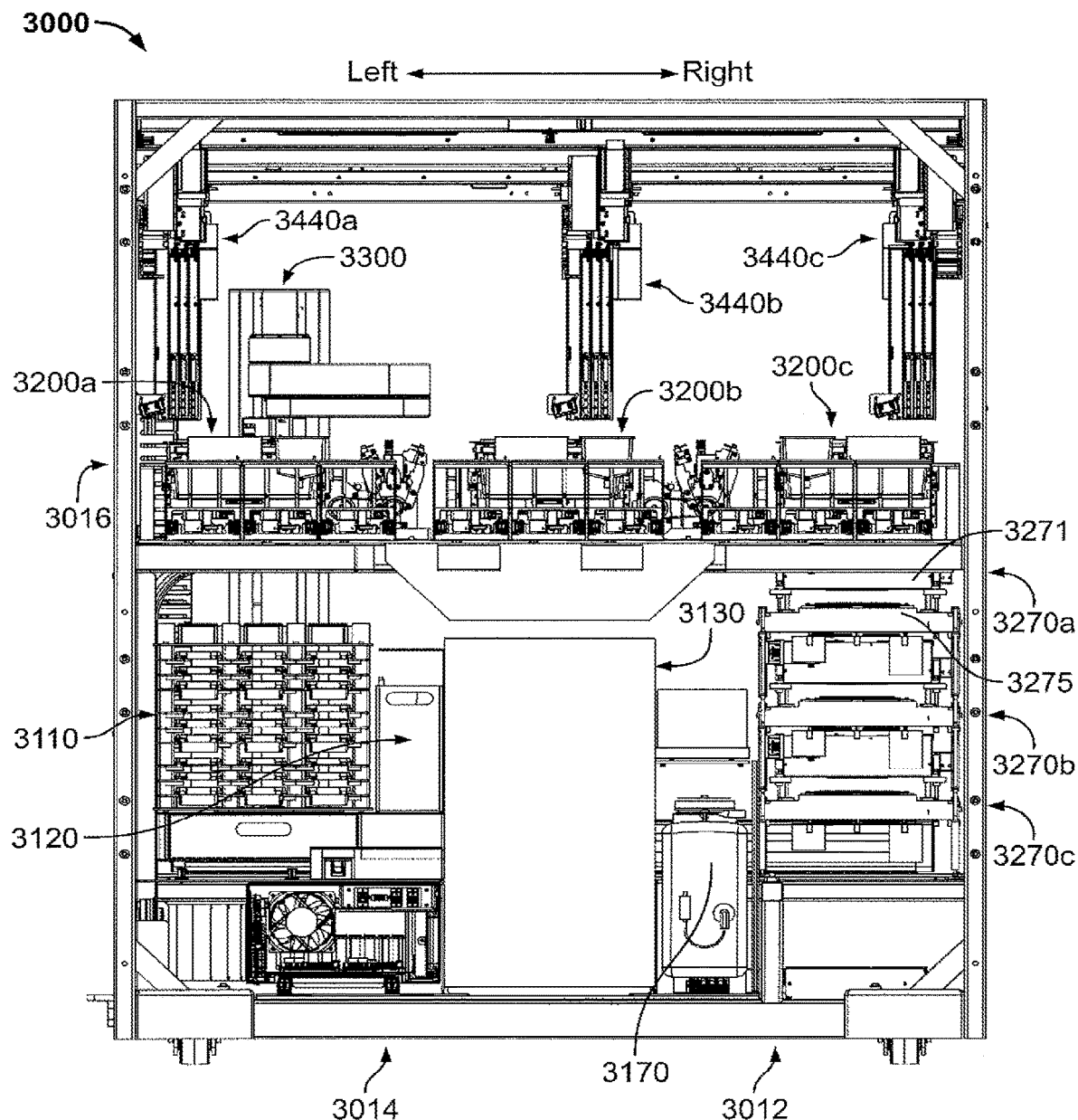
FIG. 17A is a front view of an analyzer according to another embodiment of the present disclosure.
Figure 17B:
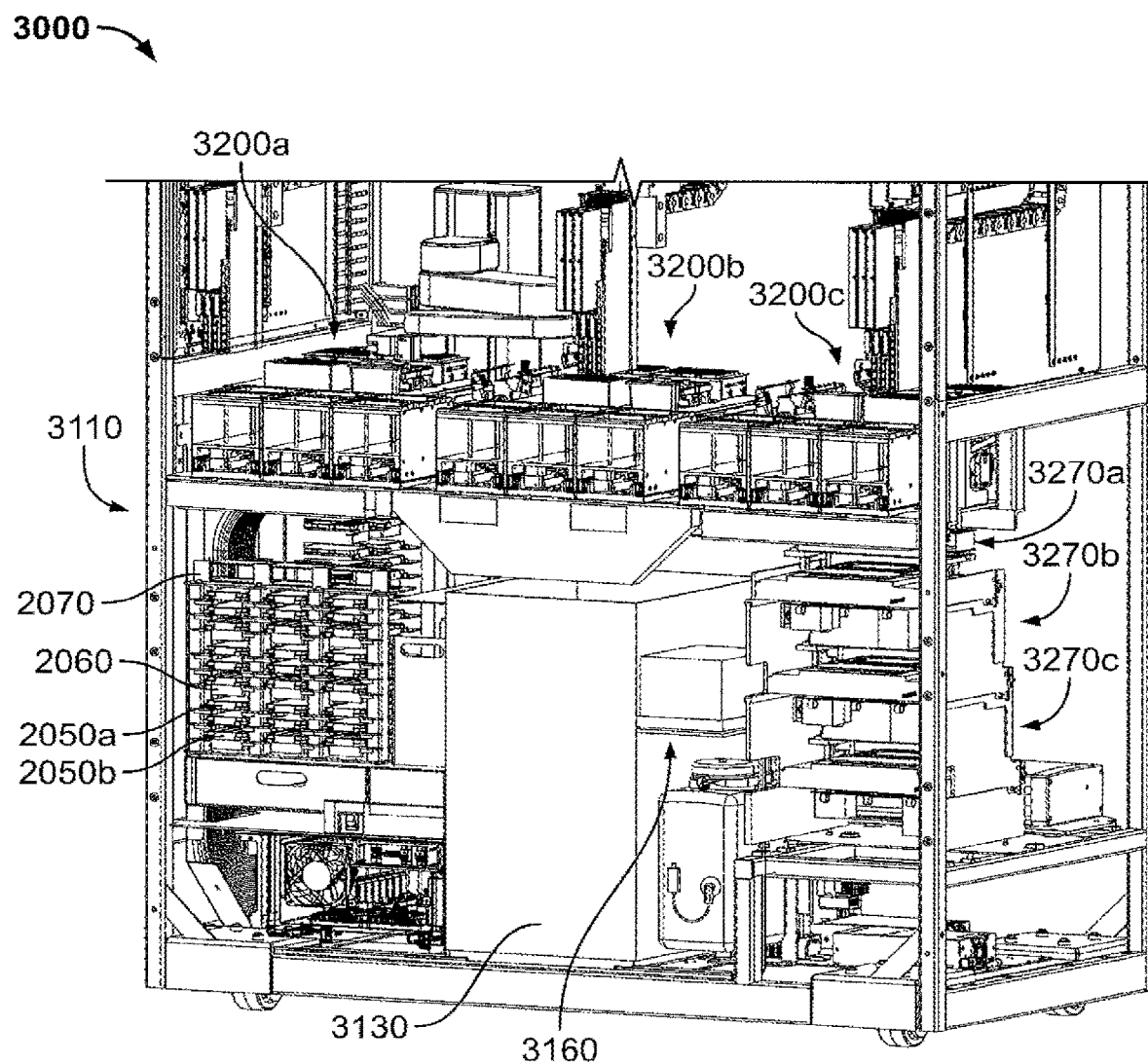
FIG. 17B is a front perspective view of the analyzer of FIG. 17A.
Figure 17C:
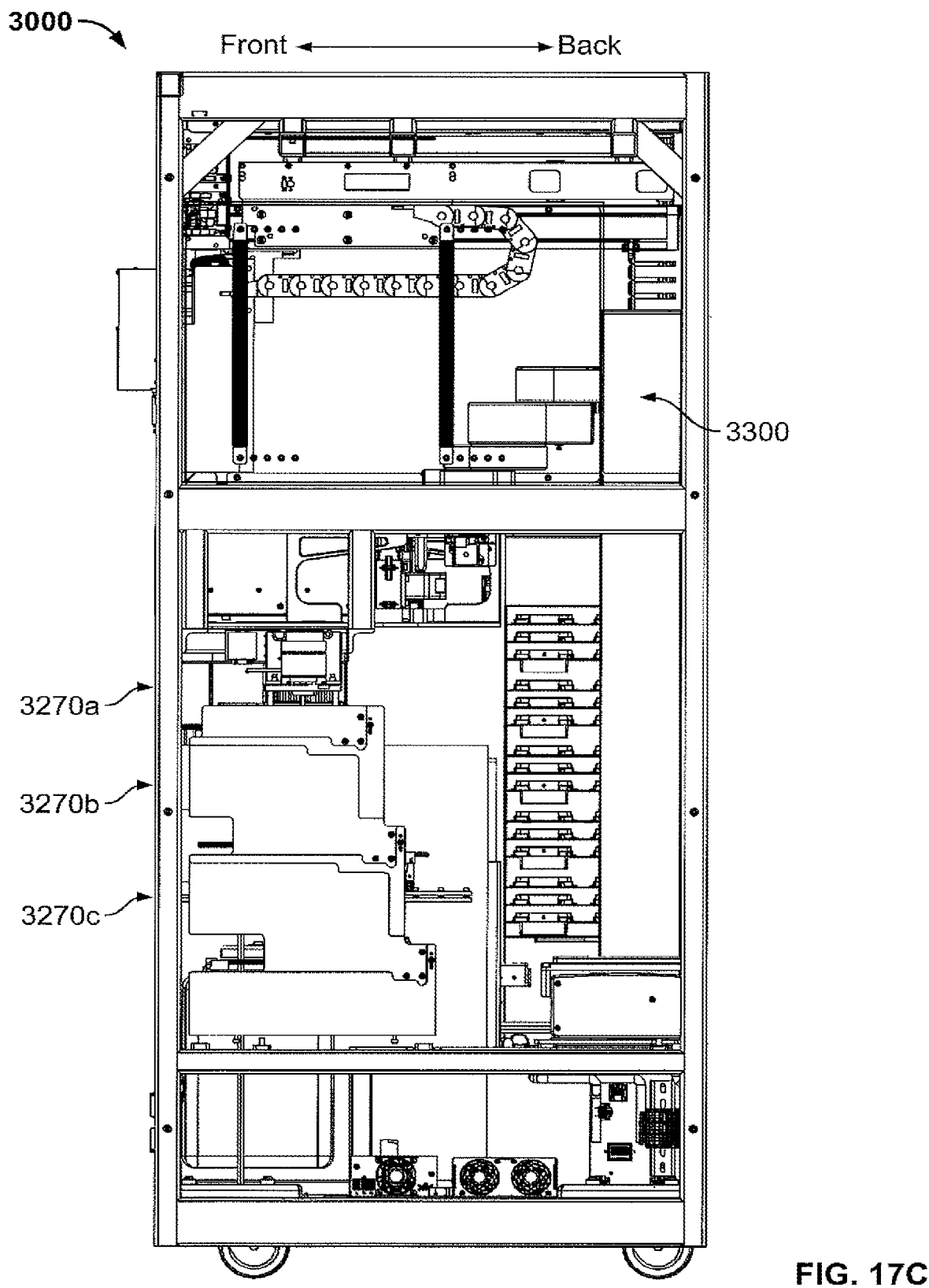
FIG. 17C is a side view of the analyzer of FIG. 17A.

Numerous variations, additions and combinations of the features discussed above can be utilized without departing from the present invention. For example FIGS. 17A-17C depict an analyzer 3000 according to another embodiment of the present disclosure. Analyzer 3000 is similar to analyzer 2000 in that it includes a processing deck 3016 having multiple processing modules 3200a-c, an inventory robot 3300 with a gripping end effector 3360, a liquid handling robot that includes multiple multichannel pippetors 3440a-c, a consumable storage area 3014 and detectors 3270a-c for detecting an analyte. In addition, analyzer 3000 utilizes the same consumables as analyzer 2000, such as the previously described pipette tips 2020, shuttles 2030, processing plates 2040, liquid reagent plates 2060, dry reagent plates 2050, and amplification cartridges 2070. However, analyzer 3000 differs with respect to the arrangement of the consumable storage 3014 and detectors 3270a-c and with regard to certain consumable repositories.

In particular, analyzer 2000 includes a detection/analysis deck 2012 that is located beneath an inventory deck 2014. However, analyzer 3000 separates these decks horizontally rather than vertically. Thus, analyzer 3000 includes an inventory section 3014 and a detection/analysis section 3012. In the particular embodiment depicted, the inventory section 3014 is located at the left side of analyzer 300 and detection/analysis section is located at the right side of analyzer 3000.

Inventory section 3014 includes a first consumable repository 3110, a second consumable repository 3120, and a waste repository 3130. First repository 3110 is similar to repository 2110 in that they both receive and store consumable items such as, reagent plates 2050 and 2060 and cartridges 2070. Second repository 3110 is located between first repository 3110 and waste repository 3130.

Figure 18A:
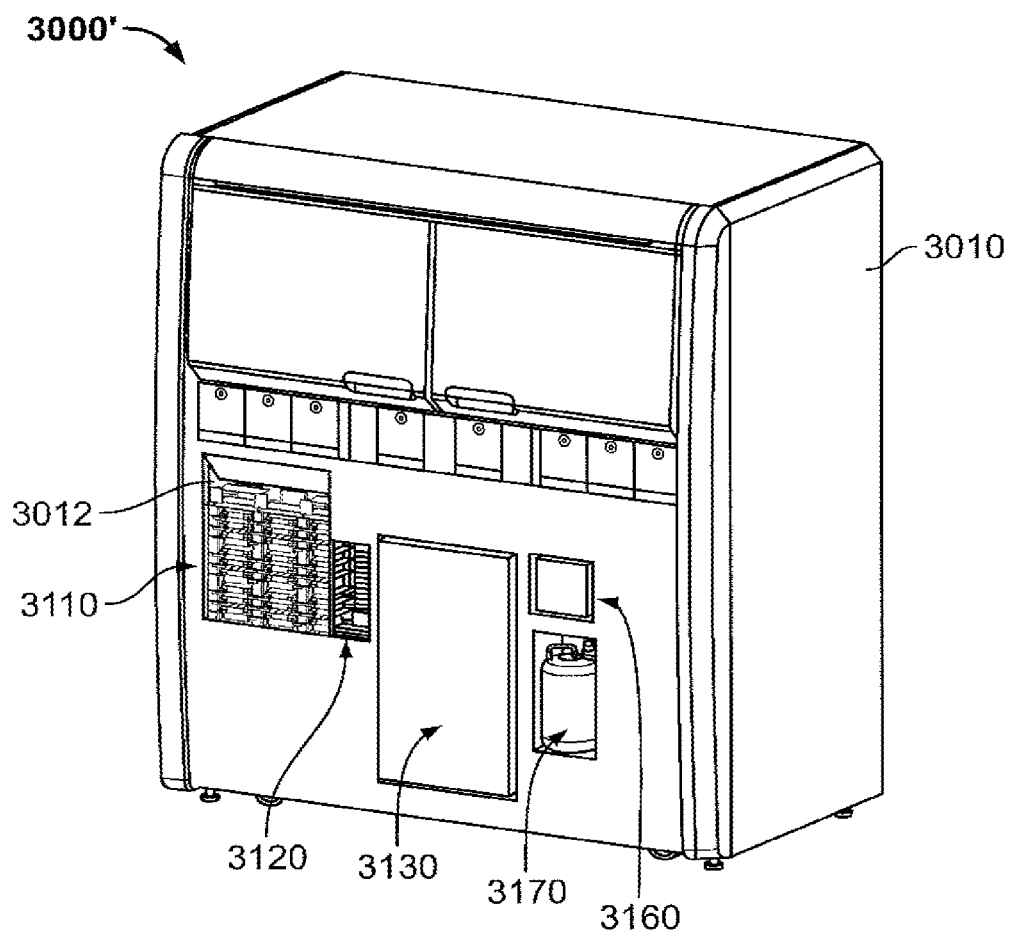
FIG. 18A is a front perspective view of the analyzer of FIG. 17A including an external skin but absent front doors.
Figure 18B:
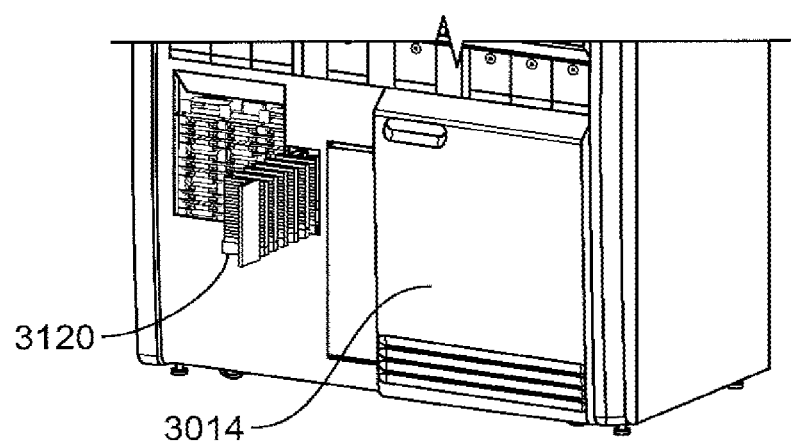
FIG. 18B is a partial front perspective view of the analyzer of FIG. 18A including a single front door.
Figure 18C:
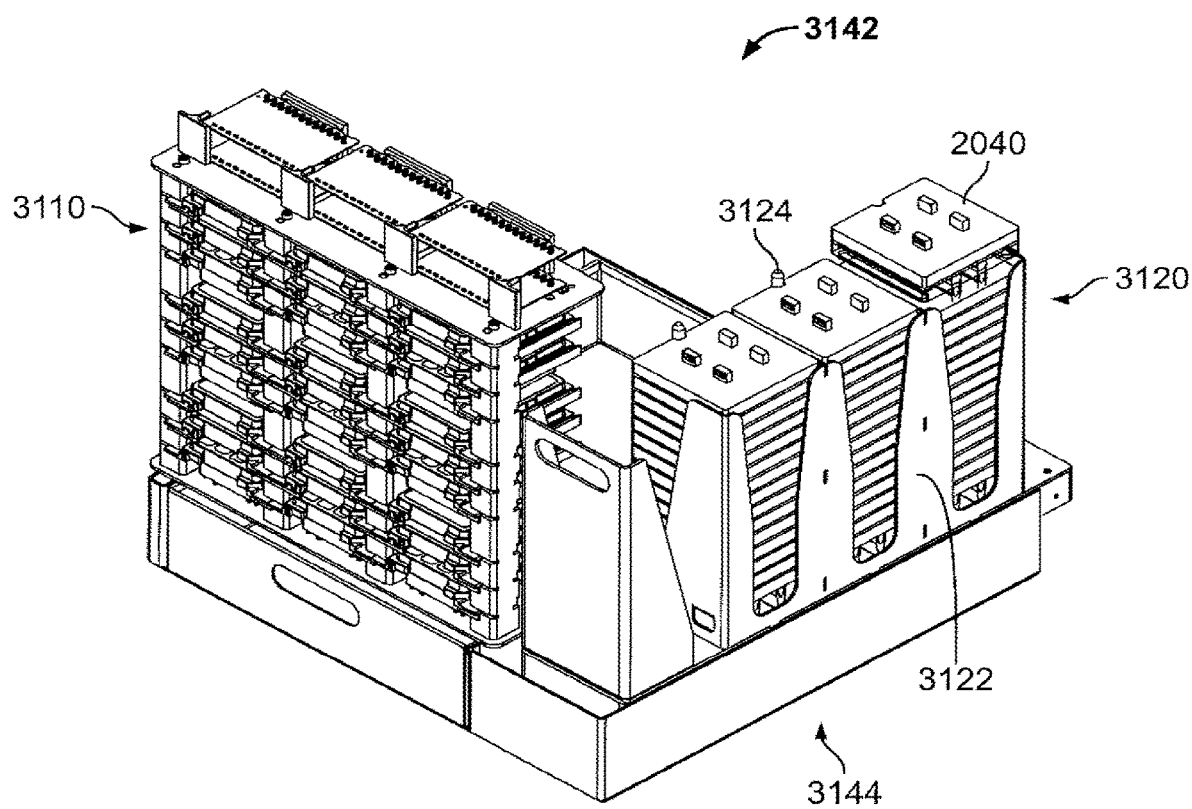
FIG. 18C is a perspective view of moveable consumable inventory.

Second repository 3120, which is best shown in FIG. 18C, has vertical compartments that are defined by walls 3122 and vertical rods/columns disposed opposite the walls 3122. These compartments are sized to receive stacks of processing plates 2040. Rods 3124 help prevent the stacks of processing plates 2040 from falling over, while also allowing the processing plates 2040 to be sufficiently exposed so that robot 2300 can retrieve a plate 2040 from a respective stack.

Waste repository 3130 is generally the same as waste repository 2130. Waste repository 3130 demarcates a lateral boundary of inventory section 3140 of analyzer 300 and helps separate the unused consumables and detection/analysis section 3012, which can help isolate any potential contamination originating from either area.

Detection/analysis section 3012 includes a waste repository 3130 (in one embodiment, the waste is amplification cartridges), a liquid waste repository, 3170, and a plurality of detectors 3270. The waste repository 3160 has an opening to receive and house waste, e.g., used amplification cartridges 2070, until a user empties repository 3160. Amplified waste repository 3160 may be slidably attached to one or more rails for controlled movement into and out of analyzer 3000. Liquid waste repository 3170 is connected to the processing deck 3016 via a hose or some other channeling device (not shown) so that liquid waste can be disposed of from the processing deck 3016. Detectors 3270a-c are the same as detectors 2270a-c and each include a thermocycler 3275 and reader head 3271. Detectors 3270a-c are located in a vertical arrangement so that second detector 3270b is located directly above third detector 3270*c*, and first detector is located directly above second detector 3270*b*. Detectors 3270*a-c* open in the same direction for access by gripper 3360 of inventory robot 3300. In some embodiments, at least one detector 3270 may be located on the same horizontal plane as another detector and orthogonally arranged relative thereto.

FIGS. 18A-18C depict an analyzer 3000' according to another embodiment of the present disclosure. Analyzer 3000' is similar to analyzer 3000 with the difference being that one or more consumable repositories are moveable for ease of access. For example, as shown in FIG. 18B, second consumable repository 3120 may be moveable like a drawer so that a user has access to each of the vertical compartments for replenishment of processing plates 2040. In another example shown in FIG. 18C, first and second waste repositories 3110, 3120 may be positioned on a moveable base 3144 so as to form a moveable consumable inventory 3142. In this regard, base 3144 may be slidable on rails (not shown) so that both first and second consumable repositories 3110, 3120 can be moved to a position outside of system 3000' for replenishment of consumables. In a further example, a carousel consumable inventory (not shown) may include a plurality of compartments that are rotatable about a vertical axis. Such carousel inventory may be rotated to expose its compartments to a user for replenishment while also allowing consumables stored therein to be positioned for access by robot 3300.

Analyzer 3000' also includes a housing 3010 which includes apertures 3012 in a front face thereof so that the various repositories can be moved or removed, such as first and second repositories 3110, 3120, solid waste repository 3130, liquid waste repository 3170, and amplified waste repository 3160, as shown in FIG. 18A. Doors 3014, which may be hingedly connected to housing 3010, open to allow a user access to such repositories.

One example of an analyzer described herein includes: i) a housing; ii) a robotic arm comprising an end effector, the end effector having: a) a body rotatably connected to an articulating arm; and b) first and second fingers coupled to the body and being moveable relative to each other in a first direction, each of the fingers having an engagement feature projecting inwardly from each of the first and second fingers and toward the other of the first and second fingers, the engagement feature being configured to engage a recess of an article wherein the recess is configured to receive the engagement feature such that the robotic arm can carry the article that is suspended from the first and second fingers when the engagement features are so engaged with the article. The analyzer also has: iii) at least one shuttle platform for receiving a shuttle carrying sample containers, the containers carrying sample to be evaluated by the analyzer; where the shuttle platform has a jaw assembly that automatically moves from an open position to a closed position the jaw assembly comprising engagement members that do not contact the bottom portion of the sample containers carried by the shuttle when the jaw assembly is in an open position and engages the bottom portion of the sample containers when the jaw assembly is in the closed position. The analyzer can also have an automatic pipettor that aspirates sample from the sample containers and wherein the jaw assembly of the shuttle platform is closed when the automatic pipettor aspirates sample from the sample containers. The robotic arm places the shuttle on the shuttle platform when the jaw assembly of the shuttle platform is in the open position. The automated analyzer may also have a magnetic extractor. The magnetic extractor may include: i) a housing defining a cavity; ii) adjacent rows of permanent magnets moveably disposed within the cavity of the housing; iii) a drive mechanism connected to the rows of permanent magnets and configured to move the rows of permanent magnets into and from the cavity; and iv) a plurality of heating elements that extend from the housing in rows that are disposed at opposite sides of the cavity. Moving the magnets from the first position to the second position disposes the rows of magnets directly between rows of the heating elements so that each permanent magnet aligns with a respective heating element. The magnetic extractor may also have a drip plate defining troughs that are each disposed adjacent to respective rows of heating elements.

The magnetic extractor can be adapted to receive a processing plate thereon, the heating elements each defining a recess configured to receive and hold an extraction tube of the processing plate disposed above the magnetic extractor, the heating elements being connected to a power source that heats the heating elements so that when the processing plate is placed over the heating elements, pipette tips held by the processing plate extend into the troughs of the drip plate. In operation of the analyzer the processing plate is placed on the magnetic extractor by the robotic arm. In some examples the robotic arm transports the processing plate onto the magnetic extractor by engaging the engagement features of the robotic fingers with upwardly extending engagement members from the processing plate, wherein the upwardly extending engagement members have openings that receive the engagement features when the robotic fingers are in a first engagement position, wherein the robotic fingers are closer together in the first engagement position than in a second position in which the distance between the robotic fingers is too far apart for the engagement features to engage the engagement members. In some embodiments the robotic fingers have a second engagement feature that extends downward from the robotic fingers. In one example the downward extending features from the robotic arms comprise a post with an inverted frustoconical projection extending therefrom. In operation, the inverted conical feature engages a corresponding notch in a consumable article that is transported from a first location to a second location in the automated analyzer. The automated analyzer may further include a consumable repository for receiving a consumable item for use in the automated analyzer. Examples of consumable items include a processing plate, a dry reagent plate, a liquid reagent plate and an amplification cartridge. In some embodiments the robotic arm has a scanner wherein the robotic arm retrieves a consumable stored in the consumable repository by reading a code on the consumable using the scanner. In one example, the consumable repository receives consumables from a first side and wherein robotic arm retrieves consumables from a second side of the consumable repository. In one example, the analyzer has one or more processing modules, a processing module having the shuttle platform and the magnetic extractor. In the example where the analyzer has multiple processing modules, two adjacent processing modules use one shuttle platform. In one example, a processing module has dry and liquid reagent stations adjacent the magnetic extractor, wherein the magnetic extractor is adapted to receive a processing plate thereon and wherein the processing plate is positioned lower in the processing module relative to dry and liquid reagent plates placed at respective dry and liquid reagent stations.

In another aspect a processing plate for use in an automated diagnostic system includes: i) a plate body defining a plurality of extraction tubes, mixing wells, and pipette tip holding stations, the extraction tubes, mixing wells, and pipette tip holding stations each defining openings that extend through an upper surface of the plate body; and ii) engagement members that extend vertically upward from the upper surface of the plate body having openings in the vertical portion of the engagement members, wherein the openings face the perimeter of the plate body, such openings being configured to receive an engagement feature of an automated transport device. In one example, the processing plate an upper surface, a lower surface and an edge, the edge extending between the upper and lower surfaces and defining a perimeter of the plate body. In another example a processing plate for use in an automated diagnostic system includes: i) a plate body having an upper surface, a lower surface and an edge, the edge extending between the upper and lower surfaces and defining a perimeter of the plate body; and ii) a plurality of sets of openings in the upper surface of the plate body and extending therethrough, wherein the openings terminate in a closed end. For example, each set has: i) an extraction tube having a tube body that extends from the bottom surface and defines tube openings extending through the upper surface; a well; and a pipette station that is configured to receive and hold a pipette tip. In one example each set of extraction tube, well, and pipette station is aligned in a row and the pipette station is positioned closest to the edge on at least one side of the plate body with the extraction tube and well further away from the perimeter of the processing plate.

In one example the engagement members that extend vertically upward from the upper surface of the plate body and that have openings in the vertical portion of the engagement members wherein the openings face the perimeter of the plate body, such openings being configured to receive an engagement feature of an automated transport device.

Also described herein is an inventory robot having a robotic arm with an end effector for carrying an article, the end effector having: i) a body rotatably connected to an articulating arm; and ii) at least two fingers coupled to the body and extending therefrom, one of the at least two fingers being moveable relative to the other one of the at least two fingers. Each of the at least two fingers has a first projection extending in a first direction toward the other of the at least two fingers for engaging a respective recess of the article. The respective recesses are configured to receive one of the projections each of the at least two fingers that have a second projection extending in a downward direction relative to the first direction. The second projections are for engaging a recess in the top of an article wherein the recess is configured to receive the second projection.

Also described herein is an automated analyzer having a robotic arm with an end effector for carrying an article. The end effector includes: i) a body rotatably connected to an articulating arm; and ii) first and second fingers coupled to the body and extending therefrom in a first direction and being moveable relative to each other in a second direction transverse to the first direction, each of the fingers having a first engagement feature extending therefrom in the second direction and a second engagement feature extending downward from the first and second fingers, the second engagement feature being configured to engage a recess disposed in the top of an article wherein the recess is configured to receive the second engagement feature so as to suspend the article from the first and second fingers when the robotic arm carries the article from a first location to a second location.

Also described herein is an automated analyzer having: i) an inventory robot comprising a robotic arm with an end effector thereon, the end effector comprising a body rotatably connected to an articulating arm; ii) a plurality of gripping fingers extending from the body from a first side thereof wherein the body is rotatable on a vertical axis; iii) a scanner positioned on the end effector to be brought into proximity with articles by the inventory robot, the inventory robot scans identifying information disposed on an article and located on the end effector at a position other than the location from which the gripping fingers extend. The analyzer also has a magnetic extractor having: i) a housing defining a cavity; ii) adjacent rows of permanent magnets moveably disposed within the cavity of the housing; iii) a drive mechanism connected to the rows of permanent magnets and configured to move the rows of permanent magnets into and from the cavity; and iv) a plurality of heating elements that extend from the housing in rows that are disposed at opposite sides of the cavity, the heating elements each defining a recess configured to receive and hold an extraction tube of a processing plate disposed above the magnetic extractor, the heating elements being connected to a power source that heats the heating elements. In operation, moving the magnets from the first position to the second position disposes the rows of magnets directly between rows of the heating elements so that each permanent magnet aligns with a respective heating element. The magnetic extractor also has a plurality of heating elements extending from the housing; a drip plate defining troughs that are each disposed adjacent to respective rows of heating elements; and a consumable repository adapted to receive a consumable processing plate, the processing plate comprising a machine readable label thereon, wherein the processing plate is placed in the consumable repository from a first side and the machine readable label on the consumable is read from a second side of the consumable repository by the inventory robot scanner. In one example, the inventory robot is moved to the consumable repository to obtain a processing plate and scans labels on articles in the consumable repository and, when it identifies the consumable to be retrieved, removes the consumable from the consumable repository and places it on the magnetic extractor such that pipette tips held by the processing plate extend into the troughs of the drip plate.

Also described herein is a method of operating an automated analyzer of biological samples that includes: i) placing a shuttle rack carrying sample containers for analysis at a location adjacent to the analyzer housing; ii) moving a robotic arm comprising an end effector such that the end effector translates to a position adjacent the analyzer while the other portions of the robot remain in the analyzer; iii) advancing the first and second fingers toward the rack shuttle such that the engagement features of the first and second fingers enter corresponding slots in the rack shuttle wherein the distance between the slots in the rack corresponds to the distance between the fingers extending from the body when the fingers are inserted in the slots; iv) once the engagement members are advanced into the slots, translating the fingers of the robotic arm closer together to grasp the shuttle rack located within the pre-analytical system; and v) moving the shuttle rack from the position adjacent the analyzer into the analyzer using the robotic arm. In one example, the end effector has a body with first and second fingers extending therefrom, each finger having an engagement feature thereon wherein the first and second fingers are disposed in a channel in the body and can be translated closer together or further apart by the robot. In one example there is physical access between the analyzer and an adjacent pre-analytical system in which the samples were prepared for analysis, the analysis to occur in the analyzer, and the robotic arm retrieves the shuttle rack from the adjacent pre-analytical system and carries it into the analyzer. The method can also include: i) using the robotic arm, placing the shuttle rack carried into the analyzer onto a shuttle retraining platform wherein the shuttle retaining platform has a jaw assembly with an open position and a closed position, wherein the jaw assembly is in the open position when the shuttle rack is placed on the shuttle retaining platform; ii) releasing the tension between the gripping fingers and the shuttle rack and withdrawing the gripping fingers extending from the end effector from the slots in the shuttle rack; iii) after the gripping fingers have been withdrawn, moving the jaw assembly to the closed position, thereby causing engagement members of the jaw assembly to secure against a lower portion of the sample containers in the shuttle when the jaw assembly is in the closed position; iv) inserting a pipette tip into the sample container using a robotic pipettor; v) aspirating at least a portion of the sample in the sample container using the robotic pipettor; and vi) withdrawing the pipette tip from the sample container while the jaw assembly is in the closed position. After withdrawing the pipette tip from the sample container, the jaw is moved to the open position and the method continues by: vii) advancing the first and second fingers of the end effector toward the shuttle rack such that the engagement features of the first and second fingers enter corresponding slots in the shuttle rack wherein the distance between the slots in the shuttle rack corresponds to the distance between the fingers extending from the body when the fingers are inserted in the slots; viii) after the engagement members are advanced into the slots, translating the fingers closer together to grasp the shuttle rack located within the pre-analytical system; ix) transporting the shuttle rack from the shuttle retaining platform back to the location adjacent the analyzer; x) releasing the shuttle rack from the end effector; and xi) retracting the end effector back in to the analyzer.

In another example a method of operating an automated analyzer of biological samples includes the steps of: i) moving an end effector of a robotic arm of an inventory robot above an article positioned at a first location, the end effector having a body with first and second fingers located in a channel and linearly movable within the channel, the fingers having engagement features thereon, to a location above an article positioned at a first location; ii) translating the first and second fingers apart so that the distance between them is greater than a distance between engagement members that are projections that extend upwardly from a body of the article, the engagement members being disposed inboard relative to a perimeter of the article and having openings facing the perimeter of the article; iii) moving the end effector so that engagement features extending from each of the fingers align with corresponding openings within the engagement members; iv) moving the first and second fingers toward each other so as to engage the engagement member openings; v) lifting the article so that the body of the article is disposed beneath the fingers; and vi) moving the article to a second location.

In a further example the engagement features are one of first engagement features projecting inwardly from each of the first and second fingers and toward the other of the first and second fingers or second engagement features that extend downward from each of the fingers wherein the downward extending features from the fingers comprise a post with an inverted frustoconical projection extending therefrom. In a further example the first location is a consumable repository. The consumable repository may contain a first article comprising an engagement member in the top surface thereof. This exemplary method may further include vii) moving the end effector over the top surface of the first article; and viii) lowering the end effector over the top surface of the article such that the second engagement features engage with corresponding engagement members in the top surface of the first article. The consumable repository may also contain a second article comprising a plurality of sets of openings in the upper surface of a body of the article and extending therethrough, wherein the openings terminate in a closed end wherein each set has one each of: a) an extraction tube having a tube body that extends from the bottom surface and defines tube openings extending through the upper surface; b) a well; c) a pipette station that and configured receive and hold a pipette tip, wherein each set of extraction tube, well, and pipette station is aligned in a row wherein the pipette station is positioned closest to the edge on at least one side of the plate body with the extraction tube and well further away from the perimeter of the processing plate; and d) engagement members inboard on the top surface and extending from the top surface thereof the engagement members having openings that face the perimeter of the top surface the method further comprising moving the end effector over the top surface of the first article. The method can include the steps of: ix) aligning engagement features of the end effector with the engagement members; and x) inserting the engagement features in the engagement members; xi) translating the first and second fingers closer together to grip the engagement members; and xii) carrying the second article to a second location.

In one example the end effector is advanced horizontally to move the fingers into the corresponding recesses. In the embodiments wherein the end effector comprises a scanner, the method further comprises: i) instructing an inventory robot to retrieve an article from the consumable repository; ii) scanning a machine readable label on the article in the consumable repository; iii) determining if the label information matches an article that the inventory robot is instructed to retrieve; and iv) if a match is determined, engaging the arms of the end effector with engagement members on the article and transporting the article from the consumable repository to a second location using the inventory robot.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A robotic inventory system comprising:
   a robotic arm with an end effector for carrying an article, the end effector comprising:
   a body rotatably connected to an articulating arm; and
   first and second fingers moveably coupled to the body and extending therefrom in a first direction and being moveable relative to each other in a second direction transverse to the first direction, each of the first and second fingers having a first engagement feature that is a projection extending inward therefrom in the second direction and a second engagement feature extending downward from the first and second fingers, the second engagement feature comprising a post with an inverted frustoconical projection extending downward therefrom.

2. An automated analyzer comprising:
an inventory robot comprising a robotic arm with an end effector thereon, the end effector comprising a body rotatably connected to an articulating arm;
a plurality of gripping fingers extending from the body from a first side thereof wherein the body is rotatable on a vertical axis;
a scanner positioned on the end effector to be brought into proximity with articles by the inventory robot, wherein the inventory robot is configured to scan identifying information disposed on an article and being located on the end effector at a location other than the location from which the gripping fingers extend; and
a magnetic extractor comprising:
a housing defining a cavity;
adjacent rows of permanent magnets moveably disposed within the cavity of the housing;
a drive mechanism connected to the rows of permanent magnets and configured to move the rows of permanent magnets into and from the cavity; and
a plurality of heating elements that extend from the housing in rows that are disposed at opposite sides of the cavity, the heating elements each defining a recess configured to receive and hold an extraction tube of a processing plate disposed above the magnetic extractor, the heating elements being connected to a power source that heats the heating elements;
wherein moving the magnets from the first position to a second position disposes the rows of magnets directly between rows of the heating elements so that each permanent magnet aligns with a respective heating element;
a plurality of heating elements extending from the housing;
a drip plate defining troughs that are each disposed adjacent to respective rows of heating elements; and
a consumable repository adapted to receive a consumable processing plate, the processing plate comprising a machine readable label thereon, wherein the processing plate is placed in the consumable repository from a first side and the machine readable label on the consumable is read from a second side of the consumable repository by the scanner;
wherein the inventory robot is moved to the consumable repository to obtain a processing plate and scans labels on articles in the consumable repository and, when it identifies the consumable to be retrieved, removes the consumable from the consumable repository and places it on the magnetic extractor such that pipette tips held by the processing plate extend into the troughs of the drip plate.

3. A method of operating an automated analyzer of biological samples comprising:
placing a shuttle rack carrying sample containers for analysis at a location adjacent to the analyzer housing;
moving a robotic arm comprising an end effector such that the end effector translates to a position adjacent the analyzer while the other portions of the robot remain in the analyzer wherein the end effector comprises a body with first and second fingers extending therefrom, each finger having an engagement feature thereon wherein the first and second fingers are disposed in a channel in the body and can be translated closer together or further apart by the robot;
advancing the first and second fingers toward the rack shuttle such that the engagement features of the first and second fingers enter corresponding slots in the rack shuttle wherein a distance between the slots in the rack corresponds to a distance between the fingers extending from the body when the fingers are inserted in the slots;
once the engagement features are advanced into the slots, translating the fingers of the robotic arm closer together to grasp the shuttle rack located within a pre-analytical system; and
moving the shuttle rack from the position adjacent the analyzer into the analyzer using the robotic arm.

4. The method of claim 3, wherein there is physical access between the analyzer and an adjacent pre-analytical system in which the samples were prepared for analysis, the analysis to occur in the analyzer, and wherein the robotic arm retrieves the shuttle rack from the adjacent pre-analytical system and carries it into the analyzer.

5. The method of claim 3, further comprising:
using the robotic arm, placing the shuttle rack carried into the analyzer onto a shuttle retraining platform wherein the shuttle retaining platform has a jaw assembly with an open position and a closed position, wherein the jaw assembly is in the open position when the shuttle rack is placed on the shuttle retaining platform;
releasing a tension between the first and second fingers and the shuttle rack and withdrawing the first and second fingers extending from the end effector from the slots in the shuttle rack;
after the first and second fingers have been withdrawn, moving the jaw assembly to the closed position, thereby causing engagement members of the jaw assembly to secure against a lower portion of the sample containers in the shuttle when the jaw assembly is in the closed position; and
inserting a pipette tip into the sample container using a robotic pipettor;
aspirating at least a portion of the sample in the sample container using the robotic pipettor; and
withdrawing the pipette tip from the sample container while the jaw assembly is in the closed position.

6. The method of claim 5, further comprising:
after withdrawing the pipette tip from the sample container, moving the jaw assembly to the open position;
advancing the first and second fingers of the end effector toward the shuttle rack such that the engagement features of the first and second fingers enter corresponding slots in the shuttle rack wherein a distance between the slots in the shuttle rack corresponds to a distance between the fingers extending from the body when the fingers are inserted in the slots;
after the engagement members are advanced into the slots, translating the fingers closer together to grasp the shuttle rack located within a pre-analytical system; and
transporting the shuttle rack from the shuttle retaining platform back to the location adjacent the analyzer;
releasing the shuttle rack from the end effector; and
retracting the end effector back in to the analyzer.

7. The method of claim 4, wherein the access is an opening between a housing for the analyzer and a housing for the adjacent pre-analytical system.

8. The method of claim 3, wherein the robotic arm is coupled to a robotic arm body that is slidably attached to a track member.

9. The method of claim 8, wherein the robotic arm body is supported by a carriage that is slidably attached to the track member.

10. The method of claim 9, wherein the track member is a linear track member.

11. The method of claim 10, wherein moving the shuttle rack from the position adjacent the analyzer into the analyzer using the robotic arm comprises translating the robotic arm body from a first position to a second position.

12. The method of claim 4, wherein the robotic arm is coupled to a robotic arm body, wherein the robotic arm body comprises a shoulder slidably attached to the robotic arm body, wherein the slidable attachment is in a vertical axis.

13. The method of claim 12, wherein the shoulder is attached to a first end of a first arm member, wherein the first end of the first arm member and the shoulder have a vertical axis in common, and the first end of the first arm member is rotatable around the common vertical axis.

14. The method of claim 13, wherein a second end of the first arm member is rotatably attached to a first end of a second arm member, wherein the rotation is about a common vertical axis.

15. The method of claim 14, wherein the end effector is rotatably attached to a second end of the second arm member, and wherein the rotation is around a common vertical axis shared by the second end of the second arm and the end effector.

16. A method of operating an automated analyzer of biological samples comprising:
    moving an end effector of a robotic arm of an inventory robot above a first article positioned at a first location, the end effector having a body with first and second fingers located in a channel and linearly movable within the channel, the first and second fingers each having a first and a second engagement feature, to a location above the first article positioned at the first location;
    translating the first and second fingers apart so that a distance between them is greater than a distance between engagement members on the first article;
    positioning the end effector so that one of the first or second engagement features extending from each of the first and second fingers align with corresponding openings within the engagement members on the first article;
    moving the first and second fingers toward each other such that one of the first engagement feature and second engagement feature are received by corresponding openings within the engagement members on the first article thereby securing the first article to the end effector;
    moving the end effector upward, thereby lifting the first article; and
    moving the first article to a second location;
    wherein the first engagement features project inwardly from each of the first and second fingers and toward the other of the first and second fingers and the second engagement features extend downward from each of the first and second fingers wherein the second engagement feature from each of the first and second fingers comprises a post with an inverted frustoconical projection extending therefrom.

17. The method of claim 16, wherein the first location is a consumable repository.

18. The method of claim 17, wherein the consumable repository contains the first article, the method further comprising moving the end effector over the top surface of the first article; and
    lowering the end effector over the top surface of the article such that the second engagement features engage with corresponding engagement members in the top surface of the first article.

19. The method of claim 18, wherein the consumable repository contains a second article comprising a plurality of sets of openings in an upper surface of a body of the second article and extending therethrough, wherein the openings terminate in a closed end wherein each set of opening in the upper surface of the body of the second article comprises one each of:
    an extraction tube having a tube body that extends from the lower surface and defines tube openings extending through the upper surface;
    a well; and
    a pipette station that is configured to receive and hold a pipette tip,
    wherein each set of extraction tube, well, and pipette station is aligned in a row wherein the pipette station is positioned closest to an edge on at least one side of the body of the second article with the extraction tube and removed from a perimeter of the second article; and
    engagement members inboard on the upper surface and extending from the upper surface thereof the engagement members having openings that face the perimeter of the upper surface;
    the method further comprising moving the end effector over the top surface of the first article;
    aligning engagement features of the end effector with the engagement members; and
    inserting the engagement features in the engagement members and translating the first and second fingers closer together to grip the engagement members; and
    carrying the second article to the second location.

20. The method of claim 19, wherein the end effector is advanced horizontally to move the first and second fingers into the corresponding openings.

21. The method of claim 17, wherein the end effector comprises a scanner and the method further comprises:
    instructing an inventory robot to retrieve an article from the consumable repository;
    scanning a machine-readable label on the article in the consumable repository; determining if information in the machine readable label matches an article that the inventory robot is instructed to retrieve; and
    upon determining a match, engaging the first and second fingers of the end effector with engagement members on the article and transporting the article from the consumable repository to the second location using the inventory robot.

* * * * *